(12) United States Patent
Aller et al.

(10) Patent No.: US 12,620,049 B2
(45) Date of Patent: May 5, 2026

(54) USE OF IMPERFECT PATTERNS TO ENCODE DATA ON SURFACES

(71) Applicant: Spot Vision LLC, Oak Grove, OR (US)

(72) Inventors: Joshua Victor Aller, Oak Grove, OR (US); Nicholas Riehl, Portland, OR (US)

(73) Assignee: SPOT VISION LLC, Oak Grove, OR (US)

( * ) Notice: Subject to any disclaimer, the term of this patent is extended or adjusted under 35 U.S.C. 154(b) by 0 days.

(21) Appl. No.: 19/386,102

(22) Filed: Nov. 11, 2025

(65) Prior Publication Data

US 2026/0065404 A1     Mar. 5, 2026

Related U.S. Application Data

(63) Continuation of application No. 18/684,013, filed as application No. PCT/US2022/038291 on Jul. 26, 2022.

(60) Provisional application No. 63/348,561, filed on Jun. 3, 2022, provisional application No. 63/234,905, filed on Aug. 19, 2021.

(51) Int. Cl.
*G06T 1/00* (2006.01)
(52) U.S. Cl.
CPC .......... *G06T 1/0028* (2013.01); *G06T 1/0064* (2013.01); *G06T 2201/0051* (2013.01)
(58) Field of Classification Search
CPC ................. G06T 1/0028; G06T 1/0064; G06T 2201/0051
See application file for complete search history.

(56) References Cited

U.S. PATENT DOCUMENTS

| | | | |
|---|---|---|---|
| 4,745,269 | A | 5/1988 | Gils |
| 4,896,029 | A | 1/1990 | Chandler et al. |
| 5,124,536 | A | 6/1992 | Priddy et al. |
| 5,241,166 | A | 8/1993 | Chandler |
| 5,554,841 | A | 9/1996 | Kost et al. |
| 5,612,524 | A | 3/1997 | Sant'Anselmo et al. |
| 5,637,849 | A | 6/1997 | Wang et al. |
| 5,726,435 | A | 3/1998 | Hara et al. |
| 6,424,734 | B1 | 7/2002 | Roberts et al. |
| 7,025,279 | B2 | 4/2006 | Walmsley et al. |

(Continued)

FOREIGN PATENT DOCUMENTS

| | | |
|---|---|---|
| DE | 102016221279 A1 | 5/2018 |
| EP | 3743881 B1 | 7/2021 |

(Continued)

OTHER PUBLICATIONS

Grinchuk, Oleg, et al., "Learnable Visual Markers," 29th Conference on Neural Information Processing Systems (NIPS 2016), Barcelona, Spain, 9 pages.

(Continued)

*Primary Examiner* — Christopher Wait
(74) *Attorney, Agent, or Firm* — Schwabe Williamson & Wyatt

(57) ABSTRACT

Embodiments of the invention include ascribing a predetermined data record to a physical surface in the form of an imperfect aesthetic pattern of marks. An image showing a portion of the surface, when processed with a decoder, yields the predetermined, verified data record.

24 Claims, 25 Drawing Sheets

(56) References Cited

U.S. PATENT DOCUMENTS

| | | | |
|---|---|---|---|
| 7,398,928 | B2 | 7/2008 | Gaspard et al. |
| 8,422,777 | B2 | 4/2013 | Aller |
| 8,817,046 | B2 | 8/2014 | Sugden et al. |
| 9,791,865 | B2 | 10/2017 | Kelso et al. |
| 10,872,392 | B2 | 12/2020 | Stach et al. |
| 11,037,038 | B2 | 6/2021 | Kamath |
| 11,113,819 | B2 | 9/2021 | Milovanovic et al. |
| 11,120,319 | B2 | 9/2021 | Wang et al. |
| 11,276,133 | B2 | 3/2022 | Kamath |
| 11,288,764 | B2 | 3/2022 | Kamath et al. |
| 11,514,285 | B2 | 11/2022 | Kamath |
| 2002/0136429 | A1 | 9/2002 | Stach et al. |
| 2005/0285761 | A1 | 12/2005 | Jancke |
| 2007/0098234 | A1 | 5/2007 | Fiala |
| 2009/0046856 | A1 | 2/2009 | Mitchell |
| 2009/0190168 | A1 | 7/2009 | Furuta et al. |
| 2018/0046845 | A1 | 2/2018 | Bartels |
| 2019/0213705 | A1* | 7/2019 | Kamath ................ G06T 1/0092 |
| 2019/0332840 | A1 | 10/2019 | Sharma et al. |
| 2020/0320660 | A1 | 10/2020 | Kamath |
| 2021/0192302 | A1 | 6/2021 | Wang et al. |
| 2021/0217127 | A1 | 7/2021 | Stach et al. |
| 2022/0004727 | A1 | 1/2022 | Sharma et al. |
| 2022/0036496 | A1 | 2/2022 | Kamath et al. |
| 2022/0138892 | A1 | 5/2022 | Kamath |
| 2022/0284535 | A1 | 9/2022 | Kamath et al. |
| 2022/0351322 | A1 | 11/2022 | Kamath |

FOREIGN PATENT DOCUMENTS

| | | | |
|---|---|---|---|
| GB | 2523136 | A1 | 8/2015 |
| KR | 101266751 | B1 | 1/2013 |
| WO | 2014206476 | A1 | 12/2014 |
| WO | 2018077535 | A1 | 5/2018 |
| WO | 2021195563 | A1 | 9/2021 |

OTHER PUBLICATIONS

International Search Report and Written Opinion for International Patent Application No. PCT/US22/38291, mailed Nov. 29, 2022, 8 pages.

Kamath, Ajith M., "Signal Rich Art: Improvements and Extensions," IS&T International Symposium on Electronic Imaging, (2020), pp. 023-1 to 023-11.

Kamath, Ajith M., "Signal Rich Art: Object Placement, Object Position Modulation and Other Advances," IS&T International Symposium on Electronic Imaging (2021 ), pp. 299-1 to 299-8.

Kamath, Ajith M., et al."Hiding in Plain Sight: Enabling the Vision of Signal Rich Art," IS&T International Symposium on Electronic Imaging (2019), pp. 527-1 to 527-7.

Kato, Hiroharu, et al."Differentiable Rendering: A Survey" CoRR abs/2006.12057, Jun. 2020, 20 pages.

Marschner, Steve, et al., "Fundamentals of Computer Graphics" 5th edition (2021).

US Patent Office; Notice of the Allowance; U.S. Appl. No. 19/065,861; Dated: Apr. 28, 2025; pp. 1-17.

* cited by examiner

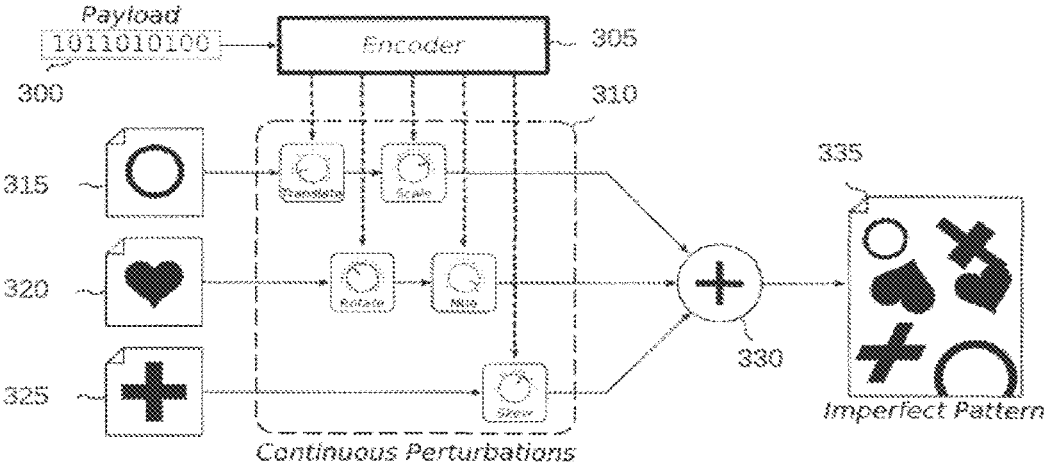
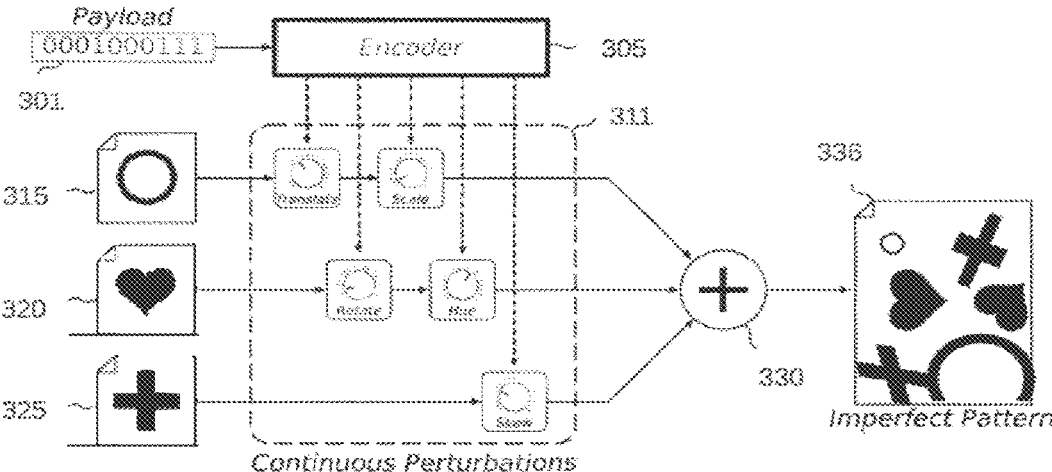
*Fig. 3*

701 Source Image

702 Pattern Decoder

703 Payload Vector

704 Polarity Descriminator

705 Data Record

700

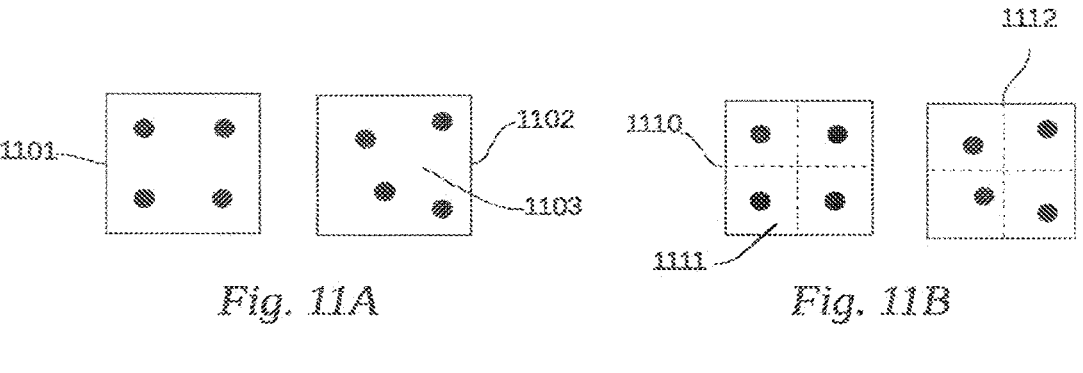
Fig. 11A                    Fig. 11B
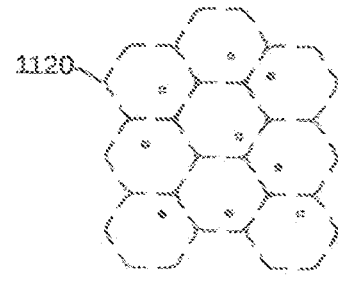
Fig. 11C
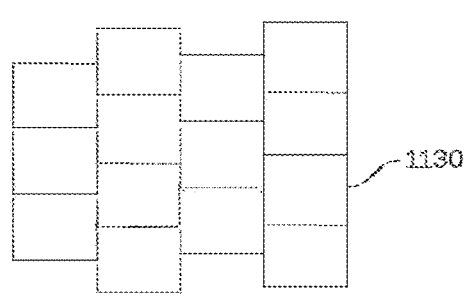
Fig. 11D
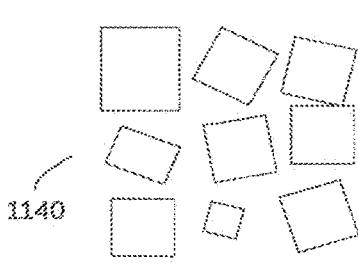
Fig. 11E
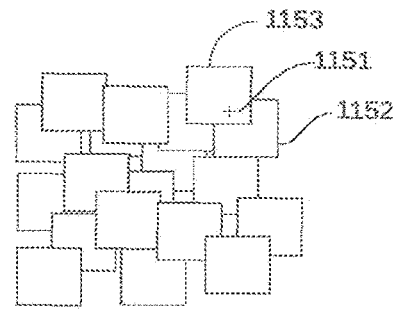
Fig. 11F

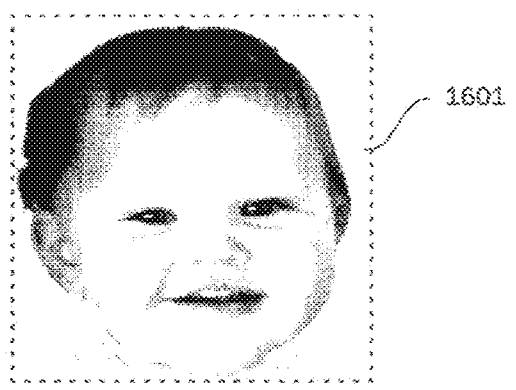
1601
1600
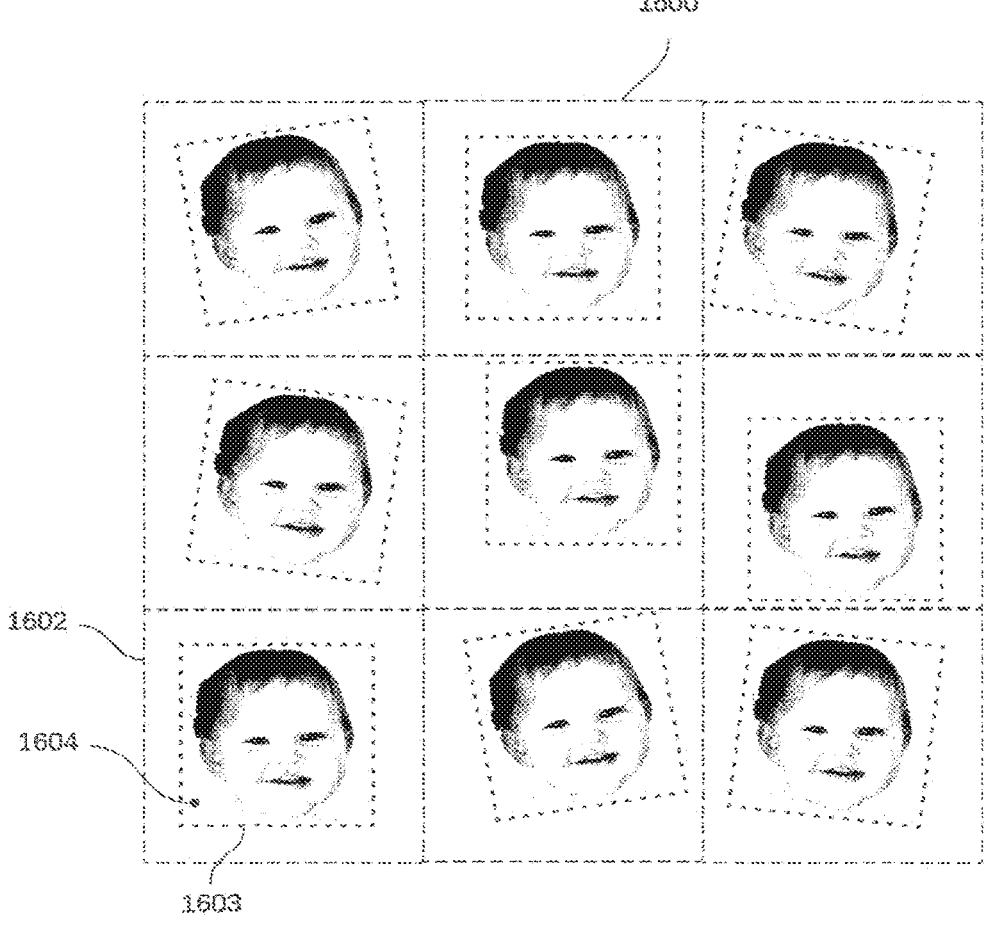
1602
1604
1603
*Fig. 16*

1802

1803

1801

USE OF IMPERFECT PATTERNS TO ENCODE DATA ON SURFACES

CONTINUITY AND CLAIM OF PRIORITY

This application is continuation application of US national phase application Ser. No. 18/684,013, filed Feb. 15, 2024, which claims priority to PCT Application No. PCT/US2022/038291, filed Jul. 26, 2022, which claims priority to U.S. provisional application 63/234,905 titled, "DATA ENCODING CELLULAR MARK PATTERNS", filed Aug. 19, 2021, and U.S. provisional application 63/348, 561, titled "METHOD AND APPARATUS FOR DATA ENCODING PATTERNS", filed on Jun. 3, 2022, all of which are incorporated herein by reference in their entireties.

FIELD

The invention relates to machine-readable optical codes. More specifically, the invention relates to generating machine-readable optical codes, encoding information into optical codes, inscribing objects with the optical codes, and reliably reading the codes from images of objects decorated with the codes.

BACKGROUND

Throughout human history we have sought to synthesize a richer meaning to our visual communications than can be ascribed with just the literal and minimal symbols required to encode information. A stick figure cave drawing may accurately tell a story about an event, however the simplistic design may not well express the personal or cultural values of the artist, or may not give honor to or express the importance of the story depicted. Hence, style, texture, color, framing, and emphasis are added to a drawing in order to communicate beyond basic symbols. These additions to the depictions are not added for the purpose of more clearly or realistically conveying the information, but rather to add something to our impression of the work that may strike us at an emotional level, and otherwise could not be encoded symbolically. Ultimately these emotional impressions may affect our human decision making more than the literal information encoded.

Similarly in textual communication, we take great care to express text not simply as a series of monotone symbols, but seek to enhance and differentiate the symbols into a richer meaning with stylings such as calligraphy, typography, layout, and kerning. We develop fonts that are appropriate for french restaurant menus, fonts that are appropriate for soup cans, and fonts that are appropriate for danger signs. In each case we wish to communicate beyond the symbols with a cultural framing of the values and importance of the message encoded.

Graphic design also communicates an emotional or cultural framing we ascribe to an object, often without using any literal symbologies. The colors, style, shape, layout, and strokes of a design all contribute to our emotional or subconscious impressions of the article the design enhances. Design can create mood, harmony, brand recognition, and can draw attention. So strong is this emotional connection that it would be inconceivable to try to sell a product without attention to the graphic design of the product as well as of the packaging, website, and advertising.

For utilitarian purposes it is often useful to augment a physical object (a package, product, or apparel, for example)

with data by labeling the object with a digital code that can be read by a computer. When affixed to an object, existing data encoding schemes like barcodes, UPC™ codes, QR™ codes, or Data Matrix™ codes allow for the object to visually convey a data record readable by a computer.

These data carrying codes were designed only for computer readability with a mostly fixed aesthetic. Their blocky and high contrast designs have performed adequately in conveying data to a computer, however, these codes are unable to communicate effectively with humans at an emotional or cultural level, and worse may transmit the undesired emotional message related to the code rather than the desired emotional message of the article to which the code is ascribed.

As such, existing codes are made as small as possible for most applications, making them especially difficult to scan from devices such as smartphones. They are difficult to capture in focus, easily covered by another label, and difficult to locate. For some applications, the aesthetic feel of the existing codes are so emotionally incompatible with the desired emotional framing of the designer that augmenting the article with a code would be inconceivable.

Digital watermarks are a class of computer readable codes that can be embedded in a variety of raster images, thus freeing the style of the base imagery to allow more artistic expression. In watermarking, however, data is encoded via visual artifacts (with a visual appearance similar to JPEG artifacts) which are not aesthetically pleasing. Adding a digital watermark to a brand's logo, for example, is problematic because it introduces defects into the logo that detract from the emotional framing and messaging of the brand, specifically the message of "quality".

These existing codes and watermarks are also challenging to detect when not in perfect lighting, when the object is moving in relation to the camera, when the image is not in focus, or when they are applied to arbitrarily curved objects.

It would be advantageous to attach computer-readable data to an article that could be easily scanned in a wide variety of conditions, and that it graphically communicates the desired cultural or emotional framing for the article. An improved method for solving this problem would have substantial value in this field.

This specification presumes that the reader is skilled in the arts of computer graphics, texture mapping, differentiable rendering, data science, and deep learning.

SUMMARY

As noted in the background, the ability to augment a physical object with readily scannable code capable of communicating a desired emotional framing would be of great benefit. Graphic designs communicate an emotional framing through traits such as the artwork, composition, stroke, and color. Typically a graphic design will contain variation in these traits, the variation being intentional styling added to contribute to the emotional framing of the design. We describe a system, in various embodiments, which introduces additional variation in designs to encode a data record. An abundance of designs may be expressed as a pattern which may be made "imperfect" by the introduction of said variation, but without the "JPEG artifact" imperfect appearance of prior-art digital watermarks.

In each embodiment, a predetermined data record, comprising one or more digital data bits may be transcribed into a specific imperfect pattern by an encoding process, the imperfections of the design representing the data record in the pattern.

The imperfect pattern is composed of one or more marks, which may be varied in the pattern by means of transformation by continuous values. A plurality of potentially overlapping marks may be combined into an imperfect pattern by compositing the transformed marks together. A mark may be rendered within a cell, a subregion of the pattern. Marks may also be rendered such that pieces, or components of the mark are present across a plurality of cells. Patterns may be repeating or non-repeating.

The design and variability of the imperfect pattern may be specified by means of a pattern template, which when combined with a set of mark parameters from an encoder determines how each mark should be transformed and rendered in the imperfect pattern. The pattern template may be expressed in the form of a graph, the nodes of which specify various elements of the design.

A matched pair of encoder and decoder models, which in some embodiments may comprise machine learning models, may be trained together to yield robust encoding and extraction of data records from patterns despite acute 3D angles, poor lighting, poor focus of motion blur, or visibility of only a portion of the imperfect pattern during the data-recovery or "reading" phase of operation. In some aspects, the encoder and decoder models provide a means of encryption of data into an imperfect pattern.

By augmenting a data record with error correction or parity bits, one may produce a data record that is verifiable upon extraction. An imperfect pattern encoding the verifiable data record may then be displayed with at least one distinguishable characteristic on one or more physical surfaces of an object. An image of a surface displaying such a pattern, for example, an image captured by a camera or scanner, when processed with a decoder, yields the predetermined, verified data record.

BRIEF DESCRIPTION OF DRAWINGS

FIG. 3 depicts two different payloads encoded into associated imperfect patterns.

FIGS. 11A, 11B, 11C, 11D, 11E and 11F depict various arrangements of cells.

FIG. 16 depicts an imperfect pattern composed of raster marks.

DETAILED DESCRIPTION

As we seek to decorate a wide range of surfaces such that the decorations simultaneously encode data that can be extracted by a computer and communicate emotional framing to a human, it becomes clear that no one design may communicate the diverse range of emotional framings required for the task. As such, we describe a system for the synthesis of imperfect patterns that may represent a wide range of graphic designs.

In order to appreciate the range of functionality for imperfect patterns, let's examine a few applications involving objects displaying these patterns.

Example Applications

Figure 1:
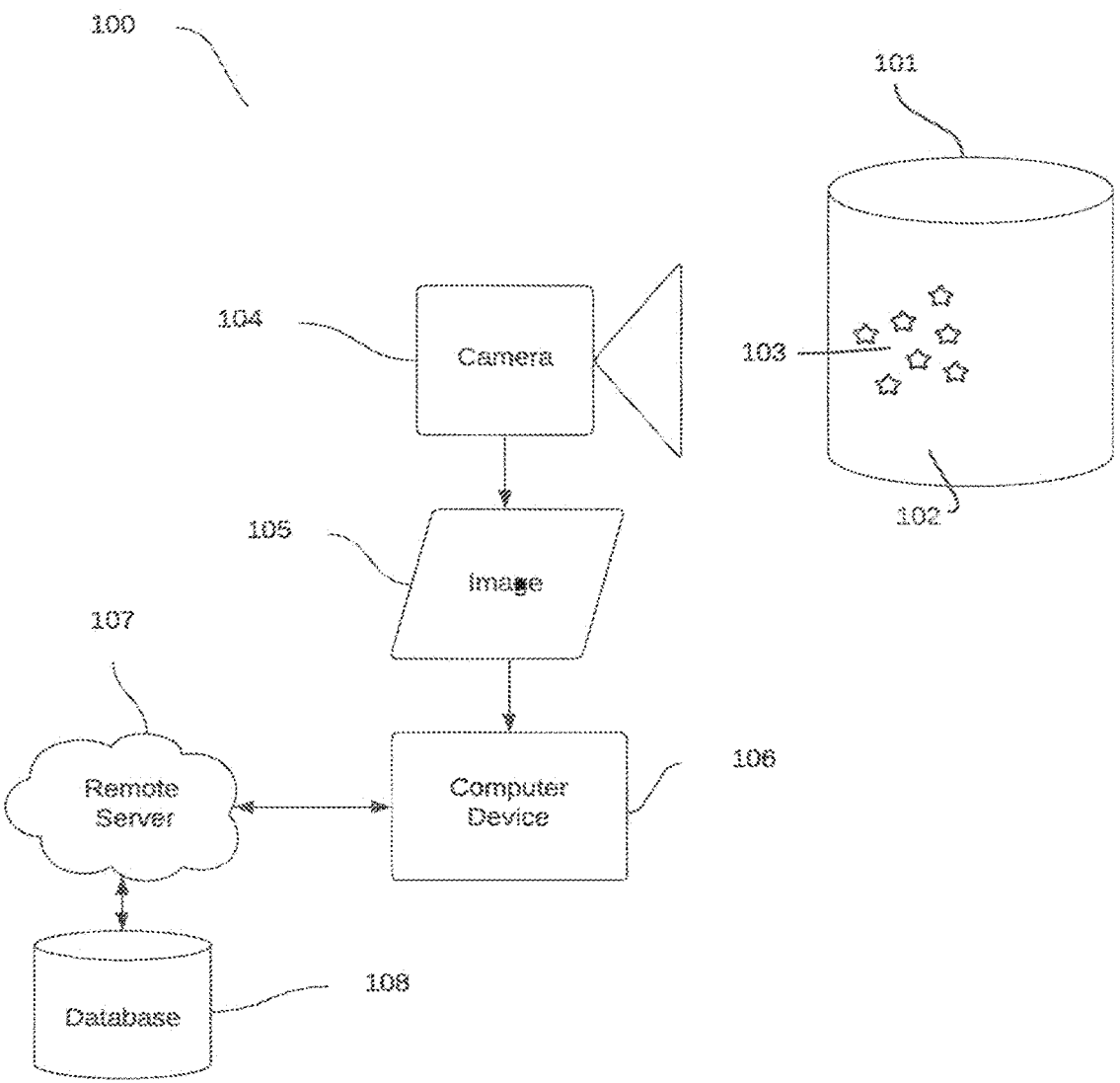
FIG. 1 depicts sample applications of an object decorated with an imperfect pattern.

FIG. 1 depicts an imperfect pattern in various applications. An object 101 contains a physical surface 102 displaying an imperfect pattern 103.

When captured by a scanning device such as a camera 104, the imperfect pattern may be distinguished in the surface 102 such that in a captured image 105 of the surface 102 one may discern between at minimum two characteristics. For example, a pattern 103 may consist of dark colored marks on a light colored background, and a brightness level may be captured by a camera 104 and stored in a single-bit monochrome image.

In preferred embodiments, there may be a plurality of discernible characteristics. For example, the pattern may be represented by a continuous tone RGB, RGBA or CMYK image. When captured with a camera 104, a surface 102 decorated with such a continuous tone image has many discernable characteristics.

In some embodiments, the characteristics of an imperfect pattern may not be distinguished in the visible light spectrum, but may be distinguished in an image capturing infrared, ultraviolet, or some other spectrum of energy.

In some embodiments the imperfect pattern 103 may be represented in a pattern image which includes an "alpha" channel that indicates the degree of transparency for each pixel of the image. When applied to an object 101, the transparent portions of the pattern shows through the underlying surface characteristics of the object 101. For example, a sticker that has an imperfect pattern 103 with both transparent and opaque regions may be applied to the surface 102 of an object 101.

In some embodiments, the imperfect pattern 103 may comprise a bounded pattern, such as a logo enhanced with additional graphics. In other embodiments, the imperfect pattern 103 may repeat (similar to repeatable patterns used in textiles, wrapping paper, or wallpaper) and may cover a large portion, or the entirety of a physical surface 102, or may cover multiple surfaces of a physical object 101.

The physical object 101, for example, may comprise an article of clothing, a container, a product, packaging, a part, a textile, a tabletop, wallpaper or a physical structure. The pattern 103 may be applied by means of manufacturing. For example, the pattern 103 could be part of the plastic mold used to create the object 101, it could be engraved or printed onto the object 101, or the pattern 103 could be applied to a label which is adhered to a surface of the object 101.

The surface 102 may be curved such that it is not planar. As an example, the object 101 may be a food or beverage container. The surface 102 may be a flexible fabric, as an example, a shirt, which may curve, or may wrinkle or fold over. As another example, the surface 102 may be a surface of a sheet of paper, such as a page of a book or magazine, and the surface 102 may become deformed when a person holds the paper in their hand.

As another example, the imperfect pattern 103 may be wrapped or attached onto a surface 102. A vehicle may be wrapped with a plastic film imprinted with the imperfect pattern 103. A retail store may attach a price tag including an imperfect pattern 103 to a an object 101 which is a product they wish to recognize with their point of sale system. At a facility, such as a repair shop, manufacturing plant, or hospital, an object 101 may comprise a tag printed with an imperfect pattern 103 to their physical assets in order to track them.

In one example, the object 101 may comprise a not yet assembled cardboard box inscribed with an imperfect pattern 103 with an ink-jet printer or laser engraving device. A production line manufacturing such boxes could advance through sequential serial numbers, printing or etching each box surface 102 with a unique imperfect pattern 103 corresponding to a unique ID tag. Both in flat form and after assembly, the box may be scanned from any side or portion of any surface in order to quickly obtain the box's unique ID. The encoded unique ID could be used, for example, to identify a delivery address for the box, to inventory the contents of the box, or as an authentication device to ensure that the box (and its contents) are traceable to a legitimate, non-counterfeit source.

As another example, an object 101 may be manufactured in a mold. For example, an object 101 may comprise a plastic container. The object 101 may be designed in a computer aided design system, mapping an imperfect pattern 103 prepared according to an embodiment of the invention onto the surface 102 of the object 101, and then perturbing the mold for the object 101 at the locations that features of the imperfect pattern 103 appear on the texture mapped object.

As another example, the imperfect pattern 103 may be printed on, or otherwise manufactured into, a surface 102 of a textile. Such a textile could be formed into an article of clothing such as a hat, a shirt or a dress, or could be formed into an accessory such as a wallet or purse. The textile may be deformed by the person or object that it wraps.

We may seek to hide the surface 102 of an object 101 to some while identifying the object 101 to a select few. For example, the imperfect pattern 103 may be a form of camouflage, hiding the surface 102 of a vessel, vehicle, uniform, or piece of equipment to human observers. Those in possession of the decoder, however, would be able to locate and identify the object 101 in a streamed image.

As another example, the imperfect pattern 103 may be projected onto a surface 102. For example, a venue such as a theater could display an imperfect pattern 103 on a movie screen to be scanned by patrons.

An image capture device, such as a camera 104, captures an image 105 of the surface 102 displaying the imperfect pattern 103. The surface 102, may be curved or captured at an angle, and thus be geometrically distorted in the image 105.

The imperfect pattern 103 of the surface 102 may be partially obscured in the image 105 by other objects between the camera 104 and the surface 102, or the surface 102 may have additional markings or labels added which cover or obscure parts of the imperfect pattern 103.

The image 105 may be blurred by the focus of the camera 104, or by motion of the camera 104 relative to the object 101.

Thus, the image 105 may not contain an exact copy of the imperfect pattern, but rather a "swatch" of the imperfect pattern, wherein the swatch may contain only portions of the pattern, and the portions of the imperfect pattern may be distorted by various processes such as mapping the imperfect pattern onto a 3d surface, capturing the surface with a camera, and processing and compressing the image.

While prior art codes require specific features which are used as a locating device (such as the corner squares in a 'QR' code) to be present, imperfect patterns do not require any specific portions of the pattern to be present in the swatch. Disjoint swatches of a pattern, having no portions of pattern in common, may be equivalently convey the payload of the imperfect pattern 103.

In one embodiment, when captured by a camera 104 into a raster image 105 and transmitted to a computer device 106, the imperfect pattern 103 may be decoded into a verified data record by a decoder.

In another embodiment, the computer 106 receiving the image 105 may transmit the image 105, or a processed or cropped portion of the image 105, to the remote server 107 which may perform the decoding function. The computer 106, may comprise a portable computing device, for example, a smartphone or a scanner.

The verified data record may represent a unique identifier. For example, the verified data record may represent a serial number. The remote server 107 may use the verified data record in order to index a second data record, for example a data blob stored in a database 108 that is to be associated with the object 101.

From time to time, the data blob associated stored in the database 108 may be altered. For example, if the object 101 comprises a container such as a shipping container or some other container used in a facility such as a factory, and the container is reused, the data blob may be updated with a new destination for the container without having to modify the container.

The imperfect pattern 103 may be used as an encryption device. For example, a data record identifying a sought after object 101 may be encoded into an imperfect pattern 103 on the object 101, the identification only available to those in possession of the decoder. For example, a concert ticket may be decorated with an imperfect pattern 103 encoding a seat number that cannot be produced by those not in possession of the encoder. Or as another example, an admirer may pass love notes encoded into an imperfect pattern 103 on an object 101 given to the object of their affection.

A surface 102 may be decorated with more than one imperfect patterns, for example, such that a first pattern overlays a second pattern. Each pattern may convey a separate data record, and each is accessible only to those in possession of the pattern's respective decoder.

Once an image 105 is decoded into a verified data record, the computer 106 or remote server 107 may perform an action in relation to the object 101.

For example, the object 101 may be processed through a sorting machine, and the computer 106 may direct the path of the object 101 into a bin or onto another conveyor belt.

As another example, the location of the scanning action may be transmitted to a remote server 107, and the database 108 may be updated with the new object 101 location in order to track the object 101.

As another example, the object 101 may be an article of clothing encoded with an imperfect pattern 103, and the imperfect pattern 103 may contain graphics related to a music band. When scanned and decoded, the recovered data record could identify the fan and redirect to their social media personas.

Alternatively, an imperfect pattern 103 displayed on an object 101 such as an article of clothing could be used to encode a serial number for the article. For example, a hoodie may have printed on it a graphic which encodes the serial number for the hoodie production run. The fashion company that produces the hoodie could allow users to register their purchase as the rightful owner of the article. An article that is sold, may have its registration digitally signed over to the purchaser. A smartphone application or web application running on a computer device 106 such as a smartphone may be used to scan the hoodie and, by communicating with a remote server 107, verify the current owner, or potentially see the entire history of ownership of the hoodie.

As another example, an imperfect pattern 103 may contain a trademark graphic of a manufacturer such as Louis Vuitton or Chanel, which is often repeated across a surface of a branded item such as a wallet, bag or suitcase. The repeating graphic pattern may be perturbed according to embodiments of the invention so that a unique, verified data record may be recovered from an image of each different product. This data record may establish that the product is genuine, or provide manufacturing or ownership data about the product.

As another example, the computer 106 may be a point-of-sale system, for example an automated checkout counter at a store, and the imperfect pattern 103 may identify an object 101 which is a product. The imperfect pattern 103 may index the product in a database 108, and may communicate to a point-of-sale system the price and weight of the item 101 so that the price may be added to a total. The remote server 108 may also keep a count of inventory and deduct the count for an object 101 which is scanned.

Overview

Figure 2:
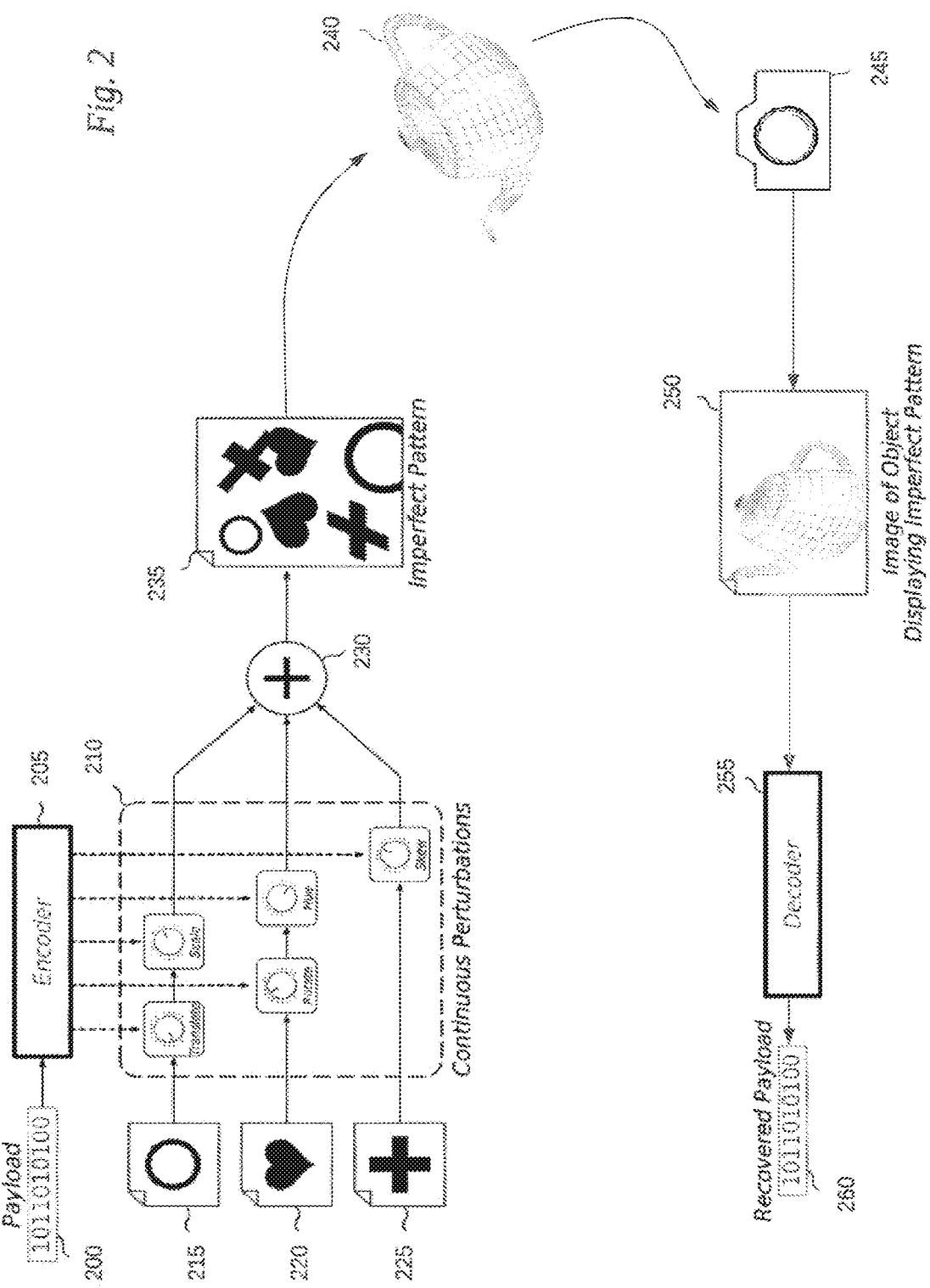
FIG. 2 depicts an overview of a system according to an embodiment of the invention.

FIG. 2 shows an overview of a system according to an embodiment of the invention. The system comprises two cooperating phases: an encoding phase (200 through 235) and a decoding phase (245 through 260). In the encoding phase, an encoder 205 accepts a data message (payload 200) and adjusts a plurality of continuous perturbations 210 which affect the appearance of various graphical elements (represented by simple shapes 215, 220, 225). These elements, perturbed as directed by encoder 205, are assembled in a compositing operation 230 to form an imperfect pattern 235. This imperfect pattern would be distinct from a pattern created by the encoder 205 based on a different payload 200.

Imperfect pattern 235 is a two-dimensional graphical image—something computer-graphics practitioners might refer to as a "texture," but it could also be conceptualized as a patterned wrapping paper which could be used to wrap a package. Graphical processes and techniques discussed below can permit the encoder to generate tileable imperfect patterns—patterns that can be repeated seamlessly in one or more directions to cover larger objects. Imperfect pattern 235 is the useful output of the encoding phase of this system.

Imperfect pattern 235 can be applied to a real-world object, represented here as a teapot 240. Mapping 2D textures to objects of different shapes is a common problem in computer graphics, and many contemporary techniques are known to accomplish this mapping smoothly. In one simple approach, one could print imperfect pattern 235 on paper and use the paper to wrap an object. Alternatively, the imperfect pattern 235 could be printed directly on an object, painted onto an object, or formed directly into the surface in a way that is optically perceptible.

An image 250 of the object 240 displaying the imperfect pattern 235 can be captured by, e.g., a camera 245. This image 250 is the input to the second cooperating phase of the system depicted here. Note that a number of distortions may affect the appearance of the imperfect pattern 235 in image 250: distortions may arise during mapping the imperfect pattern 235 onto the surface of the object 240; optical distortions (perspective shifts, chromatic aberrations, clipping) may occur during the acquisition of image 250, and image 250 may also include extraneous foreground and background objects that make it difficult to discern the imperfect pattern 235 on the object 240.

Nevertheless, decoder 255, created as described below, is able to recover a data payload 260 by analyzing image 250. Error-detection and correction techniques are used to ensure that the recovered payload 260 matches the original payload 200. If image 250 does not show any object displaying imperfect pattern 235, if there is not enough of pattern 235 to analyze, or if distortions of the pattern are too severe, decoder 255 will not report a recovered payload at all-if a payload is recovered, then it will be the original payload (to a configurable degree of certainty).

FIG. 3 depicts two different payloads encoded into imperfect patterns. A first payload 300 is processed by an encoder 305 to produce a first plurality of continuous perturbations 310 which affect the appearance of various graphical elements (represented by simple shapes 315, 320, 325). These elements, perturbed as directed by encoder 305, are assembled in a compositing operation 330 to form a first imperfect pattern 335.

A second payload 301 is processed by the encoder 305 to produce a second plurality of continuous perturbations 311, having different values from the perturbations 310 associated with the first payload 301. The graphic elements (315, 320, 325, perturbed as directed by the encoder 305, are assembled in the compositing operation 230 to form the second imperfect pattern 336, having a different appearance than the first imperfect pattern 335.

Figure 4:
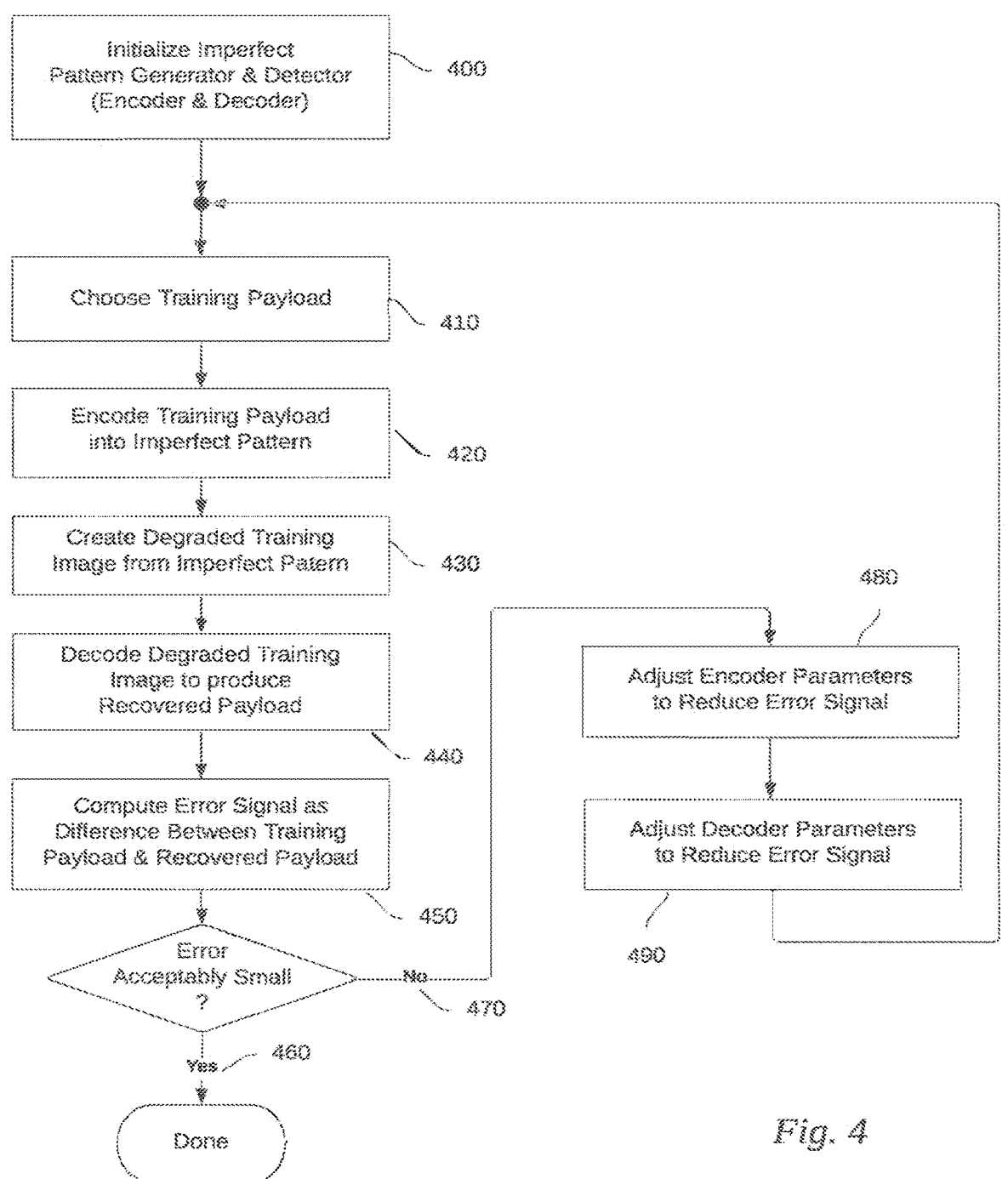
FIG. 4 depicts an embodiment in which an encoder and decoder are produced together by a machine-learning process.

The encoder and decoder in an embodiment are produced together by a machine-learning process that operates as outlined in FIG. 4. The process begins with the initialization of an imperfect pattern generator (encoder) and imperfect pattern detector (decoder) (400). The encoder produces an imperfect pattern by applying continuously-valued perturbations to one or more basic image components under the control of a data payload. The decoder receives an image and produces a recovered payload from the image. (The decoder may be initialized randomly, and at the start of training, it is unlikely that the recovered payload is anything like the data payload.)

Next, in an iterative process, a training payload is chosen (410). This may be a random choice, or if a system is being prepared to encode and decode messages having a common characteristic structure, the training payloads may conform to the common structure.

Note that each iteration of the training process may be performed on batches of data rather than single items of data. For example, instead of choosing a single training payload 410, one may choose a plurality of training payloads 410 which are all to be encoded in a batch. Subsequent operations may be stated in the singular form, but the reader should understand that the operations may be performed on the batch of data rather than a singular data item.

The training payload is provided to the encoder, which produces a corresponding imperfect pattern (420). An image degrader creates a degraded training image from the imperfect pattern (430). For example, the image degrader may distort the imperfect pattern, change its color balance, or erase part of the pattern. The degrader may operate by constructing a three-dimensional scene containing objects of various shapes, applying the imperfect pattern to one of the objects, and then rendering a camera view of the scene; but simpler degradations also perform acceptably here.

Now the degraded training image is provided to the decoder, which produces a recovered payload (440). At the beginning of training, the recovered payload may be basically random.

An error signal is computed as the difference between the training payload and the recovered payload (450). If the error is acceptably small (460), then training is complete, and the encoder and decoder can be used together to transmit data payloads via imperfect patterns displayed on objects, whose images may be captured and decoded.

If the error is still unacceptably large (470), then encoder parameters are adjusted to alter the encoder's use of available perturbations when creating the imperfect pattern based on a payload (480). In addition, decoder parameters are also adjusted to change the way the decoder analyzes an image to recover the payload (490). The training process (410-490) is repeated until the error signal decreases below an acceptable level.

Imperfect Patterns as Textures

An imperfect pattern may be represented in raster form as a pattern image. The pattern may be represented in a two-dimensional pattern space, which may be similar to a texture space used in computer graphics. For example, the pattern space may include a 'u' dimension or axis as well as a 'v' dimension or axis, with a domain of 0.1 in each dimension.

The pattern image may be similar to a computer graphics texture, in that it may be applied to a three-dimensional object in a repeating or non-repeating manner. The pattern image may also be printed as a decal and applied to a surface.

An imperfect pattern, defined by the pattern template and mark parameters, may be sampled, or evaluated as a mathematical function, at any (u,v) coordinate point of the pattern space. Each point of pattern evaluation is called a "sample". The pattern space may be divided by a rectangular grid of pixels, and a sample, or plurality of samples, may be evaluated inside each pixel. For example, the samples may be uniformly, or randomly placed within the pixels. Multiple samples per pixel may be averaged to create an anti-aliased pattern image.

From the field of computer graphics, a procedural texture is a function which typically takes a (u,v) texture coordinate as input and yields a color value. The color value may, for example, comprise a floating-point RGBA color and transparency. Similarly, an imperfect pattern may be sampled by a mathematical function, also taking a (u,v) texture coordinate as input, but additionally requiring a vector of mark parameters as input. The mark parameters may be a representation of the binary data that is to be encoded into the pattern for later retrieval via the decoder.

Like textures, patterns may also be applied in a repeating manner, for example, by making them periodic to both u and v inputs such that outside the 0 . . . 1 domain a texture would map values back into the 0 . . . 1 range by use of the fractional component of the texture coordinate. In this way a texture coordinate of (1.5, −0.3) maps to the texture coordinate (0.5, 0.7). Using this method, one can repeat texture maps indefinitely in texture space, and that repeated texture may be mapped to the surface of an object.

Any 3D object can be scanned and modeled in a computer as a surface model (for example, a mesh of triangles based on 3D vertices, which approximates the object-shape as accurately as desired). Using either manual or automatic approaches, the surfaces of a model can then be texture mapped, where a texture coordinate is also designated for all vertices of a model. A triangle's texture coordinates may be linearly interpolated in order to provide continuous texture coordinates across the surface of the triangle. Two abutting triangles which share two vertices may also share the texture coordinates defining, and as such provides a continuity of texture coordinates across a piecewise surface.

Rudimentary (2D) System

We have described preferred embodiments of the systems in which we may construct a wide range of attractive imperfect patterns to attach to a surface, and then easily extract a verified data record from an image of a surface, when the surface is curved or shot at an angle, or when just a small portion of the pattern is visible.

In order to best build up to the preferred embodiments, we will first lay some groundwork by explaining some rudimentary embodiments of the systems to illustrate how certain components are constructed through a cogeneration process, which may comprise a machine-learning ("ML") training process.

We will first describe a rudimentary "two dimensional" (2D) system that encodes a data record into a pattern image and then decodes the pattern image back to a data record. This will allow us to digest several concepts before explaining preferred embodiments which build directly on this rudimentary system.

Rudimentary Encoding

Figure 5:
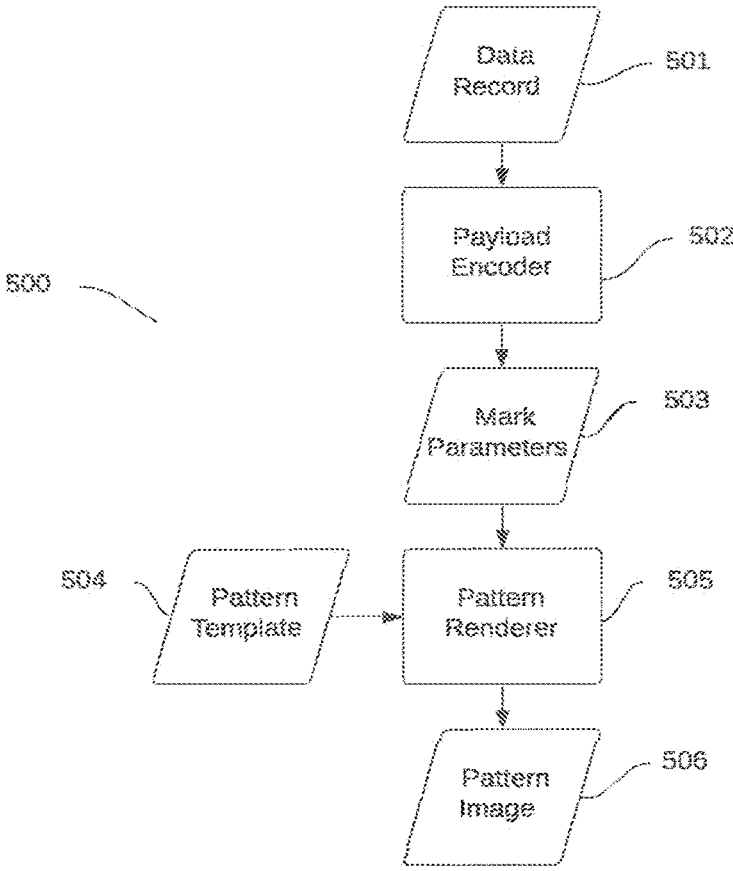
FIG. 5 depicts an encoding process to convert a data record into a pattern image.

FIG. 5 depicts a rudimentary embodiment of a pattern encoding process 500 which encodes a data record 501 consisting of a fixed number of bits, for example 64 bits. The number of bits is specified during the training process for the encoder 502. Padding may be added to a smaller data record in order to yield the fixed record length.

A pattern template 504 describes a graphic pattern which may be made 'imperfect' by introducing variability to the representation of graphic elements in the pattern. These various elements of the pattern are referred to as 'marks'. The pattern template 504 may describe a number of marks, each mark potentially having one or more ways in which it may be transformed and rendered with some inconsistency or imperfection in order to contribute to a visual representation of the data record.

The payload encoder 502 converts a binary data record 501 into mark parameters 503 consisting of a vector of real-valued numbers sufficient in length to provide parameters for the variabilities of each mark in the pattern template 504. For example, a pattern template may contain 16 marks, with each mark requiring two mark parameters for transformation. This totals to 32 mark parameters so the mark parameter vector would need to have at minimum 32 components. The mark parameters may, for example, be represented by a floating-point number in a computer, which may be given any number of bits of precision.

The payload encoder 502 may comprise a machine learning model such as a neural network, and may have a plurality of internal values (for example, weights and biases) which drive the functionality of the model.

A pattern renderer 505 interprets the pattern template 504 with mark parameters 503 and yields a pattern image 506 as output. The pattern renderer 505 may accomplish this, for instance, by dividing the pattern space into a grid of pixels, generating one or more (u,v) sample coordinates for each pixel of the image, sampling the pattern at the (u,v) coordinates, and then averaging the samples within each pixel to yield a resultant color value for each pixel.

The pattern image 506 may comprise a raster image containing brightness values for one or more color channels. The pattern image 506 may also include a channel to indicate the transparency value of each pixel. For example, the pattern image 506 may be represented by RGBA color.

Note that the variability of a mark in the pattern image 506 is not based on a fixed number of discreet steps, or visual states of the mark, but rather may represent "continuous" variability of the mark as represented in the mark parameters 503. The pattern renderer 505, which may synthesize a pattern image 506 by stochastically sampling the pattern space at random nondiscreet locations, produces a pattern image 506 in which marks are transformed in a continuous manner visually as well. (A small or infinitesimal change the output of the payload encoder 502 will be visually represented in the pattern image 506.) The continuous nature of mark variation may be a distinctive and salient feature of imperfect patterns.

Pattern Rendering

Figure 6:
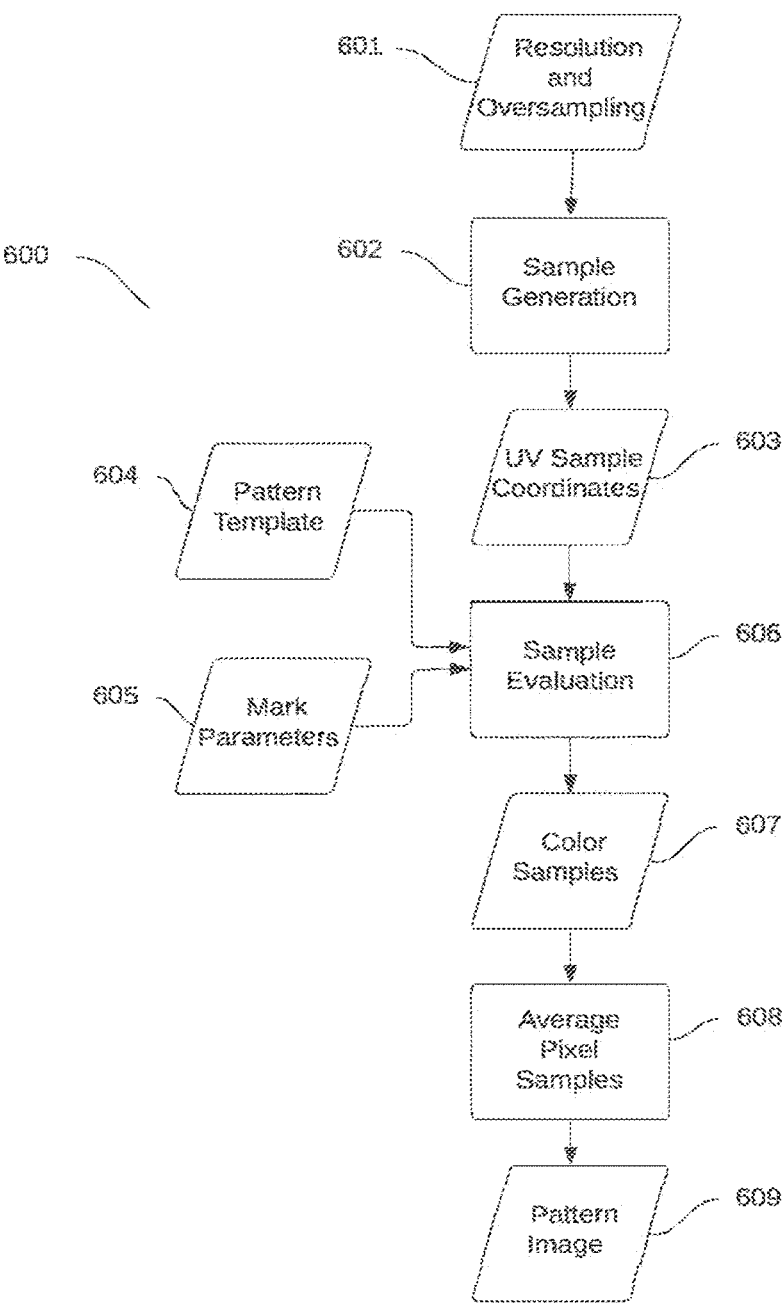
FIG. 6 depicts a pattern rendering which converts a pattern template and mark parameters into a pattern image.

Recall that the pattern renderer expresses a pattern template with mark parameters and yields a pattern image. FIG. 6 depicts an example process 600 for rendering the pattern image.

In this process, resolution and oversampling values 601 may be used to generate 602 sample coordinates 603, which when combined with a pattern template 604 and mark parameters 605 may be used to produce a corresponding set of color samples 607 which may then be averaged 608 in order to produce the pixels of the pattern image 609.

A pattern image 609 may be rendered based on a pattern template 605, a set of mark parameters 605, and a given resolution 601. For example, the image resolution may be 224×224 pixels. Each pixel of the pattern image 609 may be rendered from just one sample, or may be rendered from multiple samples. Multiple samples per pixel is called 'oversampling'.

Resolution and oversampling values 601 for the desired output image format are used to generate 602 the UV Sample Coordinates 603. For example, a pattern may have a non-repeating range such as a range of 0 . . . 1 in both u and v dimensions. The space may be evenly divided by a grid of rectangular pixels covering the range of u and v. One or more samples may be generated for each pixel, for example a sample may be placed randomly inside the pixel, at the center of the UV range for each pixel, or the pixel may be further subdivided by a grid, and a sample placed at the center of each of the grid subdivisions.

Next, each sample is converted into a color value. A pattern template 604, describing the construction or metaparameters of the pattern, and a vector of mark parameters 605 supplying the values for the transformations of marks in the pattern, are fed into a function performing sample evaluation 606 of the UV sample coordinates 603 which yields a tensor of color samples 607.

The color samples, for example, may comprise RGBA samples containing values for red, green, blue and alpha, where alpha indicates the transparency of the color sample.

The color samples 607 within each pixel may be averaged 608 together to yield the pattern image 609.

Rudimentary Decoding

Figure 7:
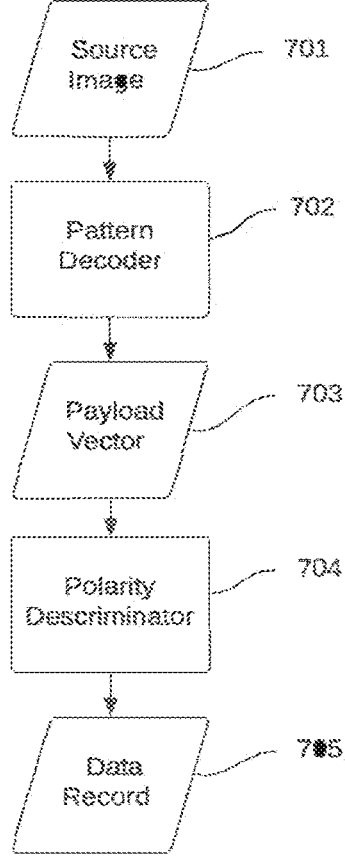
FIG. 7 depicts a pattern decoding process which extracts a data record from a source image containing an imperfect pattern.

FIG. 7 depicts a rudimentary embodiment of a pattern decoding process 700. A source image 701 which contains a swatch of an imperfect pattern is received by a computer and processed by a pattern decoder 702. The imperfect pattern may be a pattern image created by an encoding process such as process 500 of FIG. 5, wherein the payload encoder (502 of FIG. B) and the pattern decoder (702 of FIG. 7) may be a matched pair of components that have been cogenerated together specifically with the pattern template 504.

The pattern decoder 702, may comprise a trained ML model. The model could, for example, have the architecture of a neural network, a convolutional neural network, a residual neural network, or a transformer. The model could also have a plurality of internal values (e.g., weights and biases) which drive the functionality of the model.

The pattern decoder 702 processes the source image 701 to yield a floating-point payload vector 703. The payload vector 703 is a fixed length (for example 64 elements) corresponding to the fixed number of bits with which the pattern decoder 702 was trained.

A polarity discriminator 704 compares each component of the payload vector 703 to zero. Payload vector elements greater than zero are assigned a binary '1' bit, and elements less than or equal to zero are assigned a binary '0' in the output data record 705.

Model Cogeneration

Recall that the pattern encoding process 500 depicted in FIG. 5 utilizes a component called a payload encoder 502, and that the pattern decoding process 700 depicted FIG. 7 utilizes a component called a pattern decoder 702, and that these components may comprise machine learning models and may have a number of internal values (e.g. weights and biases) that control their behavior.

Figure 8:
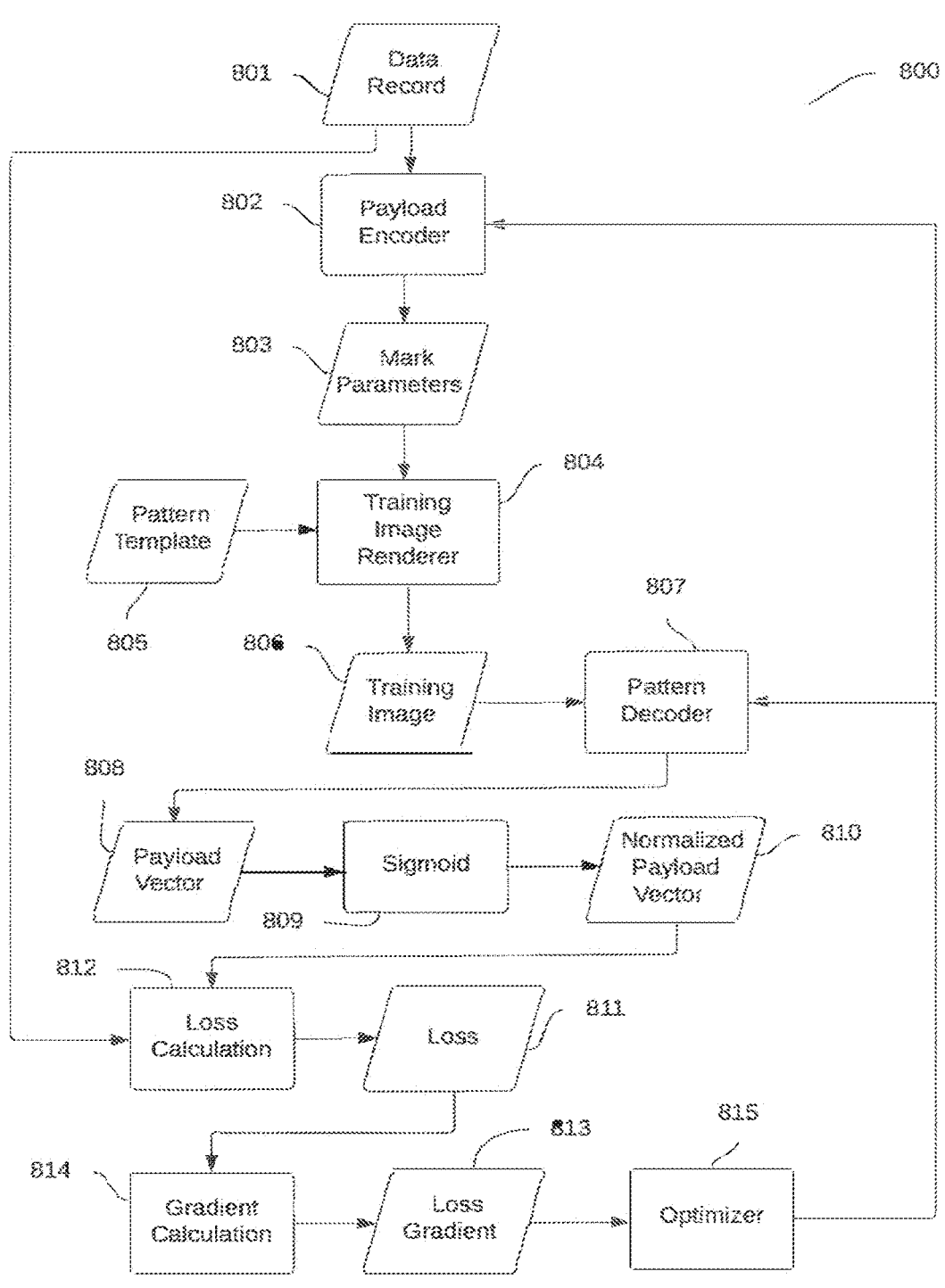
FIG. 8 depicts a process to cogenerate encoder and decoder models.

FIG. 8 depicts an embodiment of a process 800 to simultaneously generate (or 'cogenerate') the payload encoder and pattern decoder models by determining these models' internal values. Arrows in this diagram show the flow of information through the system.

During a training process, a payload encoder learns how to encode a data record into mark parameters such that the encoded data record may be reliably discerned, and simultaneously a pattern decoder learns to recognize the encoded data records from images showing portions, or "swatches," of the imperfect patterns. The process is analogous to an evolutionary process (more specifically a process of coevolution), and the encoding scheme used internally by the payload encoder and pattern decoder develops through small changes of the two models over many iterations of a training process.

Recall that the payload encoder and pattern decoder may have a plurality of internal values which drive the functionality of their models. The internal values for both models may be determined by a process of optimization, for example by using a method of stochastic gradient descent. Many such optimization algorithms are suitable for this purpose; SGD, Adam, and Ranger, for example, are all suitable optimization algorithms which use calculated gradients of a model's internal values to iteratively improve models.

A training system may function as follows:

Initially, both models may be assigned a pseudo-random number for each of its internal values. For example, a common machine learning model, ResNet34, has approximately 63 million internal values which comprise the model's weights and biases. A random value is chosen for each weight and bias as its initial value. Then, an iterative process incrementally adjusts all internal values for both models incrementally until the models reliably perform their functions within the closed loop training process 800.

The iterative process may be performed on batches of data, as is common with machine learning training. So while we may refer to data passed through the system in the singular, it should be understood that in preferred embodiments, each item is instead a batch of data rather than a singular datum.

To start an iteration, a batch of data records 801 are generated with random binary values for their constituent bits and fed into a payload encoder 802 which applies its current internal values (e.g. weights and biases) to yield a batch of mark parameter vectors 803.

A training image renderer 804 processes the pattern template 805 with the supplied batch of mark parameters 803 to produce a batch of training images 806. The training image renderer 804 may comprise a pattern renderer such as the pattern renderer depicted in FIG. 6 as process 600. In preferred embodiments, the training image renderer 804 may instead comprise a process of rendering a three dimensional model displaying the imperfect pattern with various distortions. The produced training images 806 may be raster images with channels for one or more color or transparency values, for example, red, green, blue, and alpha.

For best results, the data encoding variation applied to each mark should be performed in a continuous and differentiable manner through the transformation and rendering processes of the image renderer 804; This is preferred because in order to predict the effect of a small change to an internal value on the loss, it is beneficial to be able to calculate a continuous derivative of the loss with respect to that internal value.

A pattern decoder 807, using its current internal values, processes the training images 806 in order to produce floating-point payload vectors 808. Although data records 801 may have only values of one and zero, the payload vector 808 may have values in the full floating-point range. These values are processed by a sigmoid function 809, yielding a recovered normalized payload vector 810 consisting of continuous values between zero and one. The sigmoid function 809, for example, may be expressed as sigmoid(x)=σ(x)=1/(1+e$^x$).

A single floating-point loss value 811 is calculated 812 for the batch. This loss value may, for example, be the average of the mean squared difference between the recovered payload vectors 808 and vectors of 0's and 1's corresponding to the bits of the data record 801 that were fed into the payload encoder 802.

Next, a gradient 813, or partial derivative of the loss with respect to each internal value of the payload encoder and pattern decoder models, is calculated 814, for example, through the process of back propagation.

The loss gradient 813 is used by an optimizer 815 to very slightly modify their corresponding model internal values, in the direction that would provide a lower loss value for the current batch of data records 801 and training images 806. Given our example loss calculation, a lower loss value would equate to a more robust encoder 802 and more accurate decoder 807. The optimizer 815 may comprise a machine learning optimizer such as a method of stochastic gradient descent (SGD), Adam, or Ranger.

This iterative process is repeated a number of times, each iteration with a new random batch of data records 801, and with each iteration slightly adjusting the internal values of the payload encoder 802 and pattern decoder 807. After a predetermined number of iterations, or when the loss value reaches a predetermined limit, the training process 800 is terminated. We have determined the internal values for both models which are now "trained" models.

The trained payload encoder 802 may be used as the payload encoder 502 in the pattern encoding process associated with FIG. 5, and the trained pattern decoder 807 may be used as the pattern decoder 702 in the pattern decoding process associated with FIG. 7.

In order to further understand how the backpropagation may be used to calculate gradients all the way along the chain from loss back to the model internal values, it is helpful to recognize that each of the processes in the flowchart may be represented as mathematical functions. For example, let us represent the payload encoder with a function 'E( )', the pattern renderer with a function 'R( )', the pattern decoder model with a function 'D( )', and call the sigmoid function 'S( )'. Let us also label the encoder model internal values 'Pe', and the decoder model internal values 'Pd'. Then given a simplified example of a single data bit data record 'i' and a batch with just one item, the loss 'L' may also be described by a composite function, for example:

$$L(i, Pe, Pd) = (S(D(R(E(i, Pe)), Pd)) - i)^2$$

As we have created functions E, R, D, and S to be continuous and thus differentiable to their inputs, the function L( ) is also differentiable with regard to Pe and Pd, the internal values for the models. This also holds for a multi-bit data record and to a loss value calculated for a batch.

Thus we are able to determine a gradient which comprises the partial derivative of L with respect to every element of Pe and Pd. Several software platforms allow mathematical procedures or functions to be performed in such a way that gradients may be automatically calculated. For example, TensorFlow and PyTorch platforms both make encoding each of these procedures much simpler by automatically storing intermediate values and calculating gradients through processes of backpropagation.

Let's examine a specific example of this rudimentary system in order to gain a better understanding how the system works at a lower level.

Rudimentary Pattern Example

FIGS. 9A, 9B, 9C, and 9D visually demonstrate the encoding process 500 of FIG. 5 and decoding process 700 of FIG. 7.

Recall that we disclosed a rudimentary encoding process 500 associated with FIG. 5.

Figures 9A, 9B, 9C, 9D:
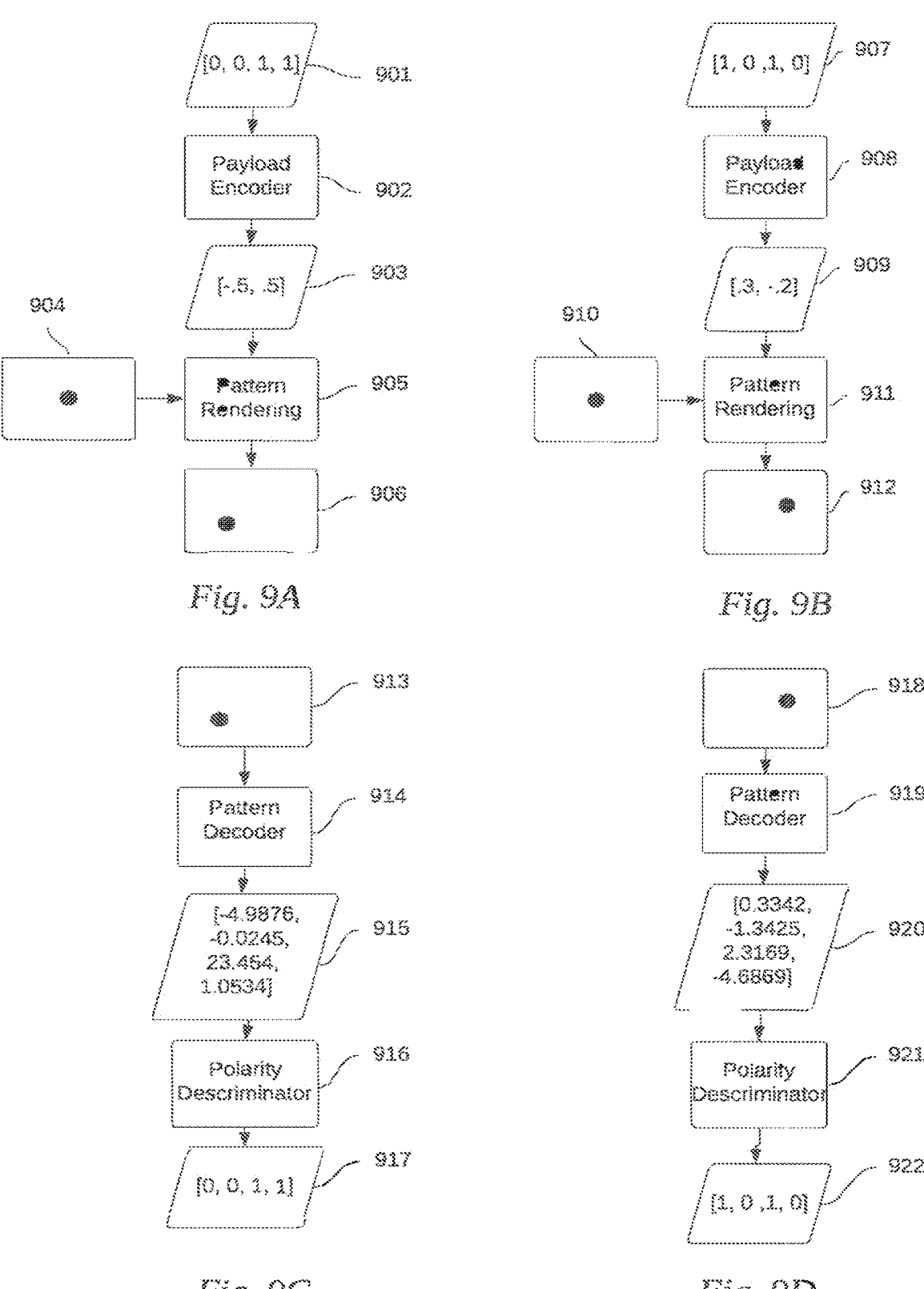
FIGS. 9A, 9B, 9C and 9D depict encoding and decoding processes with example data.

FIG. 9A depicts a specific example of that process with a system that encodes a 4-bit payload 901 into a pattern image 906 containing a single dot. The position of the dot may vary in the pattern image 906 in order to represent the data record 901.

A predetermined 4-bit data record 901 of '0011' is fed into a payload encoder 902 which has been trained for use with a pattern template 904. Recall that a payload encoder 902 may comprise a trained neural network and is used to turn a data record 901 into mark parameters 903 for the pattern template 904 it was trained to work with. This encoder 902 will have already gone through a training process in which it learned to effectively control the pattern template 904 in order to create distinct images that reliably encode the data record 901.

By adjusting the mark parameters 903, the payload encoder 902 essentially turns the knobs of the pattern template 904 as it sees fit in order to create an imperfect pattern in a pattern image 906 that in some way convey the payload 901 to the decoder network. In this case, based on its input, the payload encoder 902 produces a vector of mark parameters 903 which is [−0.5, 0.5].

As an example, this pattern template 904 defines a variable pattern comprising a small back dot over a white background. The depiction of the pattern template 904 in FIG. 9A represents the pattern in its "perfect" form before transformations are applied, which is equivalent to the pattern rendered with mark parameters of all zeros.

This template will take two floating point mark parameters 903 which when rendered affect where the dot is located in relation to the center of the image 906. One parameter will be used to translate the dot in the horizontal (u) dimension and the other will be used to translate it in the vertical (v) dimension. When rendered 905 with mark parameters of [−0.5, 0.5], for example, the pattern template yields a pattern image 906 with a single dot in it that is 0.5 units to the left of the center and 0.5 units below the center of the pattern image 906.

A different set of mark parameters would result in an image with a dot in a different place. The pattern images are made distinct (and imperfect) by moving the dot around with the two parameters we give the template.

FIG. 9B depicts the same system applied to a different data record. The payload encoder 908 is the same payload encoder 902 as used in FIG. 9A, and the pattern template 910 and pattern rendering process 911 are identical to the pattern template 904 and pattern rendering 905 from FIG. 9A.

When we give the payload encoder 908 a different data record 907, for example '1010', it then yields a different vector of mark parameters 909, perhaps [0.3, −0.2], which could then be used to render 911 a pattern image 912 with the dot in a new position.

With each unique payload, the payload encoder produces a unique set of mark parameters. With each unique set of mark parameters, the pattern template is rendered to produce an image with a dot in a unique location. In this way, every possible payload could be fed through to create a new and distinct image. Inversely, each one of these distinct images could be associated with its original payload.

Recall we disclosed a rudimentary decoding process 700 associated with FIG. 7.

FIG. 9C depicts a specific example of that process used in conjunction with the rudimentary pattern encoded in FIG. 9A.

Let's take the pattern image 906 from FIG. 9A (encoded with '0011') and feed it as the source image 913 to the pattern decoder 914 of FIG. 9C.

A pattern decoder 914 has been trained to extract payloads from images made with our example encoder network and pattern template. This decoder network 914 takes in an image 913 as input, and yields a floating-point payload vector 915 representing the payload it extracted from the image. In this case, the decoder 914 will return 4 bits of extracted payload 915, matching the payload encoder 902 it was trained with.

In essence, this pattern decoder 914 will have been trained to understand how the encoder 902 thinks by studying the images the pattern template 904 produces based on input from the encoder 902. With this understanding, the decoder 914 can look at the position of the dot in an image our encoder/template pair made, and figure out the payload 901 the encoder 902 was given in the first place.

The decoder 914 will process this source image 913 and come back with the payload 915 it thinks was used to make this image. It will give its answer in floating point numbers, something like [−4.9876, −0.0245, 23.454, 1.0534]. A polarity discriminator 916 figures out which of those numbers are positive and yields '1010', a data record 917 matching the originally encoded data record 901.

Similarly, FIG. 9D depicts another example of the decoding process 700 associated with FIG. 7 as applied to the pattern image 912 of FIG. 9B.

A source image 918, which is taken from the pattern image 912 of FIG. 9B, is fed into a pattern decoder 919, which is identical to the pattern decoder 914 of FIG. 9C. The pattern decoder 919 produces a payload vector 920 consisting of [0.3342, −1.3425, 2.3169, −4.6869].

A polarity discriminator 921, which is identical to the polarity discriminator 916 of FIG. 9C, processes the payload vector 920 to recover the data record 922 '1010'.

PyTorch Training Example

From these flowcharts of the single dot pattern, we can see how a small data record may be encoded into a pattern image using a payload encoder (FIGS. 9A,9B), and how a pattern image may be converted back into a data record using a pattern decoder (FIGS. 9C, 9D).

Recall from process 800 of FIG. 8 that the payload encoder and pattern decoder are components which are cogenerated through an iterative training process. In order to better explain how these components learn to perform their functions, a simple implementation of a training method for a single dot pattern implemented in PyTorch is shown below with the addition of line numbers to aid in explanation:

```
1    import itertools, torch, torchvision
2    PAYLOAD_BITS = 4
3    BATCH_SIZE = 128
4    EPOCHS = 5
5    def dot_image(params, dot_size=0.05, sharpness=10):
6        batch_size = params.shape[0]
7        u = torch.linspace(−1, 1, 224).repeat(batch_size, 224, 1)
8        v = u.permute(0,2,1)
9        uv = torch.stack((u, v), 3)
10       dist = (uv − params[:,None,None,:]).norm(dim=3)
11       return (dist −
    dot_size).mul(sharpness).tanh( )[:,None,:,:].repeat(1,3,1,1)
12    encoder = torch.nn.Linear(PAYLOAD_BITS, 2)
13    decoder = torchvision.models.resnet18(pretrained=False,
    num_classes=PAYLOAD_BITS)
14    optim = torch.optim.Adam(itertools.chain(encoder.parameters( ),
    decoder.parameters( )), lr=0.0002)
15       print('Epoch Loss Accuracy')
```

-continued

```
16    for i in range(EPOCHS):
17        payload = torch.rand(BATCH_SIZE, PAYLOAD_BITS) > 0.5
18        params = encoder(payload.float( ))
19        img = dot_image(params)
20        infered_payload = decoder(img).sigmoid( )
21        loss = (payload.float( ) – infered_payload).pow(2).mean( )
22        loss.backward(retain_graph=True)
23        optim.step( )
24        optim.zero_grad( )
25        accuracy = ((infered_payload > 0.5) == payload).float( ).mean( )
26        print('%5d %8.4f %8.2f%%' % ((i + 1), loss, (accuracy * 100)))
```

Lines 1-4 of the program imports the modules and defines some constants we will be using. As with the single dot example used in FIGS. 9A-9D, we will be encoding four bits, and we will train with a batch size, 'B', of 128.

On lines 5-11 we define the training image renderer 804 function called 'dot_image'. In this example, the training image renderer comprises a pattern renderer, such as the pattern renderer depicted in FIG. R. The dot_image rendering function yields an RGB image represented by a dimension 'B×3×224×224' tensor.

On line 12 we define the encoder model 802. In this example the encoder model is a single layer fully connected neural network which has an input dimension 'B×4' sized to the number of bits in the payload and output dimension 'B×2' sized to the number of mark parameters required by the template. This example uses a very small encoding network. For more complex patterns we would create a more complex encoding network, for example, a deeper network, a deconvolutional network, or transformer network.

Line 13 creates the pattern decoder model 807, which in this case is a residual neural network, the dimensions of the output of the neural network is set to 'B×4' to match the number of bits in the payload.

Line 14 creates an optimizer to perform the gradient descent to minimize our loss. In this case the optimizer chosen is Adam, which is an improved version of the Stochastic Gradient Descent algorithm. The optimizer may examine gradients from successive iterations in order to determine how to adjust model parameters in order to lower the loss. The optimizer is passed a list of parameters it will optimize, which in this case are all the internal parameters (weights and biases) of both network models.

On line 16 we begin the iteration process, in this case we will iterate with a number of optimization steps, or "iterations". Each iteration will adjust the internal values of the payload encoder 802 and pattern decoder 807 in order to lower loss.

With line 17, the first step of the process is generating a payload, or batch of data records 801, which are initialized with random Boolean valued bits.

On line 18, the payload 801 is processed by the payload encoder 802 to produce 'params', the mark parameters 803.

On line 19, the mark parameters 803 are passed to function 'dot_image', which is the training image renderer 804 yielding 'img', the training image. As in this example, the training image renderer comprises a pattern renderer, let's examine how that process works in relation to FIG. R depicting the pattern rendering process 600.

On line 5 we define the pattern renderer 600 as a function named 'dot_image'. The function takes a dimension 'B×2' argument 'params' which correspond to the mark parameters 605. The function also takes parameters dot_size and sharpness, which may be considered part of the pattern template 604 as they specify how this pattern will be rendered. A more sophisticated pattern renderer may interpret more pattern template parameters that specify the appearance of the pattern in any number of ways, but in this is a rudimentary example single-dot pattern renderer, we have only parameters 'dot_size' and 'sharpness' as our pattern template 604.

On line 6, we determine our batch size from examining the batch dimension of the mark parameters tensor.

On lines 7, 8 and 9 we generate 602 our UV sample coordinates 603. This grid will be 'B×224×224' in size so that we can map every 'uv' value to a pixel in the final image.

On lines 10 and 11 we perform the sample evaluation 606. It is important that the rendering process 600 be implemented as a continuous function in order for gradient descent optimizers to function well for this purpose. When we consider a black dot, it seems natural to say that a sample is either black (inside the circle) or white (outside the circle), but a binary decision on the sample would not yield a differentiable result. Therefore, instead of determining whether a sample is inside or outside the circle using a discontinuous step function, we create a rounded step function that is differentiable and whose derivative is continuous.

First we calculate the distance (in uv space), 'dist', from every uv sample 603 to the center of the dot as specified by the mark parameters 605. Next we subtract 'dot_size' from 'dist' to yield a signed distance to the dot boundary; Samples that are within the dot will be 0 or below, while pixels that are outside the dot will all be above 0. Next, we multiply by 'sharpness' in order to adjust the degree of roundedness of the step function, then use a hyperbolic tangent function as a rounded step function to bring all the values within −1 (black pixel) and 1 (white pixel). The hyperbolic tangent essentially blurs the edge of the dot boundary.

While adding a small blur to the edge may improve the chances of training successfully, the blur is otherwise not necessary for pattern encoding or decoding. A pattern rendered using a standard non-smoothed step function (or high sharpness value) will function perfectly well for encoding and decoding. Thus, one may train with a rounded step function and then encode the same pattern using a non-rounded step function.

The sample evaluation 606 of lines 10 and 11 produces a set of color samples 607, which have only one sample per pixel. Thus there is no need for averaging 608, and the color samples 607 also comprise the pattern image 609.

Jumping back to our main iteration loop, and again in reference to FIG. 8, recall that on line 19 we rendered 804 'img', the training image 806.

Next on line 20, the training image 806 is processed by the pattern decoder 807 yielding a payload vector 808. The payload vector 808 is subsequently processed by a sigmoid function 809 to produce a normalized payload vector 810 with all elements in the 0.1 range.

On line 21, we perform the loss calculation 812 based on the normalized payload vector 810 and the original data record 801. In this case the loss 811 is the average of the squared difference between the normalized payload vector components 810 and a vector representing the original data record 801 bit values.

Line 22 performs the gradient calculation 814, which determines gradient, or partial derivatives of the loss with respect to the internal values of the payload encoder 802 and pattern decoder 807 models.

Then on line 23 the optimizer makes the step, altering the internal parameters of the payload encoder 802 and pattern decoder 807. On line 24, the gradient calculation is reset, and on lines 25 and 26 we report the resulting loss and accuracy.

When we let this process run for five epochs we get the following output:
    python3.7 example.py

| Epoch | Loss | Accuracy |
|---|---|---|
| 1 | 0.2546 | 51.76% |
| 2 | 0.1914 | 80.08% |
| 3 | 0.1346 | 93.55% |
| 4 | 0.1082 | 91.80% |
| 5 | 0.0813 | 100.00% |

Notice that as the loss value drops, our accuracy increases. After a few iterations, the payload encoder and pattern decoder have achieved suitable accuracy and may be used in the pattern encoding and pattern decoding processes.

So we have demonstrated, in a most rudimentary example of the single dot design, how the encoding scheme is not prescribed by a designer, but rather determined via a process of optimization wherein the internal values of the encoder and decoder models embody the encoding scheme.

While in the rudimentary example it may not be clear why allowing a training process to determine an encoding scheme would be preferred, in preferred embodiments we will expect much more from the encoder and decoder. For example, the pattern may be a complex arrangement of many marks, or we may expect the data record to be extracted from an image of a curved surface, or from a surface in perspective. Or, as another example, we may want to extract the payload while only a portion of the imperfect pattern is visible, or while the pattern is out of focus, or blurry from motion of the camera.

We could certainly work to manually design an encoder model to overcome each of these challenges, however, this is a complex task and better performing encoding schemes are achieved via simultaneous training of the models. Training is tuned to cover the range of expected circumstances and the training process can best figure out the most robust way to encode the data to an imperfect pattern.

Now that we have explained how a basic system can work, let's examine some preferred embodiments of the described systems.

Preferred Embodiments

An imperfect pattern composed of a single dot arguably does not communicate a social of emotional framing for an article to which it is attached. Imperfect patterns, however, may be constructed with more sophistication by using additional types of marks, various arrangements of the marks, and by various transformations that the marks may undergo prior to rendering. Using these methods, an unlimited number of imperfect pattern designs may be constructed that are capable of communicating appropriate emotional framings along with the computer-readable data.

It is important to note that the processes described with the rudimentary embodiments remain valid in preferred embodiments. A pattern renderer still evaluates a pattern template which is varied by a set of mark parameters. We will just be more sophisticated in how we construct the pattern template and its constituent marks, and how we apply its mark parameters.

Recall that an imperfect pattern is composed of one or more marks, which may be varied in the pattern by means of transformation by continuous values. A mark may be a dot (as we demonstrated in the rudimentary embodiment), but a mark may also be any geometric shape that may be sampled by a function, for example, a square, a star, or a heart shape.

As with the dot example, all that is necessary to implement a render function of a sample for any shape is a method to find a signed distance (or approximation thereof) from the sample location to the boundary of the shape, such that the distance is positive on one side of the boundary and negative on the other side. For training, a rounded step function such as the sigmoid or hyperbolic tangent is then applied to the signed distance value to yield an opacity for the sample which varies continuously.

Let's look at another example of a mark and its rendering function in order to explore more closely how marks may be created and transformed.

Figure 10:
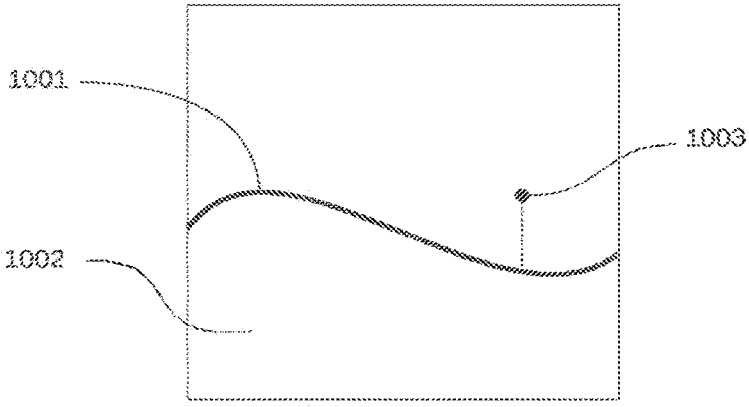
FIG. 10 depicts an example of a curved mark.

FIG. 10 depicts an imperfect pattern comprising a single curved mark 1001. The mark may be described by a Bezier, b-spline, or cubic formulation, for example, a curve expressed in the form $V(u)=Au^3+Bu^2+Cu+D$, with A, B, C and D being coefficients that affect that shape of the curve.

For any u value of the curve, we may derive a v value (v being $V(u)$), and the (u,v) pair comprise a coordinate pair in a coordinate system, or 'space' 1002. In this visualization, the u value varies the horizontal dimension while the v value varies the vertical dimension of the coordinate system.

A mark may be rendered within a uv coordinate system which may, for example, span a domain from 0 . . . 1 in both u and v dimensions. A pattern space, for example, having a range that covers the entirety of the non-repeating area of a pattern, may span 0 . . . 1 for u and v. Outside of the 0 . . . 1 range, a pattern space may simply repeat the pattern, in the way that a pattern repeats on wallpaper or textiles, for example. Later we will discuss other local spaces in which a mark may be rendered but for now let's presume a mark is being rendered in this space.

So let's evaluate a sample 1003 to see to what degree it lies on the curve 1001. A sample 1003 may have a coordinate of $(u_s,v_s)$. To evaluate the sample, first we will find a distance to the curve. An approximation of the distance will suffice, so we will use the vertical difference between the curve 1001 and the sample 1003. The height of the curve at $u_s$ may be determined by evaluating the curve function V( ) at $u_s$. Thus, a signed difference '$\Delta_H$' may be expressed as $\Delta_H=v_s-V(u_s)$.

The rendered mark 1001 will have a thickness $T_H$ and be centered vertically on the function V( ), so we can represent a signed distance to the shape boundary as $d=|\Delta_H|-T_H$. As with the dot example, the signed distance value will then be scaled and put through a rounded step function, for example, a sigmoid function, to yield a continuous range of opacity. (The scaling is simply an adjustment for the degree of sharpness of the step function.)

In order to render a pattern containing such a cubic curve, the renderer would need to be supplied four mark parameters, which, for example, could correspond to the A, B, C, D coefficients used in function V( ). These coefficients, however, are not an easy way to control a curve, so instead we may describe the curve by the values of its v-intercept ($v_0$ and $v_1$) and slope ($m_0$ and $m_1$) at the left (u=0) and right (u=1) sides of the pattern. From values for $v_0$, $m_0$, $v_1$, and $m_1$, one can easily derive cubic curve coefficients used in function V( ):

$$A = -2v_1 + 2v_0 + m_0 + m_1$$

$$B = 3(v_1 - v_0) - m_1 - 2m_0$$

-continued $$C = m_0$$

$$D = v_0$$

Thus we have a way to describe the curve with more natural control parameters.

Artist Controls on Transformations

Recall that the mark parameters that drive the transformations are generated by a payload encoder, and that the payload encoder is produced through a process of training. An artist, contributing to the design of the imperfect pattern, may wish to place limits on how much a mark may vary, or be "transformed". In order to accommodate these limits, a pattern renderer may process the mark parameters before using them to render marks.

For example, an artist may indicate that they wish the initial slope ($m_0$) of a curve to range from −0.5 to +0.5, centered on a slope of zero. Through the use of penalty loss components, it is possible to train a payload encoder to produce such a range, however, a more practical approach is to preprocess the mark parameter as part of the pattern rendering to put the parameter values between specified limits. An s-shaped function, for example a hyperbolic tangent, may be used to transform a mark parameter 'p' to be centered 'c' with a maximum deviation of 's' into a preprocessed mark parameter p':

$$p' = \tanh(p) \cdot s + c$$

Thus, by using preprocessed mark parameters (e.g.: p') to render a mark, we may allow an artist to control the center value and maximum deviation of every transformation. Collectively, the center 'c' values specify the pattern prior to transformation, in its "perfect" form. The 's' values specify the degree of deviation a mark may undergo as part of its transformation into an "imperfect" data-encoding pattern.

Previously, we have discussed transformations of marks applied during rendering. For example, marks may be transformed via translation (e.g. x-translation and y-translation), but a mark may also be transformed with other operations, for instance, with a scale or rotation of the shape. This may be accomplished, for instance, by applying a linear matrix transform to the (u,v) pattern coordinates. These are examples of ordinary transformations that preserve the shape of the mark. Marks may also be transformed independently from changing placement. For example, a mark may be transformed by changing the brightness, color, or texture (e.g. procedural) of the mark. As with other transformations, these should be performed in a continuous manner when training the encoder.

Marks may also be deformed by a transformation, a "deformation" being a transformation in which the shape of the mark is altered. For example, changes to coefficients of a curve C01 will typically change the shape of that curve, creating a deformed shape. Other examples of deformations include non-uniform scale, skew transforms, or non-linear transformations (e.g. sinusoidal).

There are many other types of marks, as well as other types of transformations, but before we dive into those, let's examine how we can create patterns with arrangements of multiple marks.

Arrangements of Marks

Recall that a pattern may include a plurality of marks. FIG. 11A, for example, depicts a pattern template 1101 and an associated imperfect pattern 1102 with four marks which are simple dots. Each dot is transformed in the imperfect pattern by a displacement as specified by its mark parameters and each is placed within the global coordinate system of the pattern space. (A sufficient number of mark parameters are supplied such that each mark receives individual translation values of the mark in both u and v dimensions on the pattern space.)

Evaluating a sample 1103 of this imperfect pattern may involve evaluating each mark of the design to see to what degree it contributes to the sample. In this example case, we would like to determine if the sample is inside any of the four dots. Note also that in defining this pattern, we need to place each mark at its location within the global pattern space.

A pattern renderer for patterns with multiple marks must work a little differently from the single mark patterns we have examined so far as we need to test each sample against each mark. This could be accomplished, for example, by testing all samples of the image against the first mark to produce a first intermediate image as output. The intermediate image may contain one or more color channels, and may contain an alpha channel indicating opacity (e.g. an RGBA image), such that in samples where the mark is present the opacity is one (or near one) and in places where the mark is not present the opacity is zero (or near zero).

A second intermediate image may be constructed in a similar manner by rendering each sample of the image against the second dot. We now have two intermediate images, for example two RGBA images. We then perform an 'over' compositing operation on the two images, which yields a combined intermediate image.

The 'over' compositing operation may comprise using an alpha channel to sum weighted contributions of the two layers. For example, using the color '$C_1$' and alpha channel '$A_1$' of the first image, and color '$C_2$' of the second image, one may compute the intermediate image '$C_i$' for any color channel as follows:

$$C_i = C_1 A_1 + C_2(1 - A_1)$$

Similarly, one may compute the alpha channel for a combined intermediate image based on the alpha channels of the first and second image. For example, $$A_i = A_1 + A_2(1 - A_1)$$

This process may continue on by rendering an intermediate image of the third mark, and then compositing the combined intermediate image over the intermediate image of the third mark to produce an updated combined intermediate image. To finish with the fourth and final mark, we render an intermediate image of the fourth mark, and again composite the updated combined intermediate image over the image of the fourth mark to yield our complete pattern image. Each image may be a "layer" of a compositing stack.

This approach of compositing an image of a mark over another image of marks will work for any number of marks, and has the benefit that marks may overlap. For example, a first mark in a first layer may occlude or obscure a second mark in a second lower layer which is underneath the first layer. Any number of layers may be combined in this manner. This method, however, is computationally expensive.

Introduction of Cells

FIG. 11B depicts a pattern template 1110 visually identical to the pattern template 1101, however this pattern space is broken up into subregions we are calling "cells". In each cell, one or more marks may be depicted.

For example, a lower left cell 1111 comprises ¼ of the pattern 1110. While cells are not explicitly visible in the imperfect pattern, the notional use of bounded cells helps simplify the construction of imperfect patterns by designating a local coordinate system, and also provides some features and efficiency.

For example, whereas in the prior pattern template 1101 we had to position each mark individually prior to transformation, in the cell based pattern 1110 we may simply specify that each mark is initially centered in its cell.

This is fairly simple because a cell has its own coordinate system, which serves as a local coordinate system in the pattern. Recall that a pattern space hosts the non-repeating range of a pattern template, for example, with values ranging between 0 . . . 1 for both u and v dimensions, with the center of the pattern at coordinate (0.5, 0.5).

Similarly, a "cell space" represents a range in dimensions u' and v' of 0 . . . 1 for a cell, regardless of the size or placement of the cell within the pattern. Thus, rendering a mark to a cell is identical to rendering a mark to a pattern, except we use a (u',v') cell coordinate for each sample rather than the corresponding (u,v) pattern coordinates.

As an example, we could create a first cell that covers the entire range of the pattern, and rendering a mark in that cell would be identical to rendering a mark in the space of the pattern because in this circumstance u=u', and v=v'. A second cell may also cover the entire range of the pattern and the pattern may be assembled by compositing a rendering of a transformed mark in the first cell over the rendering of the transformed mark in the second cell. Thus a plurality of cells may consist of cells which cover the entire range of a pattern or subregions of a pattern.

Determining which cells contain a render sample may be accomplished by testing the sample (u,v) coordinate to determine which spatial region corresponding to a cell (in pattern space) contains the sample. Once the cell for a sample has been determined, a (u',y') cell coordinate may be computed.

As an example, a cell may be a box aligned with the u and v axes, and having a u range of the pattern space from u0 to u1, and a v range of the pattern from v0 to v1. A cell coordinate (u',y') for this cell may be computed simply as follows:

$$u' = (u - u_0)/(u_1 - u_0)$$

$$v' = (v - v_0)/(v_1 - v_0)$$

Rendering a pattern image for an imperfect pattern may also be performed with fewer calculations. For example, a pattern image for this cell-based pattern 1112 may be produced by first determining the cell for each sample, and then testing only the marks active in each sample's cell.

Of course, this optimization works only for cells that do not overlap; however, a preferred embodiment combines both methods. A layer consisting of one or more non-overlapping cells may be composited on top of other layers consisting of one or more non-overlapping cells in order to efficiently produce a pattern image displaying multiple overlapping cells.

Arrangements of Cells

Cells may be arranged to form a regular grid, such as shown in the cell pattern 1110 of FIG. 11B, or may more generally comprise a tiling of a pattern space. Examples of tilings are illustrated in FIG. 11C depicting a hexagonal tiling 1120, and FIG. 11D depicting a rectangular tiling 1130 with every other column offset from its neighboring column.

Cells may also be arranged more arbitrarily as depicted in FIG. 11E where a collection of rectangular cells of varying dimensions are rotated and placed in the design space 1140.

In each case, a cell has a local coordinate system aligned with the orientation of the cell. These coordinate systems define a "cell space" which may have a domain of 0 . . . 1 for every (u',y') coordinate within the cell.

Sample coordinates may be transformed from pattern-space to the space of any specific cell. For example, a sample of the pattern space having a (u,v) coordinate in the pattern-space, also has a corresponding (u',v') coordinate within the space of a cell. Typically these u' or v' values will be within the range (e.g. 0 . . . 1) of the cell space (e.g. 0 . . . 1), where values outside of this range would indicate that a sample is outside of the cell. This transformation from pattern space to cell space may be accomplished, for example, with a linear matrix transform.

Cells may also overlap, as shown in FIG. 11F. In the case of overlapping cells, the pattern may be rendered in layers. For example, if we wish to sample the pattern at a location 1151, we may first evaluate the sample 1151 in a first cell 1152 yielding an RGBA color representation which includes a value for red, green, blue, and alpha (transparency), and evaluate the sample location 1151 in a second cell 1153 to yield a second RGBA value. The result of the pattern at the location 1151 being the second color value being composited on top of the first color value using the transparency from the transparency of the second sample to mix the colors.

Cells in Repeating Patterns

Recall that imperfect patterns may be designed to be repeatable in a way similar to how patterns on gift wrapping paper or on wallpaper repeat. In repeating patterns, it is often useful for a mark to be rendered across the repeat seam of the pattern to minimize or hide the appearance of the seam. However, naively repeating a tile that does not seamlessly repeat may detract from the aesthetic appearance of a pattern.

An imperfect pattern may repeat "seamlessly" across a surface by having any marks that are positioned partially outside the (0 . . . 1) tile of pattern space be also represented by complementary portions of the mark on the complementary repeat seam of the pattern (so as to match up and form a complete mark when the pattern is repeated).

Figure 12:
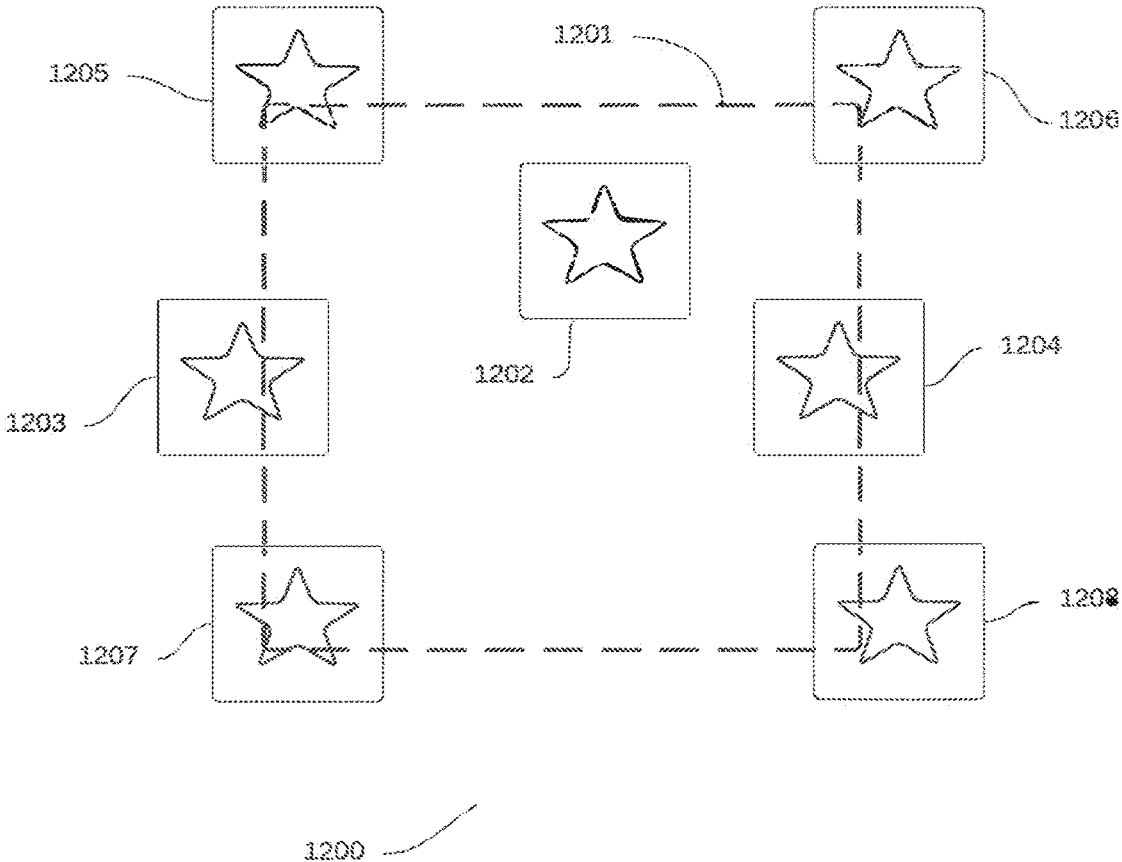
FIG. 12 depicts examples of marks that cross the boundaries of repeating patterns.

FIG. 12 depicts a pattern template 1200 having marks that cross the boundary of a repeating pattern. The pattern is composed of stars, each of which will be translated in u and v by mark parameters. The pattern is repeatable, such that we may tile a plane with a repeated image of domain 1201 which spans 0 . . . 1 in u (horizontal) and v (vertical) dimensions.

A cell 1202 lies entirely inside the 0 . . . 1 domain 1201 of the pattern space. As such, a mark in this cell may be rendered fairly straightforwardly. Any sample inside this cell is tested against the mark using the mark parameters assigned to this cell (e.g. mark parameter $P_1$ and $P_2$)

A second cell 1203 is positioned on the pattern such that it extends off the left side (u<0) of the pattern space domain 1201. This cell's mark is translated by its own mark parameters (e.g. mark parameters $P_3$ and $P_4$).

With the understanding that this pattern repeats, recognize that a mark that extends off the edge of the pattern should appear (in part) on the other side of the pattern. A mark in the second cell 1203 then, which extends off the edge of the 0 . . . 1 domain 1201, may be rendered properly with the addition of a duplicated cell 1204 translated one unit in the u-dimension. Marks in the second cell 1203 and the duplicated cell 1204 use the same mark parameters ($P_3$ and $P_4$) in order to render or sample the marks.

A third cell 1205 lays partially outside of the 0 . . . 1 pattern space domain 1201 at both its horizontal (u<0) and vertical (v>1) boundaries. This cell's mark is rendered with translation from mark parameters $P_5$ and $P_6$.

As this is a repeating pattern, any cell shifted by an integer number of units in u or v, that when shifted has a portion of the cell inside the 0 . . . 1 pattern space domain 1201, should be represented by a duplicate cell in the pattern image. As such, the third cell 1205 may have a first duplicate cell 1206 shifted +1 in u, a second duplicate cell #07 shifted −1 in v, and a third duplicate cell 1208 shifted +1 in u and −1 in v. Each duplicate cell uses the same mark parameters $P_5$ and $P_6$ in order to render the mark. As such, the correct portions of a consistently translated mark will render across each seam of the repeating pattern it may cross.

Piecewise Marks Via Cells

Cells are also helpful to limit the area of the pattern in which a mark is rendered. This is especially useful when creating "piecewise" marks wherein a plurality of cells each contribute a piece of a larger mark. The larger piecewise mark may be a seamless amalgamation of mark components from the plurality of cells.

Figure 13:
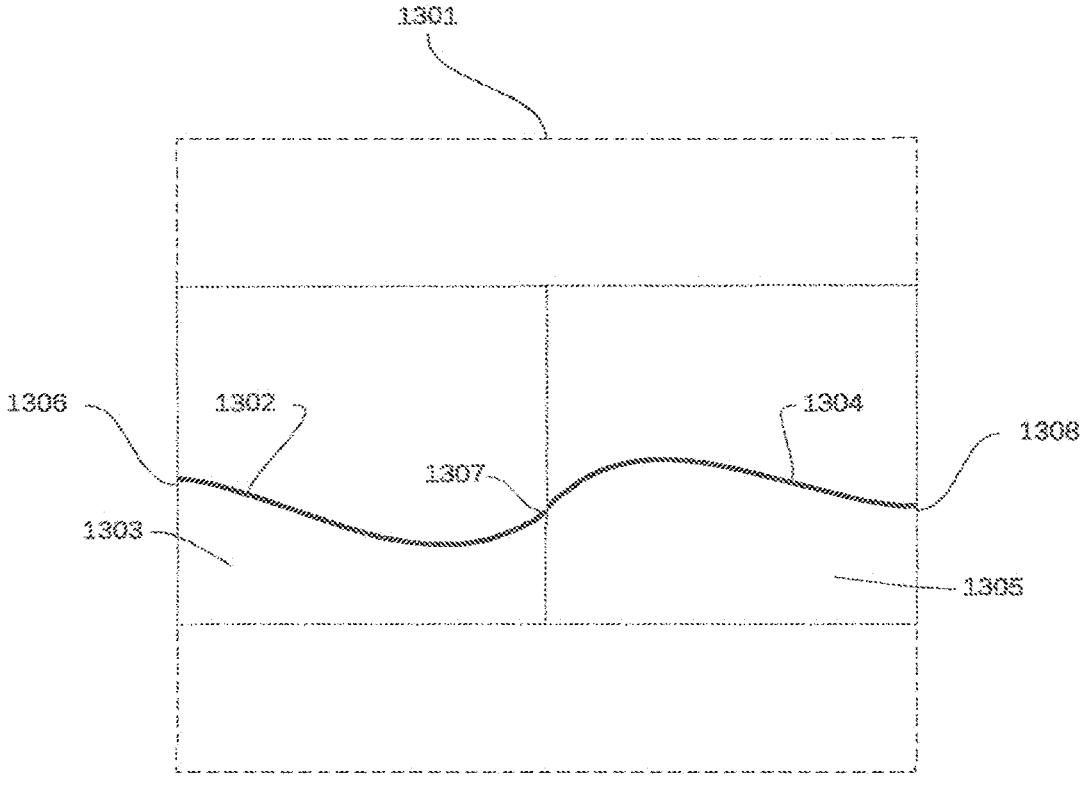
FIG. 13 depicts an example of a piecewise mark based on curves.

FIG. 13 depicts such a piece-wise arrangement of cubic curves. An imperfect pattern 1301 contains a composite curve which is represented in two cells.

A first curve piece 1302 is rendered in a first cell 1303 while a second curve piece 1304 is rendered in an adjacent cell 1305. The two pieces of curve are matched both is position and slope where they interface (the cell boundaries), and the two curve segments aggregate to form a seamless continuous curve. Continuity of the curve may be to various degrees, for example, just a matching of position at the interface, or a matching of both position and slope at the interface.

Each curve is generated from a mathematical curve function (such as function V(u) discussed with regard to FIG. 10), and having an unlimited domain, the curve function will return a v-value for any u-value it is given. Thus, we need a way to crop the curve segment such that we will only see the curve within the 0 . . . 1 range of u. A cell, having a 0 . . . 1 range for both u and v, conveniently renders only portions of the mark in that region of space.

In order for the piece from each cell of a piecewise mark to fit with pieces from other cells, it will be necessary to share some information between marks. This sharing, for example, may be in the form of shared mark parameters.

Sharing Mark Parameters

Let's again use pattern 1301 as an example. And let's imagine this pattern is a repeatable pattern.

Recall that we may express a cubic curve (such as curve pieces 1302 and 1304) in the form of a slope ($m_0$, $m_1$) and y-intercept ($v_0$, $v_1$) at the left (u=0) and right (u=1) sides of a coordinate system, for example a cell coordinate system. Both the left curve segment 1302 and the right curve segment 1304 are defined by their own set of ($v_0$, $m_0$, $v_1$, $m_1$) values determining the shape of the respective curve.

In order to form a seamless piecewise curve, the two curve segments (1302 and 1304) must interface seamlessly at two different locations. The first location 1307 in the center of the image is at u=0.5 in the pattern space. This location 1307 is at u'=1 in the space of the first cell 1303 and u'=0 in the space of the second cell 1305.

The second location 1306 of curve interface is at the boundary of the pattern, which in this example is also a seam where the pattern repeats. An interface 1306 is at u=0 in the pattern space, and as the pattern repeats, it is equivalent to location 1308 at u=1 in pattern space. At this location (1306/1308), we also want the curves to interface seamlessly.

The first location 1307 corresponds to u'=1 in the space of cell 1303, and also corresponds to u'=0 in the space of cell 1305. The second location 1306/1308 corresponds to u'=0 in the space of cell 1303 and also corresponds to u'=1 in the space of the second cell 1305.

While without a piecewise arrangement, each cubic curve would require four mark parameters, instead a pattern 1301 may be supplied a total of four mark parameters: $P_1$, $P_2$, $P_3$, and $P_4$ because several parameters will be shared. These parameters may have already been preprocessed to put the values within predetermined ranges, as necessary for objectives of the design.

Let's define the first curve 1302 using the mark parameters as ($v_0$=$P_1$, $m_0$=$P_2$, $v_1$=$P_3$, $m_1$=$P_4$), and define the second curve 1305 as ($v_0$=$P_3$, $m_0$=$P_4$, v1=$P_1$, m1=$P_2$).

Now, at location 1307, the v-value will be $P_3$ in both the first curve 1302 and the second curve 1304 when the curves are evaluated in their respective coordinate systems. Similarly, at location 1306/1308, the v-value will be $P_1$ in both the first curve 1303 and the second curve 1304 when evaluated in their respective coordinate systems. This yields a continuity of height of the piecewise curve composed of these two curve pieces.

Also, by sharing the slope values (m0 and m1), we gain continuity of the slope of the curve across the two interface locations, the first interface location 1307 at the center of the pattern, and a second interface location at the common repeat seam on the left 1306 and right 1308 sides of the pattern.

This example has only two cells, but this example could be extended to any number of cells or to an arbitrarily sized two-dimensional grid of cells. The basic principle is that a mark may be described with a property (in this case height and slope) that describes the mark at the boundaries of the cell where it interfaces with a neighboring cell. The property is shared between cells at locations that there is intended to be continuity of the cells.

Figure 14:
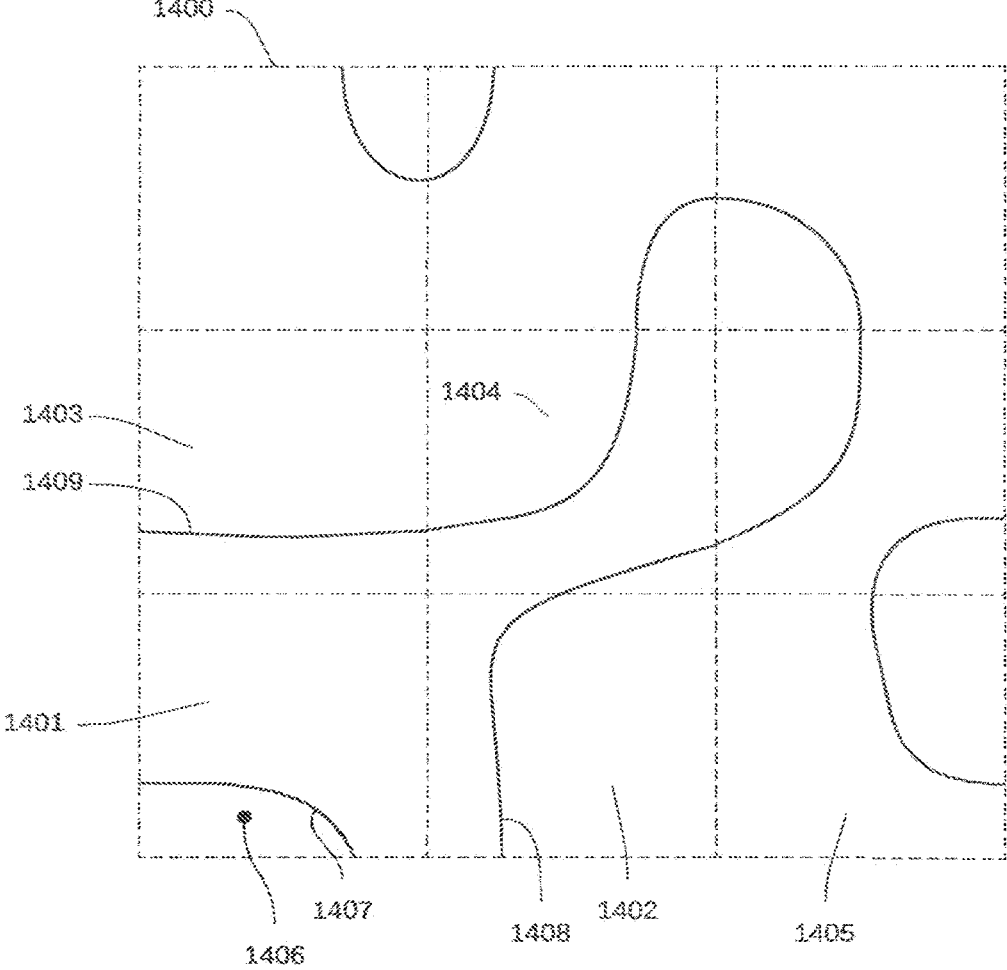
FIG. 14 depicts an example of a piecewise mark that is an elevation contour.

Further exploring the sharing of properties at the boundaries of cells, let's examine FIG. 14 which depicts an imperfect patter containing a topographical map. In this example, each elevation contour line (isocontour) may be considered a piecewise mark.

A 3×3 grid of cells covers the 0 . . . 1 range of pattern space 1400 for both u and v dimensions. This pattern is repeatable, so each side of the pattern should have a seamless transition to a repeat of the same pattern.

A pattern renderer is supplied nine mark parameters that represent the elevation (for example, in feet) at the lower left corner of each cell of the grid:

| h20 = 72, | h21 = 83, | h22 = 109 |
| h10 = 119, | h11 = 112, | h12 = 65 |
| h00 = 87, | h01 = 103, | h02 = 92 |

Height values for each of the other corners may be copied from the neighboring cell. For example, the lower left cell 1401 gets its lower right height values (h01) by copying the lower left height value from a neighboring cell 1402. The lower left cell 1401 also has an upper left corner value (h10) which is copied from the lower left corner value of the neighboring cell 1403 above cell 1401, and has an upper right corner value (h11) which is copied from the lower left corner value of another neighboring cell 1404.

This pattern is designed to be repeatable, so the rightmost column and uppermost row of cells copy height values from their respective neighbors in the repeat. For example, the lower right cell 1405 gets its lower right corner height value (h00) from the lower left corner of a neighboring cell 1401 (when the pattern is repeated), and gets its upper right height value (h10) from the lower left corner of a different neighboring cell 1403.

The height value at an arbitrary point inside a cell may be interpolated from the height values at the corners of the cell, for example, with bilinear or bicubic interpolation. Given a cell coordinate (u', v') at which to sample cell 1401, a height value h, for the sample may be determined with a continuous function such as:

$$h_s(u', v') =$$

$$(1 - v') * ((1 - u') * h00 + u' * h01) + v' * ((1 - u') * h10 + u' * h11)$$

An isocontour visible in the cell comprises all samples where the interpolated height value is at or near the isocontour line height. For example, a sample point 1406 may be evaluated by interpolation yielding a height value, and that height value may be subtracted from the desired isocontour value to yield a height difference. The height difference may be used as an approximation of distance of the sample to the isocontour.

As with the prior example of the cubic curve, we may subtract half a line thickness from the absolute value of the distance approximation to yield a distance to the isocontour boundary, and that distance may be put through a sigmoid function in order to yield an opacity value that is continuous across the cell (and thus differentiable).

A mark comprising the curve representing an interpolated height value of 100.0, for instance, may be composed from curve pieces from several cells. For instance, the lower left cell 1401 contributes a curve section 1407, while neighboring cell 1402 contributes curve section 1408 and neighboring cell 1403 contributes another curve section 1409. The contour for height of 100.0 is then a composite curve composed of the curve pieces generated from contouring every cell at the height of 100.0. Of course, we may also contour the pattern at other height values, with each height value creating a corresponding piecewise isocontour curve.

We may use a similar approach to create an imperfect camouflage pattern.

Figures 15A, 15B, 15C, 15D:
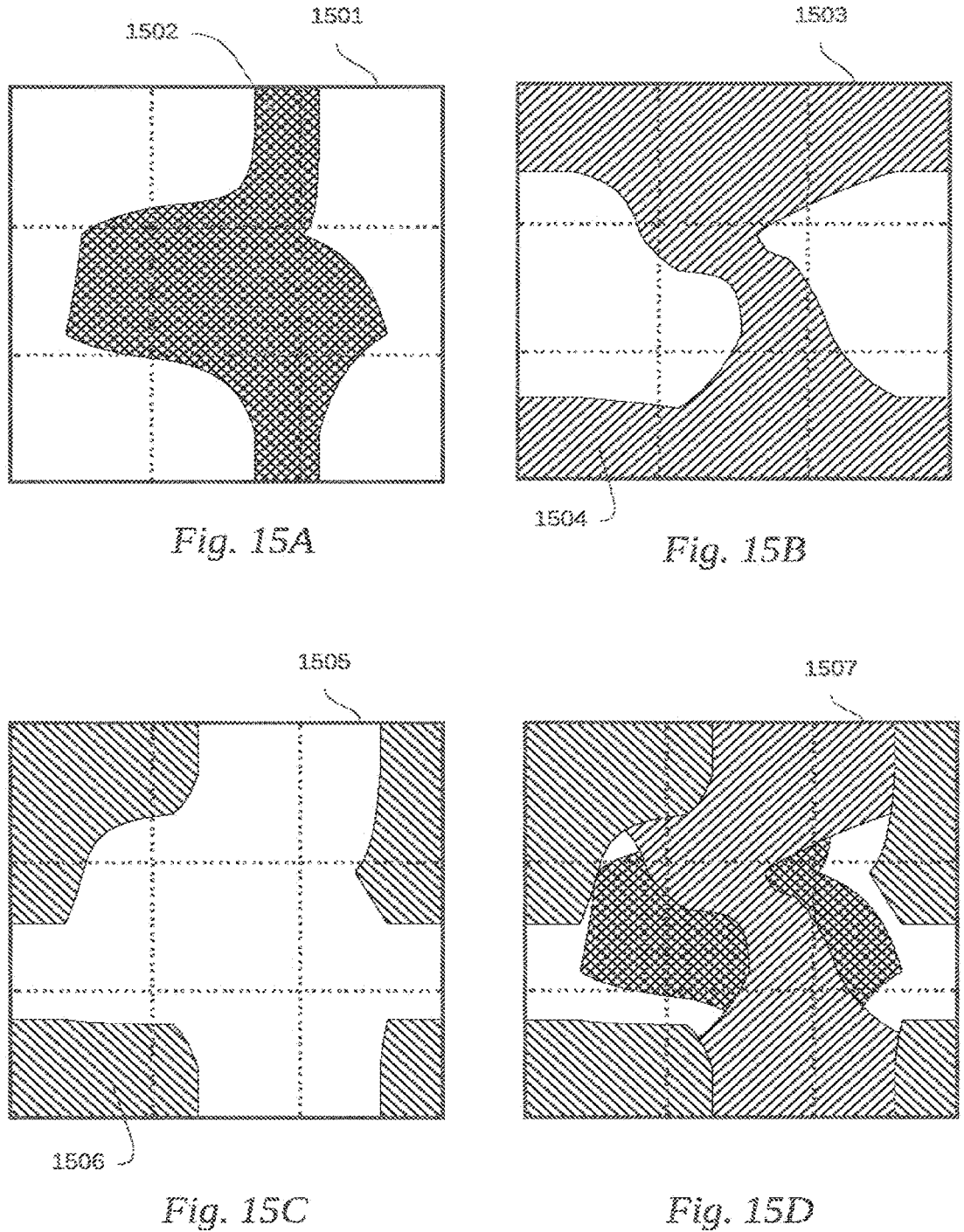
FIGS. 15A, 15B, 15C, and 15D depict a camouflage example imperfect pattern composed of multiple layers.

FIG. 15A depicts a first layer 1501 composed of a 3×3 grid of cells. The layer may have color and transparency values for each pixel and may be rendered as would be a complete imperfect pattern. We are calling it a layer because it will be combined with other layers to produce a composite imperfect pattern.

As with the previous isocontour example of FIG. 14, each cell is given a lower left height value, and as with the previous example, each cell gathers the height values for its other three corners from the lower-left height value of neighboring cells. Also, as with the previous example, height values may be interpolated from the corners of each cell.

However in this example, the piecewise mark 1502 is a result of a "thresholding" of the interpolated height value to a predetermined height. The interpolated height 'H' is compared to a threshold 'T' (e.g. 100.0), and the difference H-T is put through a rounded step function to yield the sample transparency. For example, the transparency may be assigned sigmoid (sharpness*(H−T), where sharpness is used to adjust the degree of rounding of the step function. Though the transparency varies, the mark may be given a fixed color (for example, light brown).

FIG. 15B depicts a second layer 1503. This layer also has a 3×3 grid of cells which similarly receive a different set of height values from its mark parameters. A second mark 1504 is the result of thresholding each cell in the second layer 1503 with a similar rounded step function. The second mark 1504 is given a second fixed color (e.g. dark brown).

FIG. 15C depicts a third layer 1505. This layer also has a 3×3 grid of cells which similarly receive a different set of height values from its mark parameters. A third mark 1506 is the result of thresholding each cell in the third layer 1505 with a rounded step function. The third mark 1506 is given a third fixed color (e.g. green).

FIG. 15D depicts a pattern image 1507 which combines the marks from the three separate layers.

The three layers, each having both color and transparency values for each pixel, may be combined with a compositing operation, for example the "over" operation previously discussed. The first layer 1501 may be composited over the second layer 1502 to yield an intermediate image. The intermediate image may then be composited over the third layer 1503 to yield a second intermediate image. The second intermediate image may be composited over a background image, for example a solid black image to yield our complete pattern image 1507.

Note in this example that each mark is piecewise, and that cell contributes a piece of the overall mark. Also note that we may easily combine separate layers containing marks in order to create imperfect patterns with overlapping marks.

Cells, in the preceding examples, provide several functions. The cell provides a local coordinate system in which a mark may be rendered. The cells also provide for a piecewise mechanism wherein each piece of a mark is rendered in a portion of the pattern, and provide a means of sharing mark parameters in order to provide continuity. In addition, cells provide a more computationally efficient way to render the pattern image during training by reducing the number of tests that need to be performed for each sample.

Incorporating Raster Artwork

Thus far, we have shown how geometric shapes may be arranged in a pattern, and how the pattern template may be transformed in order to produce a data-encoding imperfect pattern. Just geometric shapes, however, may be somewhat limiting in expression of social and emotional framing. Let's explore how marks may visually represent richer artwork, for example artwork stored in graphic images.

FIG. 16 depicts an imperfect pattern 1600 consisting of marks which are generated from a raster graphic image 1601.

The raster image 1601 may include one or more color channels, and may include a transparency channel. For example, the raster image 1601 may be an RGBA image. The raster image 1601 may comprise artwork, a photograph, or any other visual element an artist wishes to add to a pattern. The image 1601 may be used as a computer graphics texture, for example, a sample, having a cell coordinate of (u', v'), may be evaluated by means of interpolation (e.g. bicubic or bilinear interpolation) of the raster image.

In preferred embodiments, a mark may be depicted by different visual representation from one cell to another. For example, instead of one raster image 1601, we may have a plurality of baby images, and a different raster image 1601 may be assigned (either via a pseudo-random algorithm or at direction of an artist) to each cell of the pattern 1600. When evaluating a sample, one may first determine which cell contains the sample, and then after transforming the sample coordinate, interpolate the raster image associated with that cell with the transformed sample coordinate.

The exemplary pattern 1600, however, composed of nine cells, has each cell depicting a raster mark based on the image 1601.

The marks are transformed with u (horizontal) and v (vertical) translation as well as rotation. Thus, the 9 marks of the pattern will require 27 mark parameters in total.

The lower left cell 1602, for example, has a first mark 1603 centered in the cell, and scaled down from the cell that frames it. The image 1601 may have transparency values for each pixel and the background of the artwork may be fully transparent in areas outside of the baby's head.

The transformation of the raster mark may be accomplished via inverse transformation of the (u',v') sample coordinates. Por example, a sample 1604, having a (u,v) sample coordinate in pattern space which may be transformed to a (u',v') coordinate in the space of the lower left cell 1602. This (u',v') cell coordinate may be additionally transformed in order to place the mark in the cell.

Each cell with a raster mark will, in this example, get three mark parameters. The mark parameters may be preprocessed to put them within ranges specified by an artist. The mark parameters will control the transformation of the mark in the cell. This transformation has constituent transformations of a-translation, v-translation, and uv-rotation. These constituent transformations may be combined, for example through assembly of a 3×3 transformation matrix.

The transformation of the mark 1603 within the cell 1602 may be accomplished by applying the inverse of the mark transformation to the coordinates we wish to sample. For example, a mark 1603 in cell 1602 gets three preprocessed mark parameters which it applies to u-translation, v-translation, and av-rotation. A 3×3 transformation matrix could be constructed to represent the transformation of the mark 1603, and then an inverse of that transformation matrix may be used to transform cell coordinates samples, such as a sample 1604 into a texture coordinate. The texture coordinate, then could be used to interpolate the raster image 1601 to determine the color and transparency values of the sample.

During training, the evaluation of a transformed mark sample 1604 at location (u',v') should be a continuous function, meaning that no small change in u' or v' will result in a discontinuous jump in color or transparency output. By using interpolation, for example bilinear or bicubic interpolation of the image, we may sample a raster mark in a continuous fashion. Additionally, we may also blur the image very slightly prior to sampling in order to remove high frequency signal components, as the addition of slight blur may aid the training process. As with the rounded step function discussed earlier, the blurring step which is helpful during training is not necessary once training is completed.

Raster Marks may be transformed through any of the transformations applicable to geometric marks such as translation, rotation, or scaling. A sample may be transformed from a (u', v') cell coordinate to a (u",v") updated cell coordinate by application of a transformation.

As a simple example, in a pattern 1600 each mark sample (u',v') may be translated by the mark parameters as values Tu and Tv. A translated sample coordinate (u", v") is calculated as (u'+Tu, v'+Tv). This translated coordinate (u",v") is then used to bilinearly interpolate each color and transparency channel of an image. The image may be evaluated similarly to a sample of a computer graphics texture, having a range of 0 . . . 1 in both dimensions of the texture. Coordinate values sampled outside of the 0 . . . 1 range will return a default value such as a color value with full transparency.

It is also useful in designs to deform raster marks. Any of the deformations applicable to geometric marks are also applicable to raster marks. As an example, let's examine how a curve may be used to deform a raster mark.

Deforming Raster Marks

Figure 17A:
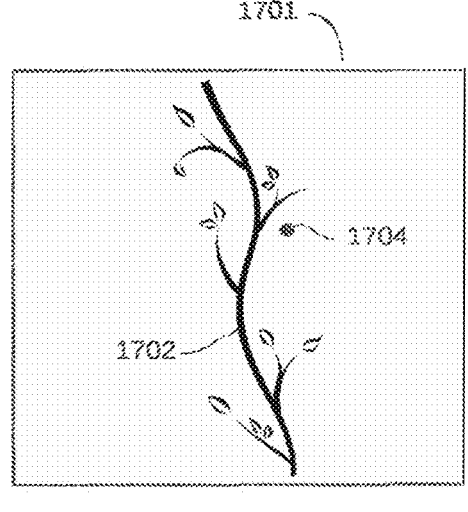
FIGS. 17A, 17B, and 17C depict a raster mark which is deformed by a curve.
Figure 17B:
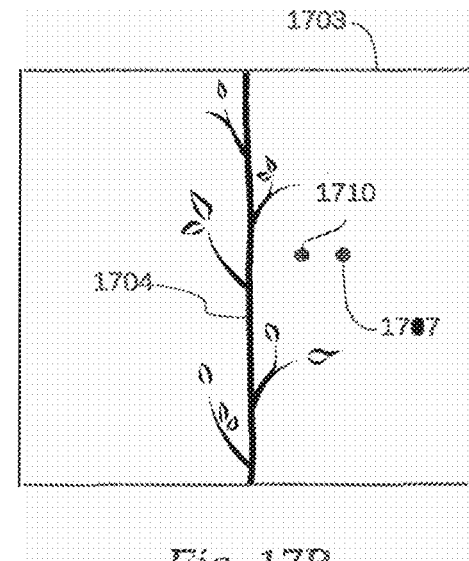

FIG. 17A depicts a cell 1701 containing a raster mark 1702 which has been rendered with a deformation. The deformation may be accomplished by use of a curve, for example a cubic curve. The raster mark 1702 is based on a texture 1703 which is depicted in FIG. 17B. The texture may comprise a RGBA image which, for example, may be sampled with bilinear interpolation. This particular image contains a graphic of an undistorted flower stem 1704.

Figure 17C:
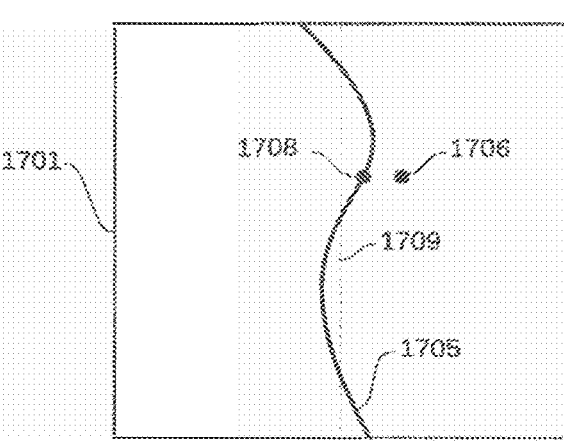

FIG. 17C depicts the same cell 1701 with a segment of a cubic curve 1705. The curve, for example, may be of the same form as the cubic curve V( ) previously discussed in relation to FIG. 10, but rotated 90 degrees (or with u and v swapped) so as to represent a mostly vertical rather than a mostly horizontal curve. We will use this curve to drive a deformation, but the curve 1705 may not actually be directly visible in a rendering of the cell 1701.

Recall that function V (u), having cubic coefficients A, B, C and D which may be calculated from values of $v_0$, $v_1$, $m_0$, and $m_1$, returns a v value for any given u value. In this case, since we are rotated 90 degrees, we may calculate the coefficients A, B, C, and D for a function U(v) which returns the u value for any given v value.

As with transformation of raster marks, deformations of raster marks may also be accomplished by applying an inverse transformation to the sample coordinates.

For example, a sample 1706 has a cell coordinate of (u', v') that may be transformed into a texture coordinate, and the transformation may include deformation. As with the previous raster mark rendering process, a sample 1706 may be linearly transformed to generate a texture sample coordinate 1707 depicted in the texture of FIG. 17B. However, we wish to create a nonlinear deformation.

In one method of applying the deformation, this texture sample coordinate 1707 may be offset, in this case in the horizontal u dimension. The amount of horizontal offset may be found by examining the difference between the u-value 1708 of the curve at the v-value of the sample 1706 and a vertical line 1709 that determines the baseline for translation.

A texture sample 1707 may be transformed in order to deform the mark, for example, the transformed sample 1710 may be calculated as coordinate (u'+U(v')−0.5, v'). By sampling such transformed samples, we may produce a deformed raster mark 1702 such as the mark depicted in FIG. 17A.

Of course, this type of deformation also works for a horizontal curve, and when combined with piecewise curves, such as the piecewise cubic curves previously discussed, sections of a texture may be rendered across multiple cells, each cell having a piecewise deformation, in order to produce a deformed piecewise mark.

Higher Dimensional Marks

Thus far, we have discussed marks which are two-dimensional by nature, and that is natural as the imperfect pattern is often a two-dimensional medium. A mark, however, is not limited to being a two-dimensional entity. So long as a mark may be reduced to a two-dimensional representation through a continuous transformation, it may be used in an imperfect pattern and controlled by mark parameters.

Figure 18:
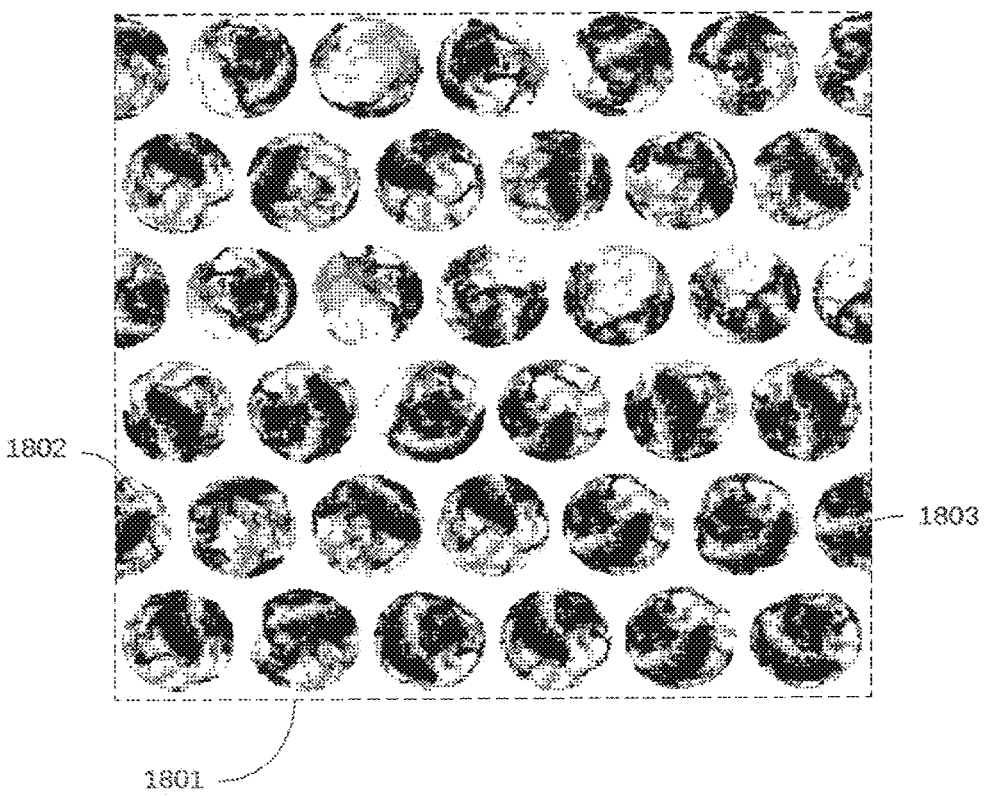
FIG. 18 depicts a pattern containing projected higher dimensional marks.

FIG. 18 depicts an imperfect pattern with marks rendering as projections of rotated 3D spheres. Each sphere in this pattern is texture mapped with the same satellite image of the earth, however each sphere is given a different 3D rotation before projection (in this case, orthographic projection). The rotation may, for example, be expressed as a 3D rotation vector where the direction describes the axis of rotation and the magnitude describes the radians of rotation. Alternatively, the 3D rotation may be expressed as the concatenation of three separate rotation matrices, representing the x, y, and z axis rotations. The rotation values, controlled by mark parameters, are the 'imperfections', or how the data record is encoded into the pattern 1802.

In order to render the sphere mark, each sample may be evaluated against a rotated sphere. A sample in a cell may be converted into a ray, for example, by simply adding a constant w component to each sample that is orthogonal to the u and v axes. For example, a $(u',y'')$ sample of $(0.5, 0.5)$ may be converted into a 3D orthographic ray $(0.5, 0.5, 1.0)$, where 1.0 is the fixed w component for every ray.

Each ray may then be intersected with a rotated 3D shape, in this case a sphere, to yield a polar coordinate on the sphere. (The rotation of the 3D shape may be accomplished, for example, by rotating the three axes that define the coordinate system of the sphere).

The polar coordinate may be used as a texture coordinate to interpolate a texture map for color and transparency values. Rays which do not intersect the sphere may be given values of fully transparent.

A texture wraps the sphere, and the texture may be sampled with interpolation. In this example, the texture is satellite imagery processed into equirectangular format. As with all other marks rendering processes, this process also has continuous properties that are derived from the continuous interpolation (e.g. bilinear or bicubic) of the texture.

This pattern 1801 is designed to be repeatable, and as some globes cross boundaries of the pattern that represents repeat seams, duplicate marks using the same mark parameters should be used to transform the duplicate mark. For example a first mark 1802 is in a cell which crosses the left boundary of the pattern 1801. As such, a duplicate mark 1803, which is offset exactly one unit in the horizontal 'u' dimension, renders with the same mark parameters.

Composing Designs for Imperfect Patterns

We have thus far described many ways in which imperfect patterns may be created.

The patterns contain marks, of which we have described a few types. The marks may be transformed in an imperfect partern, and we have described several methods of transformation including methods of deformation of marks. We have also discussed how an artist may control the transformations, by setting minimum and maximum values for any type of transformation of a mark.

We have discussed how marks may be combined in a pattern, for example, by creating layers of one or more marks, and then compositing multiple layers together. We've discussed how patterns (or layers) can make use of cells in which marks may be rendered. And have discussed how cells simplify designs, enable the creation of piecewise marks, and increase processing efficiency in imperfect patterns.

Let's look more closely how all of these pieces may come together while reexamining FIG. 6 which describes a process of pattern image rendering.

Recall from FIG. 6 that a sample evaluation process 606 converts (u,v) sample coordinates 603 into color samples 607 by using the pattern template 604 and the mark parameters 605.

Let's look more closely at ways in which the sample evaluation 606 may be performed, both for process 600 and for processes and embodiments to be described later in the text, as an example, in process 2200 of FIG. 22.

In preferred embodiments, we would like the sample evaluation to be as flexible as possible, such that it is not necessary to develop a new sample evaluation process in order to describe a new imperfect pattern, but rather that the information in the pattern template is sufficient to describe to the sample evaluation 606 function a myriad of imperfect pattern graphic designs.

For example, let's say we create a pattern of raster marks, and the textures used for the raster marks are images of puppies. Should an artist wish to create a new design that is instead based on images of kittens, it should not be necessary to alter the sample evaluation 606 to make this change. For example, we can store a disk location of the texture image file in the pattern template 604, and then the sample evaluation 606 may render the raster marks using the texture images specified in the pattern template 604.

Similarly, should an artist designing a pattern wish to change the color of a mark, we should not need to change the sample evaluation 606 process, but rather just store a color value for the mark in the pattern template. Or, if the artist wishes to change the types of marks, or the layout of cells in an imperfect pattern, that should also be specified in the pattern template 604. Similarly, should the artist wish to add additional layers to the design, that should be allowed by a flexible pattern template 604.

Or, if the artist wishes to change the limits to the ranges of transformations applied to marks, those limits as well should be stored in the pattern template 604 so that we do not need to change sample evaluation process 606.

Thus, in preferred embodiments, the sample evaluation process 606 may entail processing the details of the design stored in the pattern template 604 in a very flexible format. The pattern template 604 may be represented as a data structure in memory, or stored in a database or in a file on disk.

One way to provide an artist flexibility in design is to build an architecture of the sample evaluation 606 based on a system of nodes A node represents a unit of specific processing, potentially with inputs and outputs. Nodes may be arranged in a graph, where the output of one node may connect to the input of another node.

FIG. 19A depicts an example patter template expressed as a graph 1900 of nodes.

The graph 1900 contains a raster mark node 1901 that renders a layer. The node may render a certain type of mark, for example a raster mark, and may have parameters that may be set by an artist such as the location of the texture images to render, the arrangement of cells in the layer, and the minimum and maximum values for various transformations that may be applied to the marks.

For this example, let's say the cells for this node comprise a 10×10 regular grid that cover the pattern space, and that all raster marks are scaled to 50% of the cell size. Additionally, let's say the rotation of each raster mark, which is driven by mark parameters, has a maximum and minimum rotation specified in the pattern template. The artist has specified that the translation values for the mark will be fixed such that the mark remains centered in the cell.

The raster mark node 1901 may store all of these properties as set by the artist. The node 1901, when queried with a sample (u,v) coordinate, will return a color and transparency value for that (u,v) coordinate.

The raster mark 1901, having at least one transformation that is not fixed, will get values for the variable transformations from the mark parameters 1902. In this case, a 10×10 grid results in 100 marks, each requiring one mark parameter for 'rotation', so the raster mark node will use 100 mark parameters (i.e. 100 elements of a mark parameter vector).

Each transformation parameter may be preprocessed to put it into desired ranges (such as ranges specified by an artist). In this case, using the minimum and maximum values for rotation, the mark parameter which is a real number with any range is then converted to a rotation value within the specified range.

A second node in the graph is a curve node 1903. Along with this node may be stored the width of the curve, the color of the curve, for instance. If the curve is texture mapped, the image to use as the source texture which will be deformed by the curve would be stored in the node. Also stored with the node is the cell arrangement for the marks. We may associate any arrangement of cells with any node, but for simplicity let's use the same 10×10 regular grid for this example.

Let's say this is a cubic curve, and that the transformations (deformations) of the curve node are made by allowing adjustments to the slope and y-intercept at the left and right sides of the cell. However, as we would like to preserve continuity across cell boundaries, only the slope and v-intercept at the left side of the cell need be determined as the values for the right side of the cell will be copied for the neighboring cell. Thus, having 100 cells, and requiring two values for transformations for each cell, the node when evaluated will require an additional 200 values from the mark parameters 1902.

A third node 1904 in the graph is an image node which simply performs a texture map lookup of a static image and returns a color and transparency value for a given (u,v) sample coordinate. The node may store internally the location on disk of the image to interpolate as a texture map.

A fourth node in the graph is a first composite node 1905, which may perform an "over" compositing operation that uses the transparency pixel values to composite a first connection's output over a second connection's output. A fifth node in the graph is second composite node 1906 having the same 'over' function.

Each node has the ability to return a color and transparency value (e.g. RGBA value) when sampled with a (u,v) sample coordinate. In processing the request, however, the node may ask another node for a contributing color and transparency value for the sample. This dependent flow of information is what defines the connections of the graph.

As an example, an imperfect pattern expressed in the graph 1900 is sampled (i.e. as with sample evaluation 606 of process 600) at a sample coordinate of (0.5, 0.5).

The output of the graph 1907 is connected to the first composite node 1905, which is then queried for the (0.5,0.5) sample. The composite node has been set to do an 'over' operation on the RGBA results from two connected nodes. In this graph, the first of the two connections is wired to the raster mark node 1901, and the second connection is wired to a second composite node 1906.

Thus, the first composite node 1904 makes a request of each of its connections for the RGBA results for the sample.

The first request, to the raster mark node 1901, is processed by that node. Stored with, or referenced by the node 1901 is the arrangement of cells for the pattern space. The sample is evaluated to determine which cell (if any) contains the sample, and the index number of that cell, and coordinate within the space of that cell is stored. The cell space coordinate is then transformed by use of the mark parameters 1902 for that cell to produce a texture coordinate which may be used to sample a raster image with bilinear interpolation.

The mark parameters may be stored in a buffer or stack and then doled out to nodes which request them when processed in the graph. When evaluating a graph, nodes are always evaluated in the same order—as dictated by the connections of the graph. Thus, the mark parameter which is distributed to a specific transformation of a specific mark for one evaluation of the graph, will be distributed to the same specific transformation and specific node for all other evaluations.

Each node has knowledge of how many mark parameters it requires based on the number of cells and the transformations which have been assigned to the marks. The raster mark node 1901, having 100 cells with only one transformation active for the mark (rotation), will request 100 mark parameters 1902 for the 100 rotations.

The transformation of the mark may be accomplished by applying an inverse transformation to the sample, so an inverse rotation is applied to the sample. For example, the rotation value could be used to create a transformation matrix, whose inverse is multiplied with the sample to yield a transformed sample coordinate. The amount of rotation is determined by looking at the mark parameter (of the 100 doled out to this node) with the index of the cell containing the sample. The transformation matrix may also perform other transformations such as the fixed scaling of the raster mark.

The transformed sample is used to interpolate an image the location of which is stored in the node, and the image may be buffered in memory by the node. The image interpolation returns an RGBA value for the sample. The value for the sample is returned to the first connection of the first composite node 1905.

The second connection of the first composite node 1905 is to the second composite node 1906. Thus we next evaluate the second composite node 1906 in order to find the result for the sample to pass back to the first composite node 1905.

The second composite node 1906 has two input connections, the curve mark node 1903, and the image node 1904. Thus, we will need to evaluate the sample with both of those connections before we may perform the compositing operation and return the result to the first composite node 1905.

First, we evaluate the sample with the curve mark node 1903.

Recall the curve mark node 1903 has 100 cells and requires two mark parameters for each cell. Thus, 200 mark parameters 1902 are doled out from its buffer or stack. Recall that 100 mark parameters were previously doled out to the raster mark node 1901, so this node gets the 200 mark parameters following the previous 100 doled out.

The mark parameters are preprocessed to be within the limits prescribed in the node, and used to form the curve coefficients, which are then used to evaluate the sample yielding an RGBA value. The RGBA value may be stored by second composite node 1906 as the value from its first connection.

The second composite node 1906 also has a connection to the image node 1904 and will supply the second RGBA value we need. The image node 1904 will evaluate the sample by interpolating a texture image with a sample coordinate. For this node, the pattern space coordinate of the sample will be used as it does not utilize cells.

Thus, the second composite node, now having both RGBA values for the sample, may composite one RGBA value over the other RGBA value and return it to the first composite node 1905 as the RGBA value for its second connection.

The first composite node 1905, now having RGBA values for both connections may perform its own 'over' compositing operation on the two values to yield a result RGBA value which becomes the output 1907 of the graph.

Note that the order of the connections defines the layering of the graphics. In this example, wiring of the connections puts the curve mark on top of the static image, so the image is used as a background. However, were the connections swapped, a static image (with parts having transparency) would be composited on top of a layer of curves.

Also, as any node may have a connection to another node, one can create a graph composed of many layers composited together. Other compositing operations may include, for example, operations such as masking a first RGBA input with the transparency of a second RGBA input, multiplying two inputs, masking an input to a static mask from an image, etc.

A variety of node types include operational nodes, which operate on input from other nodes, and leaf nodes, which are able to return sample evaluations without information from other nodes. Nodes may be connected in any manner with any degree of complexity, and as such an infinite variety of patterns may be composed.

As a graph may contain any number of nodes, and the nodes may be connected in any configuration, the process of traversing the graph may be performed with a recursive process. For efficiency, batches of samples, rather than individual samples may be passed with each request of a node, the result being batches of RGBA values. All samples of a pattern image may be performed in one batch, such the node graph need be traversed only once.

Figure 19:
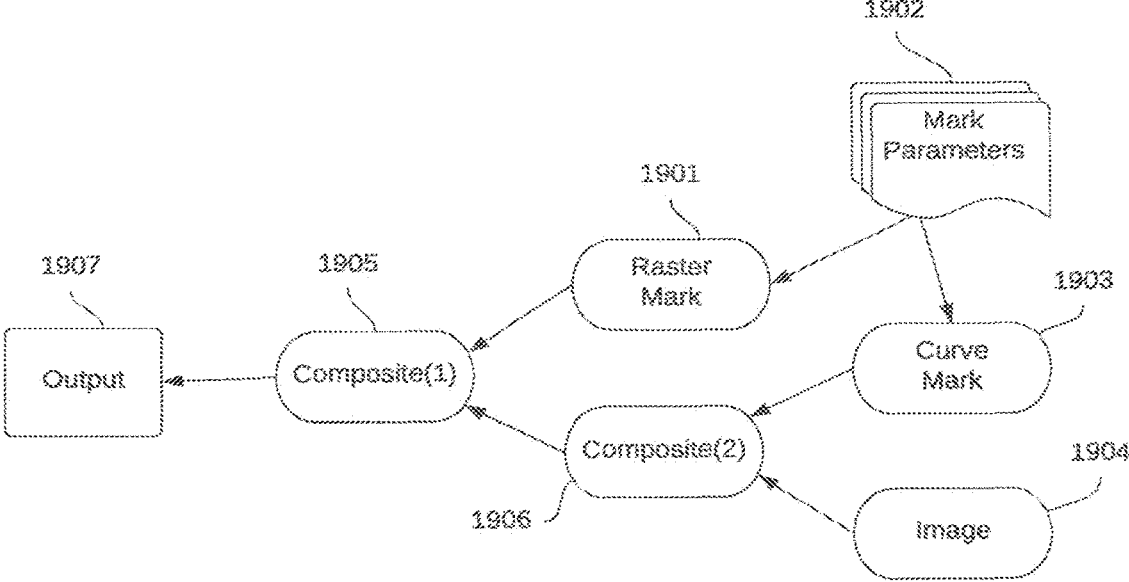
FIG. 19 depicts an example imperfect pattern specified with a graph.

The imperfect pattern, when specified by a graph of nodes, may be created and edited with a graphical user interface, such as the type of graphical user interface one would use for visual programming and similar in appearance to the graph depicted in FIG. 19. An authoring system, using a graphical user interface to configure the pattern, allows for connections and node settings to be changed while providing real time feedback in the form of an example encoded pattern image.

Real World Environments

Now that we have described methods in which a data record may be encoded into an infinite variety of imperfect patterns with sufficient complexity and under some artist control, let's examine how to make the data encoded in such imperfect patterns read robustly in challenging environments.

Recall from process 700 of FIG. 7 that a data record may be extracted from a source image by use of a pattern decoder 702. Thus far, our examples of source images have been pattern images, which are simply raster representations of imperfect patterns. This is because in the examples of the training process 800 of FIG. 8, in which we generate the pattern decoder 807 used in process 700, the training images 806, until this point, have themselves been just pattern images.

The wide variety of applications of the system discussed in relation to FIG. 1 may be accomplished by altering the training process 800 to synthesize different training images 806 by utilizing a more sophisticated training image renderer 804.

Training for Distortion Indifference

In applications discussed in relation to FIG. 1, the likelihood that a source image 105 captured by a camera 104 will exactly comprise an undistorted pattern image is low. Recall from process 100 that an object 101 has at least one surface 102 decorated with an imperfect pattern 103, and the pattern may repeat on the surface.

The imperfect pattern 103 may not be in the center of the camera's field of view. The field of view may capture more than one repeat of a repeating pattern. The surface 102 may be at an angle to the camera 104, and the imperfect pattern 103 may appear distorted in the image 105 by the effects of capture at that angle, by the perspective distortion of the camera 104, and the lens distortion of the camera 104. The imperfect pattern 103 may also appear distorted in the image 105 because the surface 102 may be curved, non-planar, overlapping.

The imperfect pattern 103 of the surface 102 may also be obscured by other objects between the camera 104 and the surface 102, or the surface 102 may have additional markings or labels added which cover or obscure parts of the imperfect pattern 103.

The source image 105 may also contain image distortions such as color space distortions based on the lighting and exposure of the image, random sensor noise, and JPEG encoding may contribute additional image artifacts. The image 105 may also be blurred because the focus is incorrect, or the camera 104 is in motion relative to the surface.

Hence, the source image 105, captured by a camera 104, may contain a swatch of the pattern with any or all of the described distortions and omissions.

Robust code reading of images with such distortions and omissions may be accomplished by altering the training process 800 of FIG. 8 to include a different set of training images 806 such as a set of training images which more closely approximate the swatches of imperfect patterns we may expect to see in source images.

Figure 20:
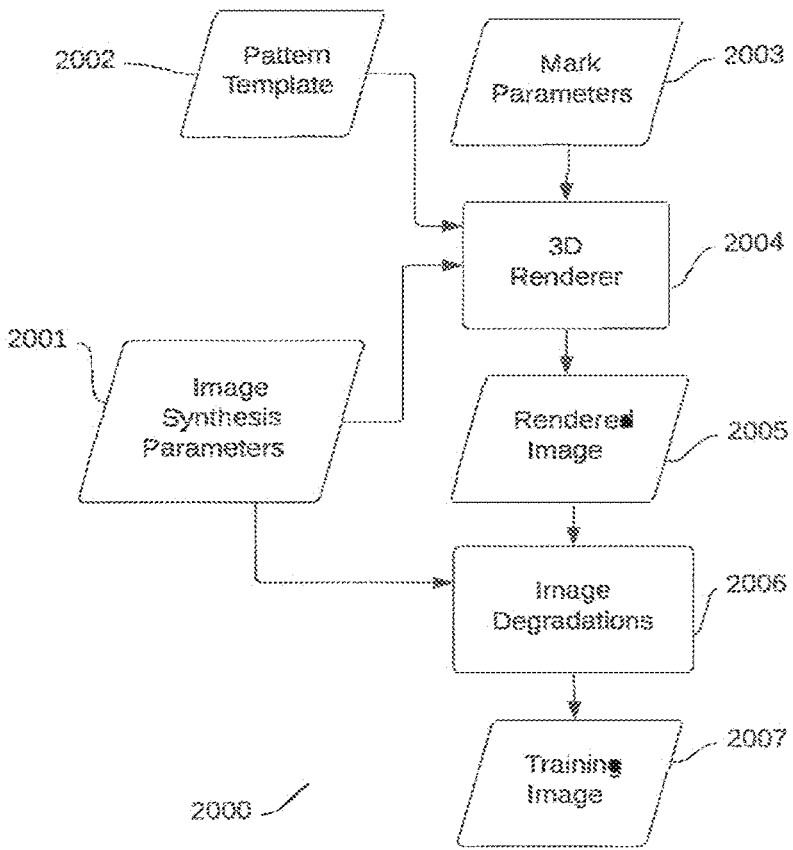
FIG. 20 depicts a preferred embodiment of a training image renderer that directly renders pattern samples.
Figure 21:
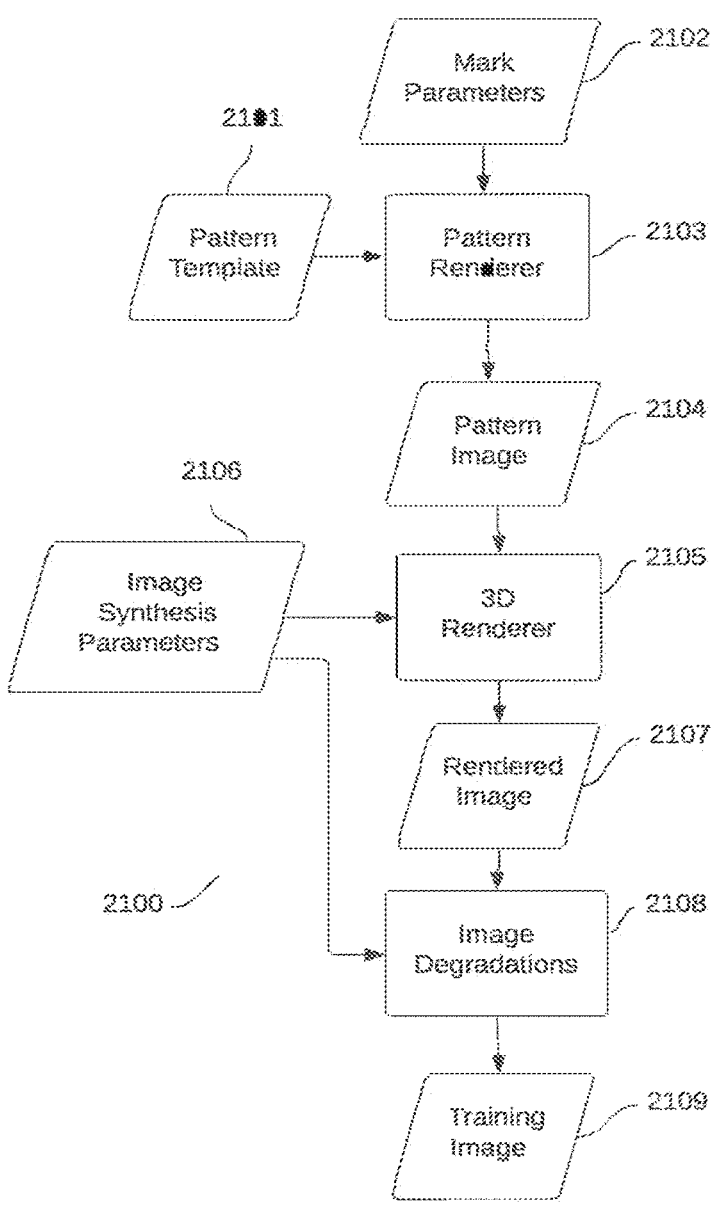
FIG. 21 depicts a preferred embodiment of a training image renderer that indirectly renders pattern samples.

In preferred embodiments, the training image renderer 804 may comprise a process such as process 2000 of FIG. 20 or process 2100 of FIG. 21. Both processes utilize a 3D renderer and synthesize approximately identical training images. Process 2100 may be especially preferred because it requires less computation to synthesize the training images.

FIG. 20 depicts a preferred embodiment of a training image renderer (804 of FIG. 8) which directly renders all samples of the imperfect pattern. A set of image synthesis parameters 2001 contains a computer graphics scene description for what is to be rendered. For example, a scene may contain a camera, one or more three-dimensional objects or surfaces, one or more lights, and a background image. The image synthesis parameters may also contain a graph of nodes describing the pattern, such as the type of graph described in relation to FIG. 19.

The image synthesis parameters 2001 may be chosen individually for each training image from a specified distribution of potential parameter values. For example, a surface may be translated a certain distance from the camera, that distance being chosen at random from values between specified distance minimum and distance maximum. Or as another example, a surface may be rotated about one or more axes such that it is off-angle to the camera. The degree of rotation may be chosen from a gaussian distribution of angles, or alternatively from a uniform distribution of angles, for example, from −90 degrees to 90 degrees.

The image synthesis parameters 2001 also may describe the shape of each surface in the scene. For example, each surface may be represented by a texture-mapped polygonal or triangle mesh, each vertex of the mesh, also having a corresponding texture coordinate.

In a preferred embodiment, a number of 3D finite element structural engineering models may be constructed and deformed by the application of various loads and constraints. The model elements, having assigned material properties typical for the range of applications, will deform as such a sample of the material would. For example, a finite element model of a paper surface would deform into a developable surface such as a ruled surface. Other models may have materials that allow more stretching or compression of the surface. When rendering a scene, the surface model may be chosen at random from a large set of such pre-calculated deformed surfaces.

The image synthesis parameters 2001 may also specify how the imperfect pattern may be applied to the surface. In general, an imperfect pattern may be applied to a surface as would a texture or procedural texture. Each vertex of the model may have a texture coordinate, which may correspond to a uniform distribution of the material from which the surface was composed. For example, if the surface were to represent a sheet of fabric, the texture coordinates would be linear and uniform when the sheet of fabric is flat. As the fabric is deformed and stretched, the vertices of the model may move about in 3D space, wherein the texture coordinates associated with each moved vertex may remain constant. The texture vertices may be interpolated across the elements (e.g. polygons) of the model in order to produce a continuous texture coordinate property of the surface which we will use as our pattern coordinate sample when sampling our imperfect pattern.

We may alter the scale and placement of the imperfect pattern on the surface by transforming the texture coordinates of the model. For example, the two-dimensional texture coordinates may be translated, rotated, or scaled, and the amount of each of these transformations may be selected at random from distributions with predetermined limits.

Portions of the surface may be hidden, for example by randomly excluding selected image areas from surface rendering. As one example, an irregularly shaped 2D mask, chosen at random from a library of various masks, is applied to the surface, the mask specifying the transparency of the surface to which it is applied. The mask may comprise a texture and may specify the transparency of each region of the surface. The masking may allow the models to recognize an encoded data record with only portions of an imperfect pattern visible. As with the imperfect pattern transformations for texture coordinates, the mask texture coordinates may also be transformed by random transforms with values within the range specified in the image synthesis parameters. For example, values of translation, rotation, and scaling may be chosen from a predefined distribution.

Thus in each image synthesized, a surface, which when struck by a ray returns a texture coordinate for the surface, may have that texture coordinate transformed into coordinates for sampling the imperfect pattern and also coordinates that sample the mask. The transformations, for example, may be linear transformations applied with a 3×3 matrix compiled from a set of operations such as translations, rotations, and scales. As these operations are driven by random values, they provide a random scaling, rotation, and shifting of the pattern visible through the mask, limiting what portions of the surface are shown. As the mask may also be rotated, shifted, and scaled in its application to the 3D surface, the visible portion of the pattern will be deformed by the 3D surface in every imaginable way.

One effect of training with this random shifting is that the system is forced learn to encode and decode a data record in such a way that no single portion of the pattern need be present in the swatch in order to extract the data record. By masking in such a way that the encoder, when trained, is only exposed to random unmasked portions (or swatches) of the pattern, we may ensure that random disjoint portions of the imperfect pattern each may individually encode the full data record. For non-repeating imperfect patterns, the shifting and masking forces the system to learn to recognize the pattern when seeing only portions it.

For repeating imperfect patterns, the result of the shifting and masking is to make visible in the swatch a different portion of the repeating pattern for each training image. (Texture coordinates are transformed and the run through a modulus operation to cycle the texture coordinate values in the 0 . . . 1 range in order to make patterns repeat.) Thus the encoder and decoder are forced to learn to transmit the payload in the pattern using just any random piece of the repeating pattern, and the piece may cross the boundary or "seam" of the pattern into a neighboring repeats.

The image synthesis parameters 2001 may also describe camera parameters such as the projection model, intrinsic parameters of the camera, the degree of focus of the camera, or the motion of the camera relative to the surface. As an example of defining camera motion, a motion vector may be chosen at random from a range of possible motion vectors. This motion vector could then be used to specify a range of 3D eyepoints from which sample rays may originate.

Similarly, a background image may be specified in the image synthesis parameters 2001, the background selected at random from a library of photographs that represent a broad range of physical environments. Such imagery may be helpful in order to teach the decoder model what features to ignore in an image when seeking to extract the data record.

Along with the pattern template 2002 and mark parameters 2003, the image synthesis parameters 2001 are passed into a 3D renderer 2004 which performs the image synthesis.

The 3D renderer 2004 may comprise a differentiable renderer, i.e. a renderer in which the output image pixel values are differentiable with respect to the various inputs of the rendering process. As examples, OpenDR and PyTorch3D are examples of freely available open-source differentiable renderers. The differentiability of the renderer is helpful to allow the flow of gradients through the 3D rendering process, and through the mark parameters, in order to affect the payload encoder model internal values.

Figure 22:
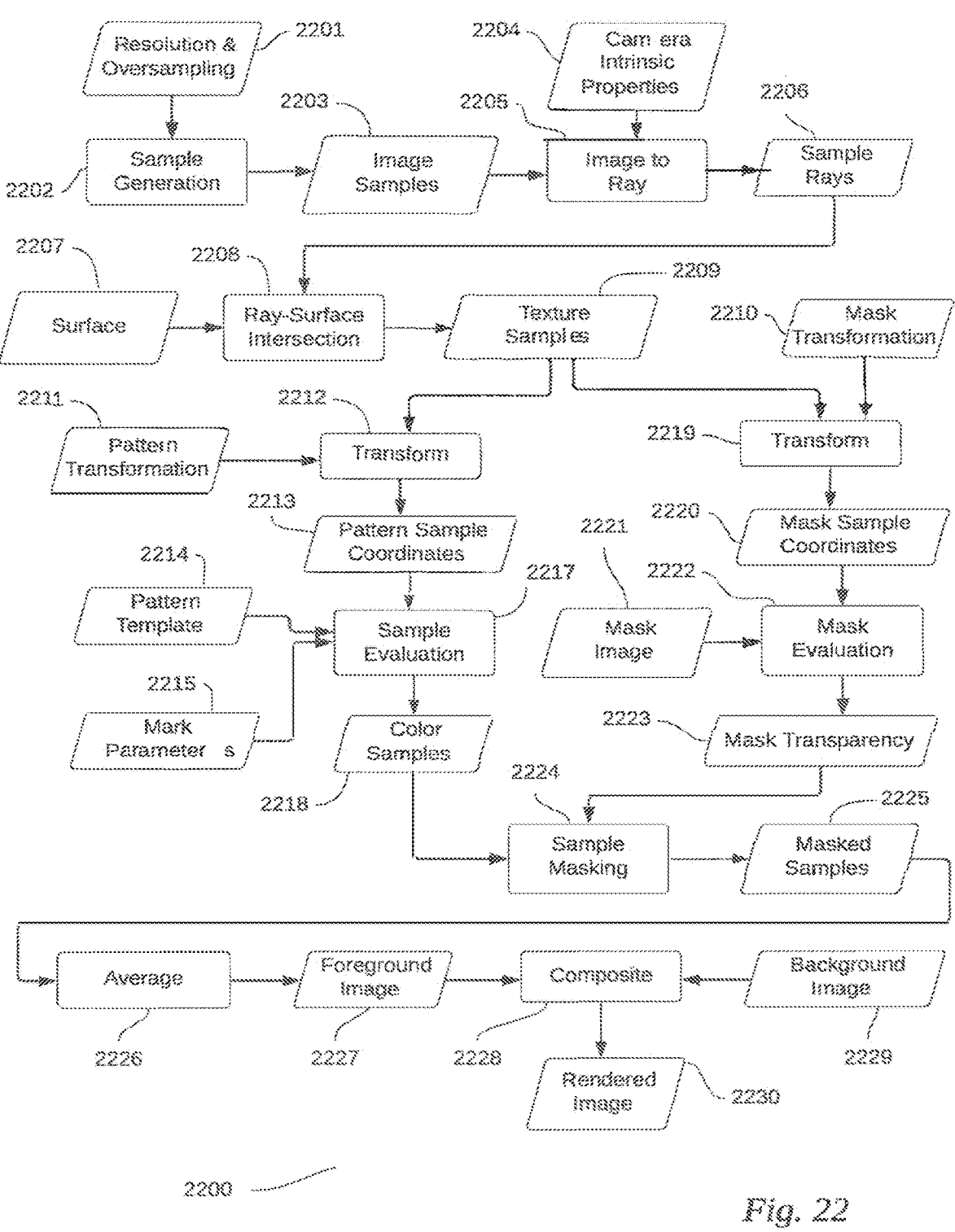
FIG. 22 depicts an example process to produce a 3D rendered image containing an imperfect pattern.

FIG. 22 depicts an example process to produce a 3D rendered image containing a swatch of the imperfect pattern.

The resolution and oversampling 2201, a component of the image synthesis parameters, are used to generate 2202 two-dimensional image-space samples 2203. For example, the image space samples 2203 may be distributed such that eight samples are randomly distributed within each pixel region of the rendered image.

The image-space samples 2203 may be converted 2205 into corresponding three-dimensional camera-space rays 2206 using the camera intrinsic properties 2204. The rays 2206 may be unit length three-dimensional vectors that when projected (using the camera intrinsic properties 2204) yields corresponding two-dimensional image-space samples 2203.

In addition to a direction vector, a ray may have an origin vector. The origin of a ray may be (0,0,0) or it may be placed randomly along a distribution of locations. For example, a motion vector ray may be a component of the image synthesis parameters which may be randomly chosen from a distribution of motion vectors. A motion vector may describe a distribution of eyepoints such as the uniform locus of eyepoints along the range from the origin to the endpoint of the motion vector.

Similarly, a blur factor may be a component of the image synthesis parameters and may, for example, describe additional jitter of the eyepoints of rays such that the jitter is, on average, uniform in three dimensions.

The three-dimensional sample rays 2206 are intersected with a three-dimensional surface 2207. The surface, for example, may be a mesh of triangles having texture coordinates at each triangle corner. A three-dimensional intersection of the ray and the triangle may be determined 2208, and a texture coordinate 2209 for each sample may be interpolated from the triangle corner texture values.

The texture samples 2209 are transformed by a pattern transformation 2211 to yield the pattern sample coordinates 2213. The pattern transformation 2211 may comprise multiplication with a 2D linear transformation matrix such as a matrix generated from translation, rotation, and scaling values that may be randomly chosen from a predetermined distribution of values.

The pattern sample coordinates 2213 are passed, along with the pattern template information 2214 and mark parameters 2215 into sample evaluation 2217 yielding color samples 2218. The color samples 2218 may include individual transparency values such as RGBA values.

The sample evaluation step 2217 may be based on the sample evaluation 606 of FIG. 6 for 2D rendering of a pattern image. Sample evaluation 2217 may also evaluate a graph of the design, such as a graph of similar form to the exemplary graph 1900 of FIG. 19.

Note that while our pattern may exist in a two-dimensional region of 0 . . . 1 in u and v of a pattern space, the pattern may repeat indefinitely across that space in a tiling fashion. For example, a pattern evaluated at (u=0.4, v=0.8) may evaluate to the same color sample value at location (u=1.4, v=0.8), or (u=−0.6, v=6.8). This may be accomplished, for example, by performing a modulus on the (u,v) coordinate values or by removing integer increments of u,v values in order to move the coordinate into the 0 . . . 1 space.

The texture samples 2209 are also used to determine a transparency value for each sample 2206 based on the randomized application of a mask 2221.

Texture samples 2209 are transformed 2219 by a mask transformation 2210 yielding mask sample coordinates 2220. As with the pattern transformation, the mask transformation 2210 may comprise a two-dimensional translation, rotation, and scaling of the texture samples, with the amount of each transformation being a random value chosen from a distribution of values specified in the image synthesis parameters.

The mask sample coordinates 2220 are used to evaluate the mask image 2222 to yield mask transparency values 2223 for each sample. The mask image 2222 may be chosen at random from a set of mask images, each image hiding and showing different portions of the texture. The mask image 2221 may be evaluated 2222 like a texture, with an interpolated sample lookup. For example, the mask transparency values may be bilinearly interpolated from the corners of the pixel a sample lands inside in order to yield the mask transparency 2223.

The pattern color samples 2218 are masked 2224 by the mask transparency values 2223 to yield the masked samples 2225. For example, let's say the color samples 2218 are of form $RGBA_1$ and the mask transparency samples 2223 are of the form $A_2$, where A denotes an 'alpha', or degree of opacity of a sample. The masking 2224 may be accomplished by multiplying the two alpha values to yield RGB $(A_1{*}A_2)$.

The masked samples 2225 may comprise multiple samples per pixel. In that case, the sample in each pixel may be averaged 2226 to yield a foreground image 2227. For example, each of the red, green, blue, and alpha values may be averaged with a pixel to yield an RGBA for the pixel.

The foreground image 2227 may be composited 2228 over a background image 2229 to yield a rendered image 2230. The compositing operation 2228 may be accomplished, for example, with the previously described "over" function. The background image may be an image chosen at random from a set of background images.

The rendered image 2230, being the output of the 3D renderer 2200, correlates to the rendered image output 2005 of the 3D renderer 2004 of FIG. 20.

Following rendering, a number of image degradations 2006 may be applied to the image in order to yield the training image 2007. The image degradations may include the addition of random noise to simulate camera sensor noise. The degradations may also include the degradation of JPEG encoding and decoding, random color, gamma, contrast, luminance adjustments. The degree and values of each degradation are stored in the image synthesis parameters 2001.

Recall that image synthesis parameters 2001 may be generated randomly, for example, by selecting a random value between a specified minimum and a maximum for each parameter. The parameter ranges may, for example, be adjusted to train for a specific environment. For example, the range of lighting distortions may be expanded for applications where lighting is less reliable. As another example, the range of motion blur may be increased for hand-held applications. Thus, by adjusting ranges one may tune an encoder decoder pair to best function in a given environment.

Let's examine another embodiment of generating of training images. FIG. 21 depicts a process of training image synthesis 2100 which is an optimization of the preceding process 2000 but requiring fewer calculations to yield an approximately equivalent training image.

A pattern template 2101 and mark parameters 2102 are used by a pattern renderer 2103 to yield a pattern image 2104. The pattern renderer may comprise the previous pattern rendering process 600 as depicted in FIG. 6.

The pattern image 2104, which may comprise an RGBA image, may be used as a precalculated texture map for the rendering. For example, the 3D renderer 2105, may also comprise a renderer such as the 3D rendering process 2200 of FIG. 22 but with one slight alteration. Instead of performing a direct pattern evaluation 2217 of the sample coordinates 2213 using the pattern template 2214 and mark parameters 2215, the sample evaluation 2217 instead comprises a texture lookup of the sample coordinates 2213 into the buffered pattern image (2104 of FIG. 21).

The pattern image may be evaluated as a repeating texture. For example, texture coordinates with values outside of the 0 . . . 1 range may be adjusted with a modulus function in order to bring the coordinates back to the 0 . . . 1 range.

Thus the 3D renderer 2105, using image synthesis parameters 2106 and using a pattern image 2104 as a texture map, synthesizes a rendered image 2107.

As with process 2000 of FIG. 20, the rendered image may also be degraded 2108 with the color space degradations 2006 of process 20 yielding the training image 2109.

Training images generated with either process 2000 of FIG. 20 or process 2100 of FIG. 21, containing the distortions and obfuscations typical of photographs from sample applications, have been demonstrated in training processes such as process 800 of FIG. 8 to yield payload encoder 802 and pattern decoder 807 models which are robust in reading data records from just portions of imperfect patterns, on curved surfaces, and in poor lighting conditions.

Performance of the models in any application is driven, in part, by the selection of ranges or distributions for the random image synthesis parameters A reasonable method for selection of the ranges would be to select distributions which produce images which are most similar (in range of exposure, blur, angles to surface) to the expected source images for the environment.

Another method for determining the appropriate ranges of image synthesis parameters for an application may comprise a method of hyper-parameter search. For example, initial ranges could be given as estimates of expected condition of the source images. Then, one may conduct a sequence of experiments to determine in what way parameter ranges should be adjusted in order to increase accuracy. The winner of a test of two alternate model pairs, for example, may comprise the selection of the model pair with a higher accuracy in a real-world test.

Tests may be constructed that permit the imperfect pattern from alternately trained model pairs to be compared in real-world environments.

As an example, a stage may be constructed with a fixed camera and lighting and clips to hold a sheet of paper. Printed imperfect patterns encoding the same data record may be generated from alternate pairs of encoder-decoder models that were generated with alternate ranges for image synthesis parameters. Each printed pattern may be captured with the fixed camera, and the resulting source image may be decoded with the corresponding decoder model. A measure of model pair accuracy could be the success rate of reads from such a stage. Image synthesis parameter ranges may be successively adjusted by trials of alternate range candidates in real world test environments.

Optimizing a Specific Payload

It is helpful to make an analogy between an imperfect pattern (which combines variations of visual transformations in a pattern) and a human vocal language (which articulates sounds). In each case, we develop our encoding and decoding abilities in order to best match a standard. In the case of speech, the standard might be producing and recognizing the most common pronunciation in the local dialect, and in the case of an imperfect pattern the standard may be what the encoder outputs for any given data record.

In the most common environments, perhaps the standard is how we really speak. However, in an environment with background noise, and echoes and audible distortions, we may alter the way in which we speak in order to increase the likelihood we will be understood. For example, we may enunciate, slow our speech, add emphasis, or exaggerate intonation.

Similarly, when we cogenerate encoder and decoder models, we do establish a standard of communication based on the encoder. Anyone reading an imperfect pattern, however, will expect to use the decoder model from the cogeneration that established the standard.

We are not tied to exactly following this encoder standard, nor are we tied to generating an imperfect pattern from the encoder model, but rather we may benefit by generating an imperfect pattern that can be most easily read by the decoder model. The exact form of the most optimally read imperfect pattern may be slightly different from the standard form of an imperfect pattern as output by its encoder.

While this may sound paradoxical, it does in fact make perfect sense. The mark parameter vector exists in a high dimensional mark parameter space. A mark parameter vector points to a region of mark parameter space that, when expressed in an imperfect partem and then decoded, will likely be interpreted as our data record. Said another way, if we adjust the mark parameters a little this way, a little that way and use them to encode an imperfect pattern, they will likely produce the correct data record when decoded.

The region of mark parameter space can be considered a basin, and while an encoder may produce a mark parameter vector which lands in that basin, it is likely not at the minimum or center of the basin, or further from its neighbors. This, in part, is because the encoder is a model and may only approximate the landscapes of the basins defined by the decoder.

Furthermore, should we wish to encode an imperfect pattern to be retrieved by a predetermined decoder, it may be the case that the environment in which we expect to decode may in material ways differ from the environment to which the image synthesis parameters were set to march. As an example, a decoder is trained for an expected environment in which the degree of motion blur is low, but then the decoder is subsequently expected to be used in environments where there is a higher degree of blur. We wish to encode a predetermined data record to an imperfect pattern using mark parameters that yield the highest possible decode success rate in the expected environment.

Figure 23:
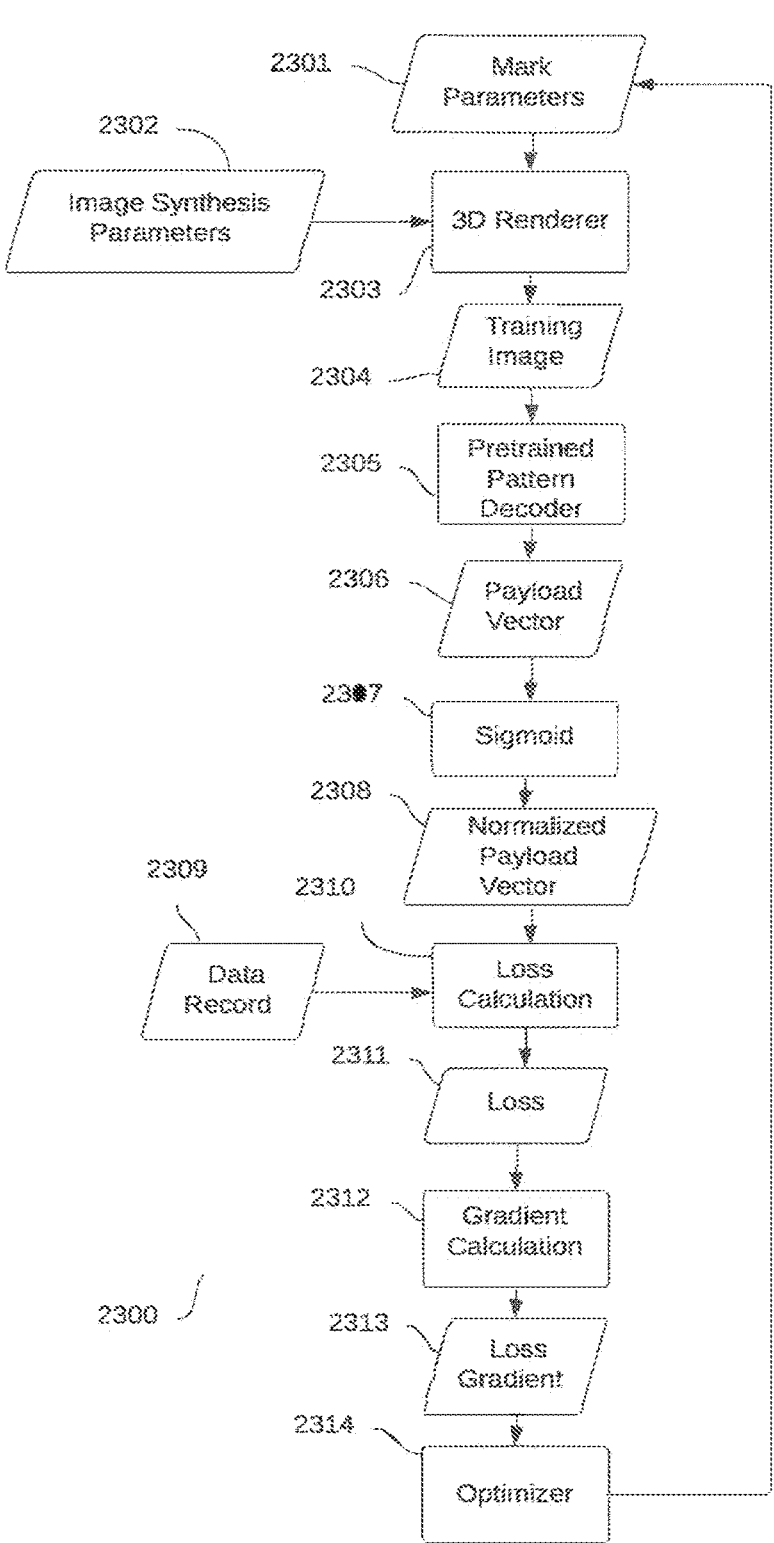
FIG. 23 depicts a process to optimize mark parameters for a given data record.

FIG. 23 depicts a preferred iterative method 2300 for determining such optimal mark parameters given a predetermined data record 2309, a pretrained pattern decoder 2305, and a range of image synthesis parameters 2302.

The mark parameter optimization may be performed as an iterative process similar to the training process 800 of FIG. 8. However, whereas process 800 optimized internal model values for the encoder and decoder models, process 2300 optimizes only a set of mark parameters for a specific data record.

The mark parameter optimization process 2300 begins by initializing the mark parameters 2301. The initial mark parameters may, for instance, be random values. Alternatively, the mark parameters may be extracted from box 503 of the data encoding process 500, as output by a payload encoder which was cogenerated with the pretrained pattern decoder 2305.

An iterative process of optimization is then performed, wherein at each iteration the mark parameters are adjusted incrementally in order to minimize a loss value. As with process 800, the iterative process may use a gradient descent algorithm, for example SGD, Adam, or Ranger.

A set of image synthesis parameters 2302 are selected at random from a set of predetermined parameter ranges. As with the model cogeneration process 800, the image synthesis parameters 2302 may, for example, describe every aspect of the 3D scene, including the shape of the surface, the placement and rotations of the surface, the size, rotation, and placement of the imperfect pattern on the surface, the lens projection and degree of focus and motion blur of the camera, the masking of the pattern, and the post-rendering image degradations such as degree of sensor, JPEG, color and brightness shifting.

As with previous training examples, this is a gradient descent optimization, and as such benefits from training with batches of data rather than single items. Though items in this graph may be described in their singular form, the reader should understand that "image synthesis parameters" 2302 may represent a batch of image synthesis parameters, and that "training image" 2304 may represent a batch of training images, and so on through the pipeline.

A 3D renderer 2303, which may, for example, comprise process 2200 of FIG. 22 or its enhancements, uses the image synthesis parameters 2302 and our current mark parameters 2301 to yield a synthesized training image 2304. The renderer 2303 should also use the same pattern template used with training process 800 of FIG. 8 to generate the decoder model 2305.

A pretrained pattern decoder 2305, which may consist of the pattern decoder 807 of FIG. 8, and whose model internal values have been trained with a process such as process 800 of FIG. 8, is fed the training image 2304 to yield a floating-point payload vector 2306.

The payload vector 2306 is then processed with a sigmoid function 2307 in order to yield the normalized payload vector 2308. The normalized payload vector has values between 0 . . . 1 and is the same length as the number of bits in the data record 2309.

A loss value 2311 is calculated 2310 by measuring the difference between the normalized payload vector 2308 and the predetermined data record 2309. The loss, for example, may be calculated as the mean square error between the payload vector 2308 and the data record 2309.

A gradient 2313 of the loss 2311 with respect to each mark parameter 2301 is calculated 2312. This calculation may be performed through a process of backpropagation.

An optimizer 2314 such as an SGD optimizer uses the loss gradient 2313 in order to incrementally adjust the values of the mark parameters 2301. This process repeats, each time using the same data record 2309 but with new random image synthesis parameters 2302, and each time resulting in an incremental change to the mark parameters. When the loss value reaches a predetermined threshold, or after a predetermined number of iterations, the process may terminate, and we will then have our optimal set of mark parameters 2301 for encoding the data record 2309.

This process may be performed on batches, wherein using the same mark parameters 2301, a batch of training images 2304 are generated, decoding into a batch of payload vectors 2306, which yields a batch of normalized payload vectors 2308. A loss 2311 for the batch may be calculated 2310, for example, as the average of the mean squared error loss from each normalized payload vector 2308 of the batch.

The optimized mark parameters 2301 may be used to render a pattern image. For example, in process 500 of FIG. 5, we may substitute the optimized mark parameters resulting from process 2200 as the mark parameters 503 instead of using the standard mark parameters from the payload encoder 502. The substituted mark parameters provide the equivalent of the emphasis in pronunciation that deviates from the standard dialect in order to best be understood.
Verified Data Records Recall that a data record may be made verifiable by the addition of error correction bits.

Figure 24:
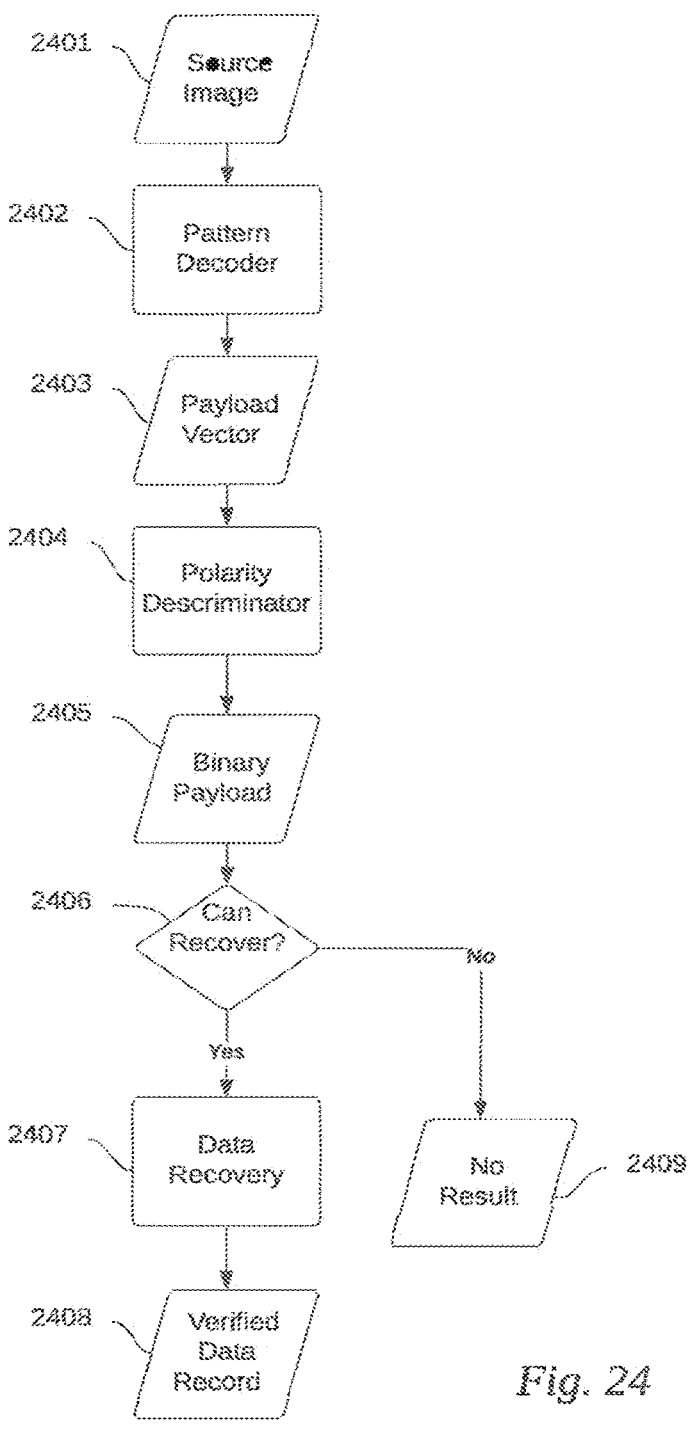
FIG. 24 depicts a preferred embodiment of a pattern decoding process which verifies data records.

FIG. 24 shows a preferred embodiment of a process for extracting a verified data record from an image containing a swatch of an imperfect pattern, which is an improvement to process 700 of FIG. 7.

The source image 2401 may comprise an image captured from a camera, for example, an image 105 containing a swatch of a pattern as captured by a camera 104 as described in process 100 of FIG. 1. After being captured by a camera, the source image 2401 may be processed, for example, by scaling, cropping, or enhancing contrast or color. The source image 2401 is then fed as input to the pattern decoder 2402 which yields a payload vector 2403.

The payload vector 2403, may comprise the data record, plus additional data bits beyond the data record. For example, the payload vector may contain values for checksum or parity bits, or error correction bits associated with the data record. In a preferred embodiment, the payload may encode the data record using the Reed-Solomon error correcting code in which a plurality of additional bits are used to verify or correct a degraded payload.

Each element of the payload vector 2403 is processed by a polarity discriminator 2404, in which the vector element is compared to zero; Elements whose values are greater than zero yield a '1' and values less than zero yield a zero in a resultant binary payload 2405.

The binary payload 2405 is examined for validity 2406, which may comprise verifying checksum bits or error correction bits to determine if a valid data record may be recovered. For example, if the payload has been encoded with Reed-Solomon error correction, the Reed-Solomon decoder is applied to the payload and determines if the data record can be reliably extracted.

Figure 25:
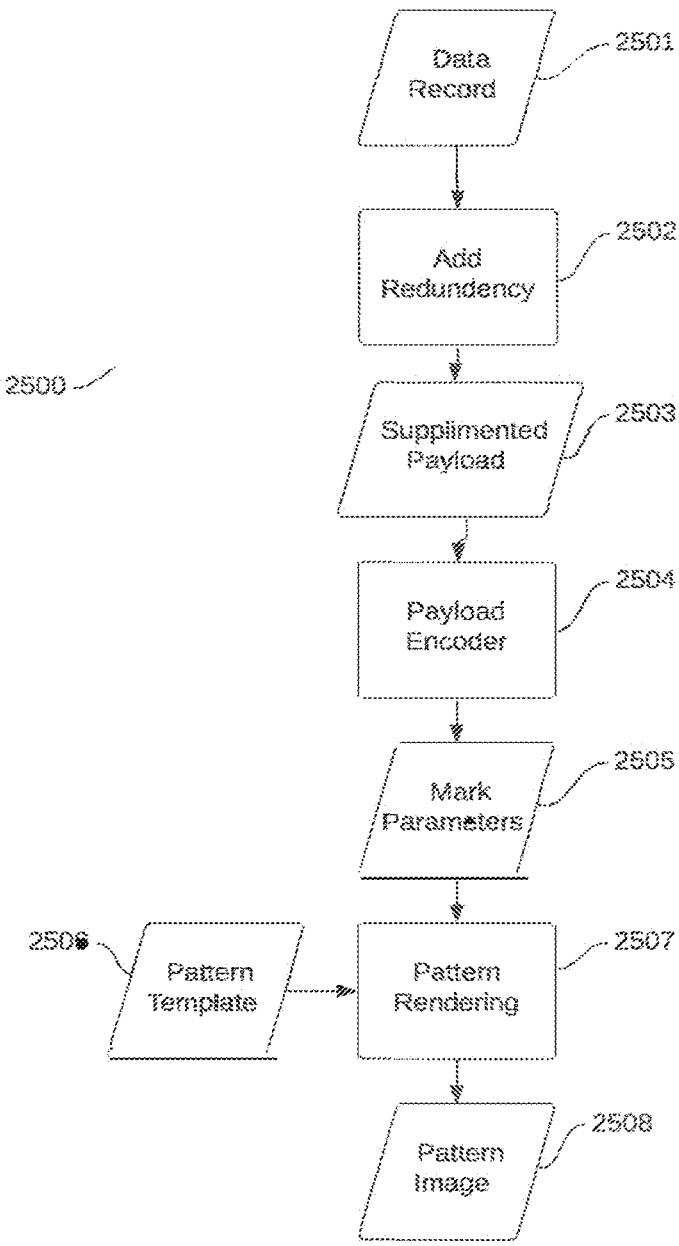
FIG. 25 depicts a preferred embodiment of a pattern encoding process which encodes verifiable data records.

If the data record may be extracted, reconstructed or verified, it is then recovered 2407 to produce the verified data record 2408. If the data record may not be recovered from the binary payload 2405, no result 2409 is yielded.
Encoding Verified Data Records FIG. 25 shows a process 2500 for encoding data in an imperfect pattern such that a verified data record may be extracted. This process is an improvement of process 500 of FIG. 5.

A data record 2501, may be supplemented 2502 with additional bits to produce a supplemented payload 2503. For example, the additional bits may be parity or error correction bits, or the data record may be otherwise processed to produce a larger payload which has redundancy and error checking abilities. In a preferred embodiment, the error correcting bits may be set by the Reed-Solomon data encoding method.

The supplemented payload 2503 is processed by a payload encoder 2504 to produce a set of mark parameters. The mark parameters 2505 may comprise a vector of floating-point values.

A pattern template 2506 is rendered 2507 using the mark parameters 2505 in order to produce an imperfect pattern image 2508. Recall that the pattern image may comprise a RGB image, any may contain an alpha channel indicating transparency for each pixel.

Thus, by using process 2500 to encode a verifiable data record into a pattern image, and then by using process 2400 to decode and verify the data record from a source image, we may provide a reliable identification of an object bearing the imperfect pattern.

General

An embodiment of the invention may be a machine-readable medium, including without limitation a non-transient machine-readable medium, having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Some parameters and values are described as "continuous" in the foregoing description. It is appreciated that, in a typical computer implementation of an embodiment, fully continuous values (in the mathematical sense) are not employed (and are not even supported by most computing hardware). Thus, the reader should understand "continuous" to refer to floating point values, such as 32-bit or 64-bit floating point values. These values have a discrete step size that is very small, but not infinitesimally small. If a standard 32-bit or 64-bit value is not sufficiently precise, an extended-precision representation may be chosen. Similarly, in some embodiments, even the step size of a multi-bit integer may be small enough for the purposes of a calculation, so an integer or fixed-point representation may be adequate. Generally speaking, the importance of "continuous" values is that, given two adjacent input values (i.e., values that are a single discrete step size apart), the corresponding output values are related in a way that can be differentiated to produce a useful feedback signal for error detection, correction and training.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a non-transient machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories of registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), erasable, programmable read-only memories ("EPROMs"), electrically-erasable read-only memories ("EEPROMs"), magnetic or optical cards, or any type of media suitable for storing computer instructions.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that imperfect patterns can also be produced by software and hardware that distribute the functions of embodiments of this invention differently than herein described. Such variations and implementations are understood to be captured according to the following claims.

Description of Exemplary Embodiments

An embodiment may be a physical surface having information encoded thereupon, comprising:

a first characteristic of the surface and a second characteristic of the surface, the first characteristic and the second characteristic distinguishable from each other in an image showing the surface;

an imperfect pattern comprising a plurality of cells, at least one cell containing a rendering of at least one mark containing areas having the first characteristic and areas having the second characteristic, said at least one mark transformed in a continuous manner from one cell of the plurality of cells to another cell of the plurality of cells, thus forming a transformed mark, said imperfect pattern apparent in the image showing the surface, wherein an image showing a portion of the surface, when processed with a decoder, yields a predetermined, verified data record, wherein a second image showing a second, disjoint portion of the surface, when processed with the decoder, yields the predetermined, verified data record.

An embodiment may be a physical surface having information encoded thereupon, comprising:

a first characteristic of the surface and a second characteristic of the surface, the first characteristic and the second characteristic distinguishable from each other in an image showing the surface;

an imperfect pattern comprising a plurality of marks, at least one mark containing areas having the first characteristic and areas having the second characteristic, said at least one mark transformed in a continuous manner, thus forming a transformed mark, said imperfect pattern apparent in the image showing the surface, wherein an image showing a portion of the surface, when processed with a decoder, yields a predetermined, verified data record, wherein a second image showing a second, disjoint portion of the surface, when processed with the decoder, yields the predetermined, verified data record.

An embodiment such as the foregoing may include the physical surface, wherein a third image showing the surface captured from a different vantage point, when processed with the decoder, yields the predetermined, verified data record.

An embodiment such as the foregoing may include the physical surface, wherein said at least one mark overlaps and obscures part of at least one other mark.

An embodiment such as the foregoing may include the physical surface, wherein said at least one mark depicts a different visual representation from one cell of the plurality of cells to another cell of the plurality of cells.

An embodiment such as the foregoing may include the physical surface, wherein the at least one mark comprises a graphic image.

An embodiment such as the foregoing may include the physical surface, wherein the imperfect pattern seamlessly repeats across the surface.

An embodiment such as the foregoing may include the physical surface, wherein the continuous manner of transformation is chosen from the group consisting of translation, rotation, and scaling.

An embodiment such as the foregoing may include the physical surface, wherein the continuous manner of transformation of a mark in a cell comprises a plurality of transformations.

An embodiment such as the foregoing may include the physical surface, wherein the at least one mark is transformed by a deformation of a shape of the at least one mark to create a deformed shape.

An embodiment such as the foregoing may include the physical surface, wherein the deformation of the shape of the mark comprises a deformation along a continuous curve.

An embodiment such as the foregoing may include the physical surface, wherein the continuous curve is a cubic curve.

An embodiment such as the foregoing may include the physical surface, wherein the at least one mark is a three-dimensional object which is deformed by rotation about a three-dimensional axis and projection to a two-dimensional representation.

An embodiment such as the foregoing may include the physical surface, wherein the plurality of cells comprises two different adjacent cells, each different adjacent cell containing a piece of a larger piecewise mark that spans the two different adjacent cells.

An embodiment such as the foregoing may include the physical surface, wherein the larger piecewise mark is an isocontour.

An embodiment such as the foregoing may include the physical surface, wherein the larger piecewise mark is a thresholding of an interpolation of continuous values at corners of the two different adjacent cells.

An embodiment such as the foregoing may include the physical surface, wherein the verified data record identifies an object displaying the physical surface.

An embodiment may be a system for encoding data and recovering encoded data, comprising:

an encoder to produce an imperfect pattern by controlling an image-perturbation system in accordance with a data record;

a physical surface displaying the imperfect pattern;

a camera to acquire an image of the physical surface; and a decoder to extract a recovered data record from the image of the physical surface, wherein the encoder and decoder are trained together through a machine-learning process.

An embodiment may be a system for preparing an image encoder and decoder pair to communicate data from the encoder to the decoder via an image of an imperfect pattern, comprising:

an image generator to produce an imperfect image based on a basic image component, a continuous perturbation control value, and a binary data message;

an image degrader to produce a degraded image based on the imperfect image and a degradation control value; and an image decoder to extract a decoded message from the degraded image according to a decoding control value, wherein an iterative training process provides binary training messages to the image generator to produce imperfect training images;

provides the imperfect training images to the image degrader to produce degraded training images;

provides the degraded training images to the image decoder to obtain decoded training messages; and adjusts the continuous perturbation control value and the decoding control value to cause each decoded training message to be equal to a corresponding binary training message.

An embodiment may be a method for constructing a cooperating modulator-demodulator operator pair to encode a message into and recover the message from an imperfect repeating pattern displayed on a physical surface, comprising:

initializing a repeating pattern;

initializing an encoding network to distort areas of the repeating pattern in a manner correlated with a first message to produce a distorted repeating pattern;

initializing a decoding convolutional network to extract a second message from the distorted repeating pattern;

preparing a training pattern by using the encoding network to distort areas of the repeating pattern in a manner correlated with a random message;

mapping the training pattern onto a 3D surface and preparing a training image by rendering the 3D surface;

extracting a candidate message from the training image;

back-propagating an error signal corresponding to differences between the random message and the candidate message to the encoding convolutional network and the decoding convolutional network; and repeating the preparing, mapping, extracting and back-propagating operations until the encoding convolutional network can prepare a distorted operating image in a manner correlated with a predetermined message, and the decoding convolutional network can extract the predetermined message from the distorted operating image with an error rate below a predetermined threshold.

An embodiment may be a method for decoding a message contained in an imperfect repeating pattern displayed on a physical surface, comprising:

acquiring a first image of a first portion of the imperfect repeating pattern displayed on the physical surface;

processing the first image with a decoder to produce a verified message;

acquiring a second image of a second, different portion of the imperfect repeating pattern on the physical surface;

processing the second image with the decoder to produce the verified message.

An embodiment such as the foregoing may include the method of decoding a message contained in an imperfect repeating pattern, wherein the first portion of the imperfect repeating pattern is completely disjoint from the second, different portion of the imperfect repeating pattern.

An embodiment such as the foregoing may include the method of decoding a message contained in an imperfect repeating pattern, wherein the first portion of the imperfect repeating pattern covers less than one full repetition of the imperfect repeating pattern.

We claim:

1. A physical object of a set of physical objects, each physical object of the set of physical objects being associated with a data record and comprising at least one surface displaying a pattern of marks, the set characterized by:

a plurality of marks correlated across the set of physical objects;

the pattern of marks displayed on a physical object of the set comprising the plurality of marks;

at least one mark of the plurality of marks displayed across the set of physical objects in at least three distinct configurations, each distinct configuration being displayed on a different physical object of the set; and wherein the configuration of the plurality of marks that form the pattern of marks on each physical object of the set is indicative of the associated data record, including cases in which the configuration encodes the associated data record.

2. The physical object of claim 1, wherein the associated data record comprises a plurality of data bits.

3. The physical object of claim 1, wherein the associated data record is recoverable from an image of a portion of the pattern of marks.

4. The physical object of claim 3, wherein the associated data record is recoverable from an image comprising less than half of the area of the pattern of marks.

5. The physical object of claim 1, wherein at least three marks of the plurality of marks are displayed across the physical objects of the set of physical objects in at least three distinct configurations.

6. The physical object of claim 1, wherein the pattern of marks on a physical object of the set of physical objects comprises portions of at least two adjacent instances of a repeating pattern unit, and wherein at least one of the plurality of marks extends across a boundary between the adjacent pattern units, such that portions of the mark on either side of the boundary align to form a complete visual element.

7. The physical object of claim 1, wherein a first mark of the plurality of marks partially overlaps a second mark of the plurality of marks on a physical object of the set, and the region of overlap results in covering of a portion of the second mark, the region of overlap being visually consistent with the first mark and visually inconsistent with the second mark.

8. The object of claim 1, wherein the configuration of at least one mark of the plurality of marks varies in rotational orientation relative to the pattern across the set of objects, and the rotational orientation of the at least one mark is indicative of the associated data record.

9. The object of claim 1, wherein the configuration of at least one mark of the plurality of marks reveals different portions of a coherent mark across the set of objects, and the revealing of different portions is indicative of the associated data record.

10. The object of claim 1, wherein the configuration of at least one mark of the plurality of marks varies in shape across the set of objects, and the shape of the mark contributes to the encoding of the data record encoded by the pattern of marks.

11. The object of claim 1, wherein the configuration of at least one mark of the plurality of marks varies in curvature along the at least one mark, and wherein a portion of the at least one mark exhibits curvature that varies linearly along that portion, and wherein the curvature of the at least one mark is indicative of the associated data record.

12. The object of claim 1, wherein the configuration of at least one mark of the plurality of marks varies in a combination of properties, such as position, orientation, size, scale, shape, or color, across the set of objects, and the combination of properties is indicative of the associated data record.

13. The object of claim 1, wherein the data record is encoded on at least one physical object of the set of physical objects using a combination of color, spatial relationships, and shape properties of the marks, rather than density-based modulation.

14. A set of physical objects, each physical object of the set being associated with an identifier and comprising at least one surface displaying a pattern of marks, the set of physical objects characterized by:
  a plurality of marks correlated across the set of physical objects;
  the pattern of marks of a physical object of the set comprising the plurality of marks; and
  at least one mark of the plurality of marks displayed across the set in at least three distinct configurations, each distinct configuration being displayed on a different physical object of the set, the associated identifier recoverable from an image of a portion of the at least one surface of a physical object of the set.

15. The set of physical objects of claim 14, wherein the distinct configurations of the at least one mark are distinguishable as differing values along a common property of the mark, the property selected from the group consisting of position, rotational orientation, scale, shape, curvature, and color.

16. The set of physical objects of claim 14, wherein the configurations of the marks vary across the set of physical objects in fixed transformational dimensions, constrained within a structured range.

17. The set of physical objects of claim 14, wherein the marks are configured such that differing values along a common property of the mark are not limited to a finite set of discrete values across the set of objects.

18. The set of physical objects of claim 14, wherein the plurality of marks are layered in a consistent manner across the set of physical objects, such that a relationship between at least some of said marks follows a predefined observable rule across all physical objects in the set.

19. The set of physical objects of claim 14, wherein the pattern of marks displayed on any object of the set does not exhibit a detectable relationship to a predefined 2D indicia.

20. A physical object chosen from a set of physical objects, each physical object of the set being associated with a data record and comprising at least one surface displaying a graphic design, the set characterized by:
  a plurality of graphic layers present across the set, the graphic layers of a physical object of the set being combined, consistently across the set of objects, to form the graphic design displayed on that physical object;
  wherein the configuration of at least one of the graphic layers of the graphic design on each physical object of the set is indicative of the associated data record.

21. The physical object of claim 20, wherein a first graphic layer overlaps a second graphic layer, such that the first graphic layer hides portions of the second graphic layer from view.

22. The physical object of claim 21, wherein the first graphic layer or the second graphic layer is indicative of the associated data record.

23. The physical object of claim 21, wherein the first graphic layer is indicative of the associated data record, and wherein the second graphic layer is indicative of the associated data record.

24. The physical object of claim 20, wherein the graphic design comprises two adjacent instances of a repeating pattern unit, the pattern unit comprising a set of graphic layers combined consistently across the set, and wherein the repeating pattern unit, when tiled, creates a seamless graphic design without breaks at pattern unit boundaries.

* * * * *